United States Patent
Minelly et al.

(10) Patent No.: US 7,872,794 B1
(45) Date of Patent: Jan. 18, 2011

(54) HIGH-ENERGY EYE-SAFE PULSED FIBER AMPLIFIERS AND SOURCES OPERATING IN ERBIUM'S L-BAND

(75) Inventors: John D. Minelly, Bothell, WA (US); Deborah A. Alterman, Seattle, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 202 days.

(21) Appl. No.: 12/018,193

(22) Filed: Jan. 22, 2008

Related U.S. Application Data

(60) Provisional application No. 60/885,916, filed on Jan. 21, 2007.

(51) Int. Cl.
*H04B 10/17* (2006.01)
(52) U.S. Cl. ............... 359/341.31; 359/337.13; 359/337.3
(58) Field of Classification Search ............ 359/337.13, 359/337.3, 341.31
See application file for complete search history.

(56) References Cited

U.S. PATENT DOCUMENTS

| | | | | |
|---|---|---|---|---|
| 5,867,305 | A * | 2/1999 | Waarts et al. | 359/337.12 |
| 7,231,122 | B2 | 6/2007 | Weisberg et al. | |
| 7,260,299 | B1 | 8/2007 | Di Teodoro et al. | |
| 7,331,954 | B2 | 2/2008 | Temelkuran et al. | |
| 7,400,384 | B1 * | 7/2008 | Evans et al. | 356/5.01 |
| 2002/0159736 | A1 * | 10/2002 | Dejneka et al. | 385/127 |
| 2003/0128421 | A1 * | 7/2003 | Aiso | 359/341.5 |
| 2005/0024716 | A1 * | 2/2005 | Nilsson et al. | 359/341.31 |
| 2005/0259934 | A1 | 11/2005 | Temelkuran et al. | |
| 2006/0029111 | A1 * | 2/2006 | Liu | 372/6 |
| 2006/0187973 | A1 * | 8/2006 | Varnham et al. | 372/6 |
| 2006/0291512 | A1 | 12/2006 | Borschowa | |
| 2008/0030847 | A1 * | 2/2008 | Murison et al. | 359/341.3 |

FOREIGN PATENT DOCUMENTS

WO  WO-9964904  12/1996

OTHER PUBLICATIONS

Kulcsar et al. "Maximizing energy extraction from Er3+/Yb3+ doped fiber amplifier in shaped microsecond pulses", Conference on Lasers and Electro-Optics, CMK6 (2 pp.)Jun. 2003.*
Koerber, B. W., et al., "optical propagation effects of an underwater laser range-gated imaging system", "http://dspace.dsto.defence.gov.au/dspace/bitstream/1947/4207/1/DSTO-TR-0156%20PR.pdf", May 1996, Publisher: Defence Science and Technology Organisation Canberra (Australia).

* cited by examiner

*Primary Examiner*—Eric Bolda
(74) *Attorney, Agent, or Firm*—Charles A. Lemaire; Jonathan M. Rixen; Lemaire Patent Law Firm, P.L.L.C.

(57) ABSTRACT

An apparatus and that provide an optical-fiber amplifier having at least one erbium-doped fiber section and an optical pump coupled to the erbium-doped fiber section, wherein the apparatus is operable to amplify signal pulses to high energy in the erbium-doped fiber section, the pulses having a wavelength in the range of about 1565 nm to about 1630 nm. In some embodiments, the amplifying fiber is ytterbium free.

35 Claims, 30 Drawing Sheets

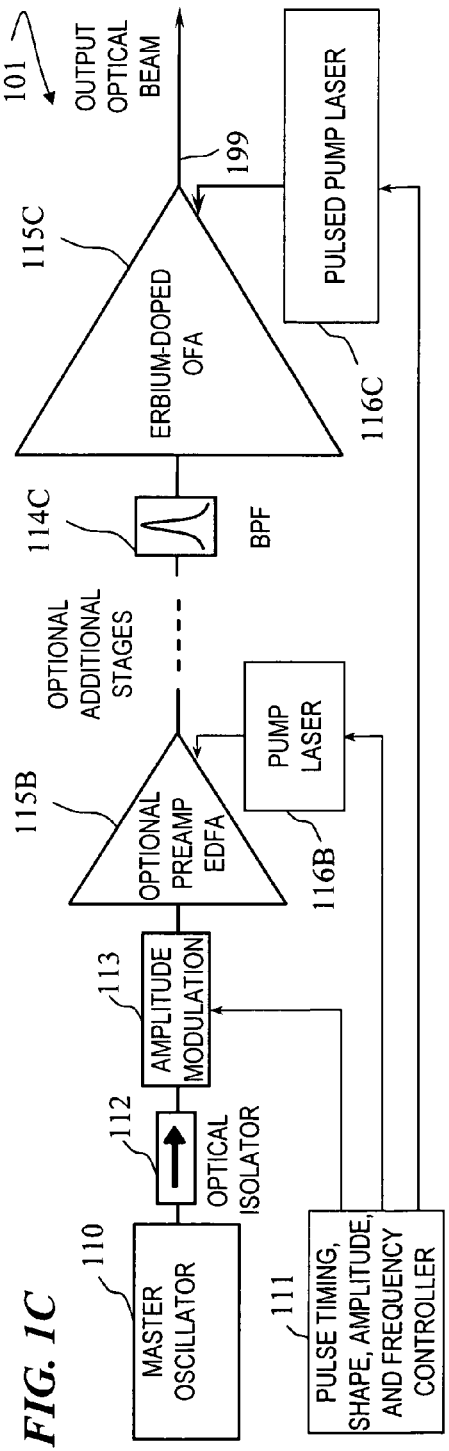
FIG. 1C
FIG. 2A SQUARE PULSE
FIG. 2C AMPLITUDE-MODULATED SQUARE PULSE
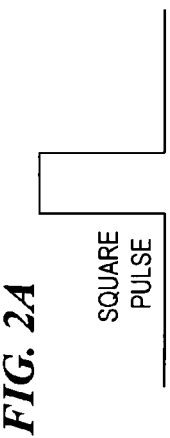
FIG. 2E CHIRPED AMPLITUDE-MODULATED SQUARE PULSE
FIG. 2B SHAPED PULSE
FIG. 2D AMPLITUDE-MODULATED SHAPED PULSE
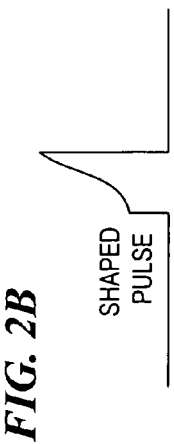
FIG. 2F CHIRPED AMPLITUDE-MODULATED SHAPED PULSE GAIN SPECTRA FOR C-BAND, INTERMEDIATE BAND AND L-BAND AMPLIFIERS. THE CHOICE OF BAND DETERMINES THE FIBER LENGTH REQUIRED FOR GAIN IN THAT BAND AND THE RESULTING INVERSION LEVEL.

*PUMP ABSORPTION IN DOUBLE-CLAD AMPLIFIERS WITH 30DB GAIN. INTERMEDIATE OR L-BAND AMPLIFIERS ALLOW FOR STRONG PUMP ABSORPTION AT LARGER CLADDING WAVEGUIDES.*

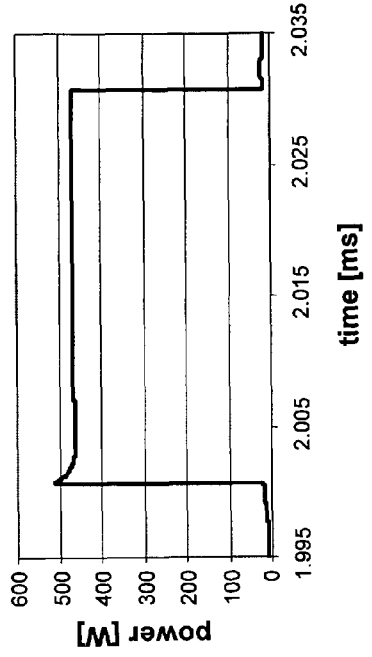
FIG. 12A 10 μs Pump Lead
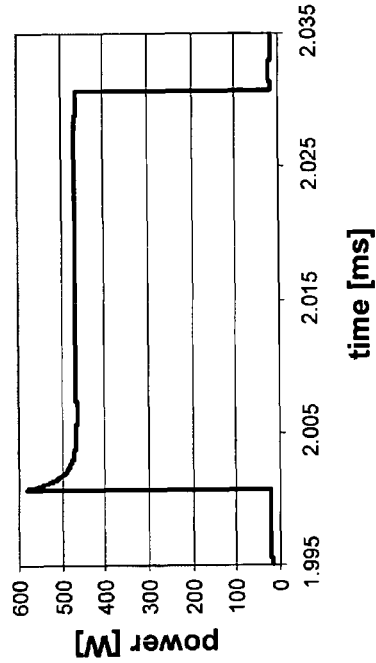
FIG. 12B 5 μs Pump Lead
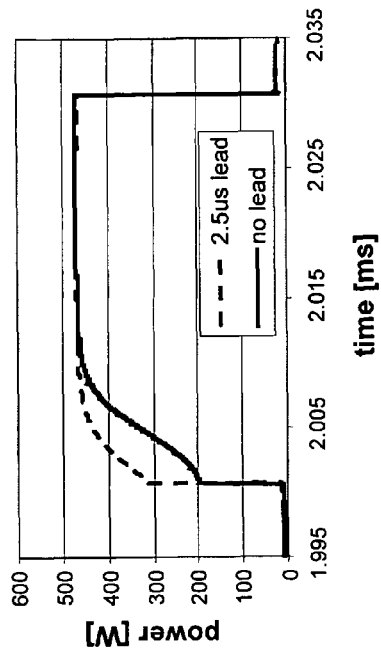
FIG. 12C 4 μs Pump Lead
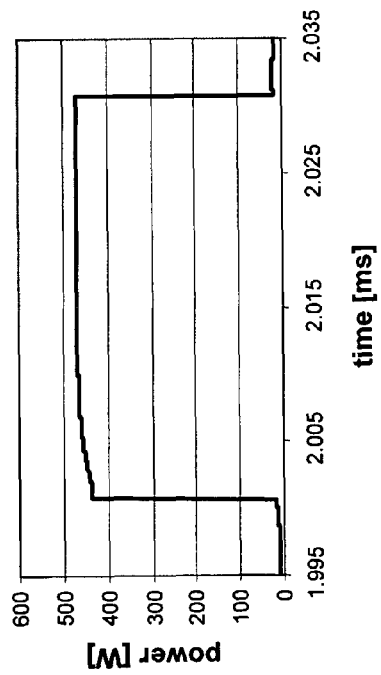
FIG. 12D 2.5 μs Pump Lead, No Pump Lead

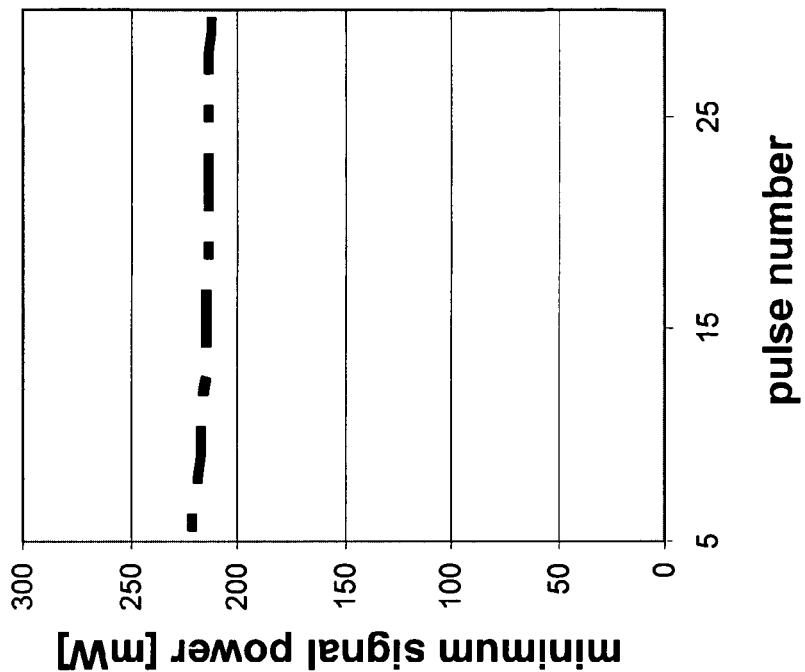
FIG. 25B  Stage 2
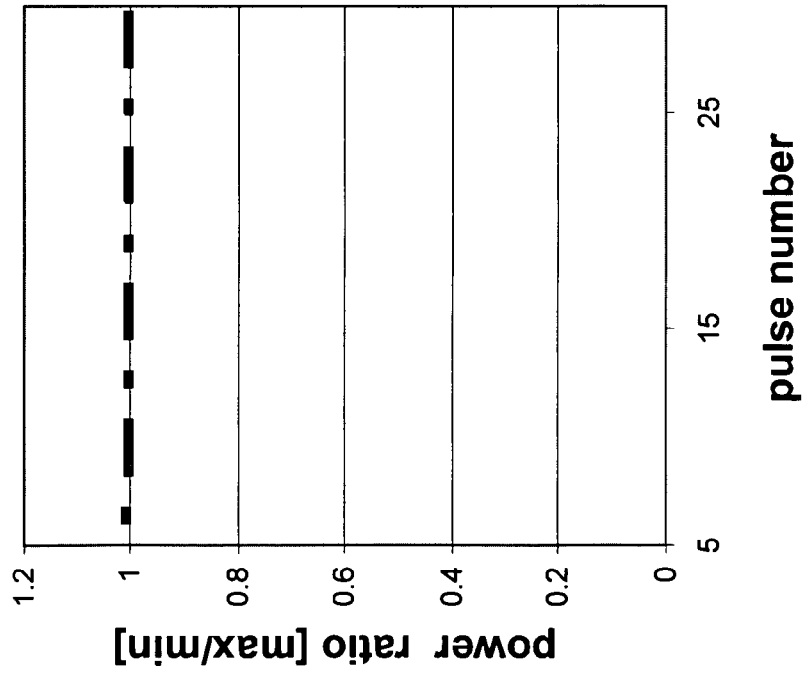
FIG. 25A  Stage 2

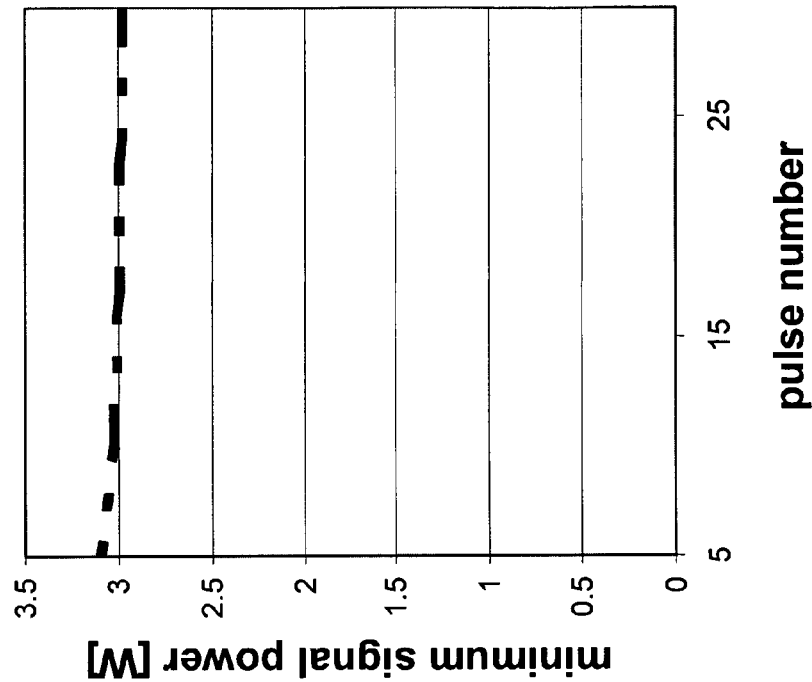
FIG. 26A  Stage 3
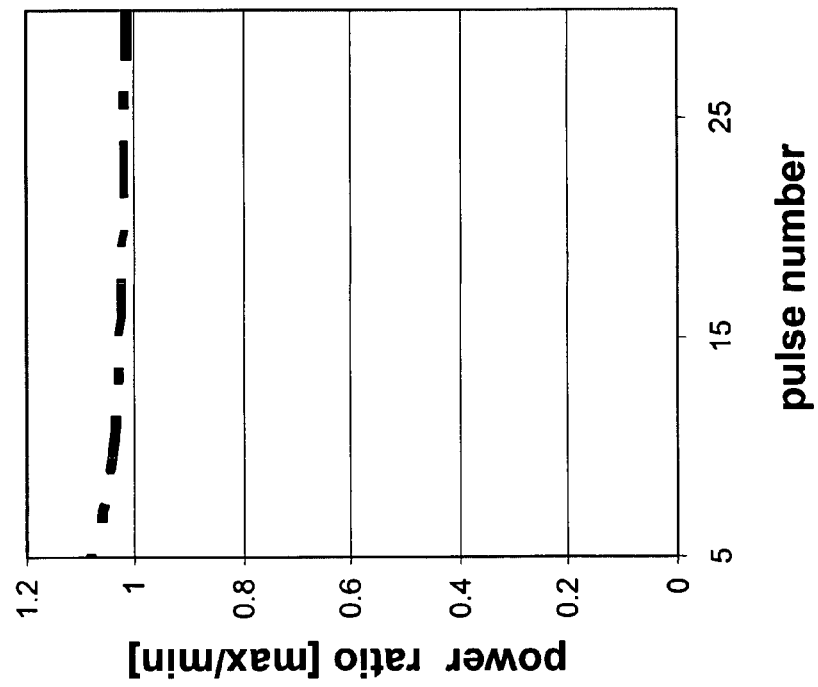
FIG. 26B  Stage 3

HIGH-ENERGY EYE-SAFE PULSED FIBER AMPLIFIERS AND SOURCES OPERATING IN ERBIUM'S L-BAND

CROSS-REFERENCE TO RELATED APPLICATIONS

This application claims benefit of U.S. Provisional Patent Application No. 60/885,916 filed on Jan. 21, 2007, titled "HIGH-ENERGY EYE-SAFE PULSED FIBER AMPLIFIERS AND SOURCES OPERATING IN L-BAND," which is incorporated herein by reference in its entirety.

This application is related to commonly owned U.S. patent application Ser. No. 11/165,676 (now U.S. Pat. No. 7,792, 166) titled "APPARATUS AND METHOD FOR DRIVING LASER DIODES" by Lawrence A. Borschowa; U.S. Pat. No. 7,260,299 to Fabio Di Teodoro et al., titled "MULTI-SEGMENT PHOTONIC-CRYSTAL-ROD WAVEGUIDES COUPLED ACROSS A FREE-SPACE GAP AND ASSOCIATED METHOD" that issued Aug. 21, 2007; U.S. patent application Ser. No. 11/567,740 (now U.S. Pat. No. 7,590, 856) titled "APPARATUS AND METHOD FOR AN ERBIUM-DOPED FIBER FOR HIGH-PEAK-POWER APPLICATIONS" by John D. Minelly et al.; and U.S. patent application Ser. No. 11/556,658 (now U.S. Pat. No. 7,400, 807) titled "APPARATUS AND METHOD FOR A WAVEGUIDE WITH AN INDEX PROFILE MANIFESTING A CENTRAL DIP FOR BETTER ENERGY EXTRACTION" by John D. Minelly et al.; which are each incorporated herein by reference.

STATEMENT OF GOVERNMENT INTEREST

This invention was made with Government support under contract number W911QX-05-C-0126, from the U.S. Army. The government has certain rights in this invention.

FIELD OF THE INVENTION

The invention relates generally to optical-fiber amplifiers and more particularly to devices and methods of operation and apparatus and methods to make and use fiber amplifiers and devices using fiber amplifiers that operate in and about the L-band optical infrared (IR) wavelengths of about 1550 nm to about 1630 nm, and optionally use pump pulsing.

BACKGROUND OF THE INVENTION

There is a need for improved high-energy optical pulse generation for a number of applications including LIDAR (light detection and ranging) and in particular LADAR (laser detection and ranging) for detecting objects (particularly flying objects) at great distances, as well as for imaging, medical treatments and materials processing.

Optical amplifying fibers can have very high gain. When pumping such fibers to very high energies, the high gain starts to amplify spontaneous emission (ASE), which depletes and wastes pump power, as well as generating undesired optical output.

Papers that describe fiber amplifiers include T. Komukai, T. Yamamoto, T. Sugawa, Y. Miyajima, "Upconversion Pumped Thulium-Doped Fluoride Fiber Amplifier and Laser Operating at 1.47 µm", IEEE J. Quantum Electron, Vol. 31, no. 11, pp 1880-1889, 1995 (hereinafter "Komukai et al. 1995"); B. N. Samson, N. J. Traynor, D. T. Walton, A. J. G. Ellison. J. D. Minelly, "Thulium-doped silicate fiber amplifier at 1460-1520 nm", Proc OAA, paper PD3, Quebec City, 10th, 2000 (and in *Optical Amplifiers and Their Applications*, OSA Technical Digest (Optical Society of America, Washington, D.C., 2000), pp. PD6-1) (hereinafter "Samson et al. 2000"); R. H. Stolen, E. P. Ippen, "Raman gain in glass optical waveguides", Applied Physics Letters, Volume 22, Issue 6, pp. 276-278, 1973 (hereinafter "Stolen et al. 1973"); and J. E. Townsend, W. L. Barnes, S. G. Grubb, "$Yb^{3+}$ sensitised $Er^{3+}$ doped, silica-based optical fibre with ultra-high transfer efficiency", Proceedings Materials Research Society (MRS) Symposium Proceedings Optical Waveguide Materials, Eds. M. J. Broer, G. H. Sigel Jr., R. T. Kersten & H. Kawazoe, Boston December 1991, 244 ISSN 0272-9172, pp. 143-146 (hereinafter "Townsend et al. 1973"); which are each incorporated herein by reference.

Improved apparatus and methods are needed to generate high-energy optical pulses.

SUMMARY OF THE INVENTION

The present invention provides increased energy extraction for fiber amplifiers operating in the relatively eye-safe 1565-nm to 1630-nm-wavelength region (called the L-band) of infrared optical signals based on L-band-specific fiber system designs, materials and pumping techniques.

In some embodiments, the present invention provides optical signal amplification wherein the pump-light input to an erbium-doped optical fiber is pulsed (such a system is called pulse-pumped). In some embodiments, the amplifying fiber is a double-clad fiber having an outer cladding (having a relatively low index of refraction, i.e., lower than the index of refraction of an inner cladding), wherein the outer cladding constrains the pump light to propagate only in the inner cladding (having middle index-of-refraction value) and the core (having a higher index of refraction than the inner cladding), and the inner cladding constrains the signal light to propagate only in the core. (Some embodiments use index-of-refraction compositions and/or doping profiles that vary the index of refraction across the outer cladding, the inner cladding and/or core, in order to control the mode profiles for the pump light and/or signal light.) In some embodiments, the signal pulse is applied for substantially the entire duration of the pump pulse, and the system is designed to supply enough pump power and/or to shape the amplitude of the signal pulse, in order to maintain an inversion of the active species (i.e., a sufficient proportion of the erbium atoms are ionized) so as to maintain a substantially constant amplification of the L-band optical signal). If the pump light is applied before the arrival of the signal light, the amount of inversion (i.e., stored power) can build up such that when the signal is launched into the amplifying fiber, the initial portion of the signal pulse is amplified to a greater extent (called "overshoot" which is undesirable for many applications) than are the middle and later portions of the signal pulse. To prevent this, some embodiments delay the application of pump light to the amplifying optical fiber until the start or slightly after the start of the signal pulse.

In some embodiments, the signal pulse is pre-shaped (e.g., starting at an initially low amplitude and then building in amplitude), in order to compensate for a reduction in gain that can occur if an appreciable amount of pump power is stored in the fiber (e.g., if there is a non-negligible inversion remaining from a previous pump pulse, or if the fiber is optically pumped on a continuous (cw) or quasi-cw basis).

In some embodiments, the signal pulse is amplitude modulated within each pulse (e.g., in some embodiments, a sine-wave amplitude modulation is applied, such that the signal will have negligible amplitude between pulses, but the amplitude of at least some of the signal pulses is equal to the product of (a constant (which can be zero) plus a sine wave) times a pulse (the amplitude of which, in various embodiments, is constant, increasing, or decreasing). In some embodiments, the amplitude modulation (e.g., the sine-wave portion) is frequency modulated (i.e., the sine-wave component varies in frequency during the pulse). In some embodiments, the frequency modulation is chirped (e.g., starting at a low-frequency and increasing in frequency for substantially the duration of the pulse). In some embodiments, the chirped amplitude-modulated pulse is used in a LADAR system. In some embodiments, the chirped amplitude-modulated pulse is used in a range-gated imaging system.

In some embodiments, the systems of the present invention are capable of, and do, deliver high energy, (up to and exceeding 20 mJ), long bursts (10-40 microseconds (µs)), of chirped amplitude-modulated radiation (wherein the chirp includes 10 MHz-800 MHz modulation frequencies; i.e., the chirp in one "pulse" starts at 10 MHz and changes frequency in a continuous manner up to 800 MHz) at eye-safe wavelengths in erbium's L-band (e.g., using wavelengths in the range of about 1550 nm to about 1630 nm) with good beam quality ($M^2$<2.8). In some embodiments, a ytterbium-free (Yb-free) double-clad large-mode-area (LMA) erbium fiber in an amplifier configuration operating in the L-band and in particular the far L-band (e.g., some such embodiments operate at a signal wavelength of 1590 nm) is used to enhance the efficiency and energy storage of the fiber optical amplifier. By employing pulse pumping (i.e., providing optical pump light into the fiber amplifier only while extracting power, which can be considered quasi-cw operation depending on the pulse length) the output energy per pulse is increased. Pulse pumping also minimizes ASE and transient-induced Q-switching at low pulse-repetition-rate (rep-rate) operation. Further, by advancing or delaying the start of the extraction pulse relative to the start of the pump pulse by a few micro-seconds (e.g., starting the pump pulse 1 to 10 microseconds before or after the start of the signal pulse, the amount and direction of which are easily determined empirically, such as shown in FIG. 12A-FIG. 12D), pulse steepening (early pulse overshoot/distortion due to stored pump power that increases the amount of gain early in the signal pulse) is minimized or removed, and signal amplification is achieved with excellent fidelity (e.g., the amount of gain remains substantially constant for the duration of the signal pulse).

There have been many reports and products based on pulse amplification in erbium-doped fiber amplifiers, but to date these have been exclusively restricted to the so-called C-band (in the central band of the conventional erbium high-gain window) having wavelengths, between 1535 nm to 1565 nm, which are shorter wavelengths than those of the L-band. While this is partly due to a need or desire for short fiber lengths (a need driven by nonlinearity management), it is also due to a lack of understanding of the inherent energy-storage advantage of L-band amplifiers. Siegman suggests (see, e.g., the book "Lasers" by A. E. Siegman, ISBN-10: 0935702113, University Science Books; New Ed edition (January 1986)) an advantage of a factor of two (2) for using a four-level fiber amplifier versus a three-level fiber amplifier, based simply on the assumption of half the ions being available in a three-level laser and all of the ions being available in a four-level laser. In a fiber amplifier, however, self saturation limits the number of available ions for pulse amplification. When this is accounted for by using the designs of the present invention, an erbium amplifier operating in the extreme L-band can actually produce pulses having ten (10) times the energy of a signal pulse at the peak of the erbium-gain bandwidth. While a greater fraction of the ions are available for amplifying a signal at the gain peak wavelength in a short fiber, the L-band amplifier of the present invention has an advantage because the absolute number of ions involved in amplification can be increased through use of longer fiber. While the long fiber and associated nonlinearities may impose limits on the peak power (measured in watts) that can be extracted or the line-width of the signal, there are applications, such as AM-modulated LADAR, medical treatments and materials processing, where relatively long pulses are useful or even desirable.

Even in the nanosecond-pulse-length (ns-pulse-length) regime, higher energies (measured in joules) can be extracted by designing the system judiciously around an L-band wavelength. In a cladding-pumped system, the clustering losses associated with very high concentrations of an active dopant (e.g., erbium) are mitigated by both the cladding pumping scheme and the off-peak signal wavelength. Hence high-dopant-concentration fibers, conventionally ruled out on efficiency grounds for C-band operation, may compensate for the longer lengths of gain fibers (or relative length in terms of erbium ions) required in L-band amplifiers.

Yb-free fibers based on an alumino-silicate host therefore become the preferred approach for some embodiments of the present invention. While cladding pumping of the C-band signal wavelengths is facilitated by the Yb co-doping in conventional fiber amplifiers, in some embodiments of the present invention, L-band efficiency and energy storage actually benefit from the weak pump rate associated with double-clad fibers. The main benefits, in some embodiments, are inversion flattening and mitigation of clustering-induced pump losses.

An L-band system can be expected to yield perhaps two times (2×) the energy in a nanosecond-pulsed system (i.e., amplifying signal pulses in a range of about 1 ns to about 10 ns) and provide a six-times (6×) advantage in output energy in a long-signal-pulse system (i.e., amplifying signal pulses in a range of about 1 microsecond to about 100 microseconds).

Although the use of the present invention is described for a few specific applications such as AM-modulated LADAR, medical treatments and materials processing, in other embodiments, the present invention provides high-power and/or high-energy laser pulses for any number of other applications that benefit from the high-power IR radiation.

BRIEF DESCRIPTION OF THE DRAWINGS

FIG. 1C is a block diagram of a master-oscillator/power-amplifier (MOPA) system 101 having a master oscillator and a high-power optical amplifier including one or more gain stages each having a pump-laser block and a rare-earth-doped fiber power amplifier.

FIG. 2A is a graph of intensity/amplitude as a function of time of a laser pulse having a square shape, i.e., a substantially constant intensity for the duration of the pulse.

FIG. 2B is a graph of a shaped laser pulse having an amplitude that increases over time.

FIG. 2C is a graph of a laser pulse having a square shape and sine-wave amplitude modulation.

FIG. 2D is a graph of a laser pulse having an amplitude that increases over time and sine-wave amplitude modulation.

FIG. 2E is a graph of a laser pulse having a square shape and chirped-frequency sine-wave amplitude modulation.

FIG. 2F is a graph of a laser pulse having an amplitude that increases over time and chirped-frequency sine-wave amplitude modulation.

FIGS. 12A, 12B, 12C, and 12D are plots of output amplitude versus time showing the effect of changing the pump-pulse lead time (relative to the start of the signal pulse) on signal output pulse profile.

FIG. 25A and FIG. 25B are graphs of pulse distortion ratio and minimum power, respectively, for subsequent output pulses in Stage 2 of the pre-amplifier.

FIG. 26A and FIG. 26B are graphs of pulse distortion ratio and minimum power, respectively, for subsequent output pulses in Stage 3 of the pre-amplifier.

DETAILED DESCRIPTION

Although the following detailed description contains many specifics for the purpose of illustration, a person of ordinary skill in the art will appreciate that many variations and alterations to the following details are within the scope of the invention. Accordingly, the following preferred embodiments of the invention is set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

Figure 1A:
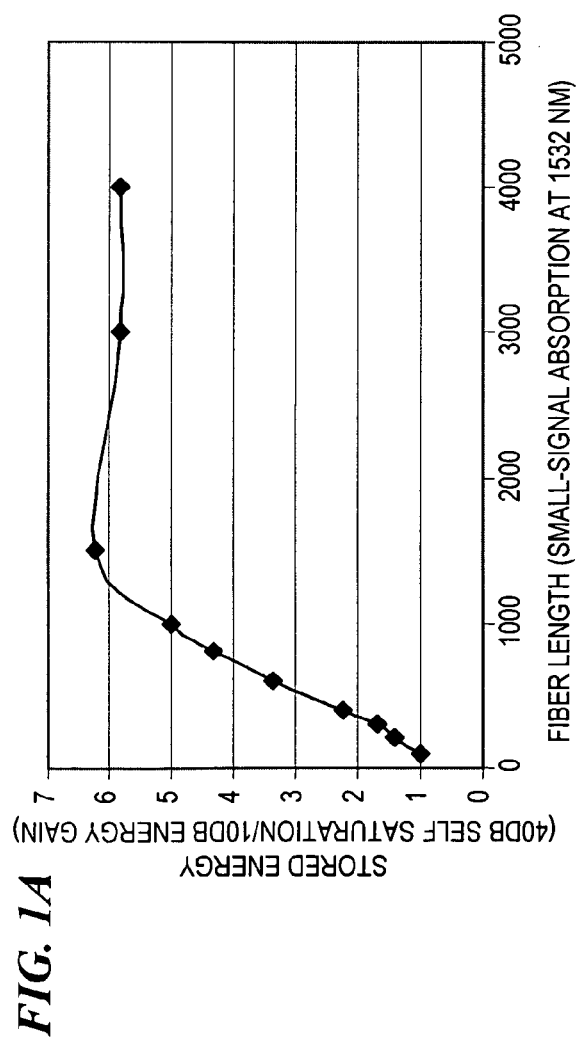
FIG. 1A shows a curve of the extractable energy from an aluminosilicate fiber of core diameter 35 um as a function of fiber length (normalized to small-signal absorption at 1532 nm).

FIG. 1A shows the extractable energy from an aluminosilicate fiber of core diameter 35 micrometers (also denoted as microns or μm) as a function of fiber length (normalized to small-signal absorption at 1532 nm).

Figure 1B:
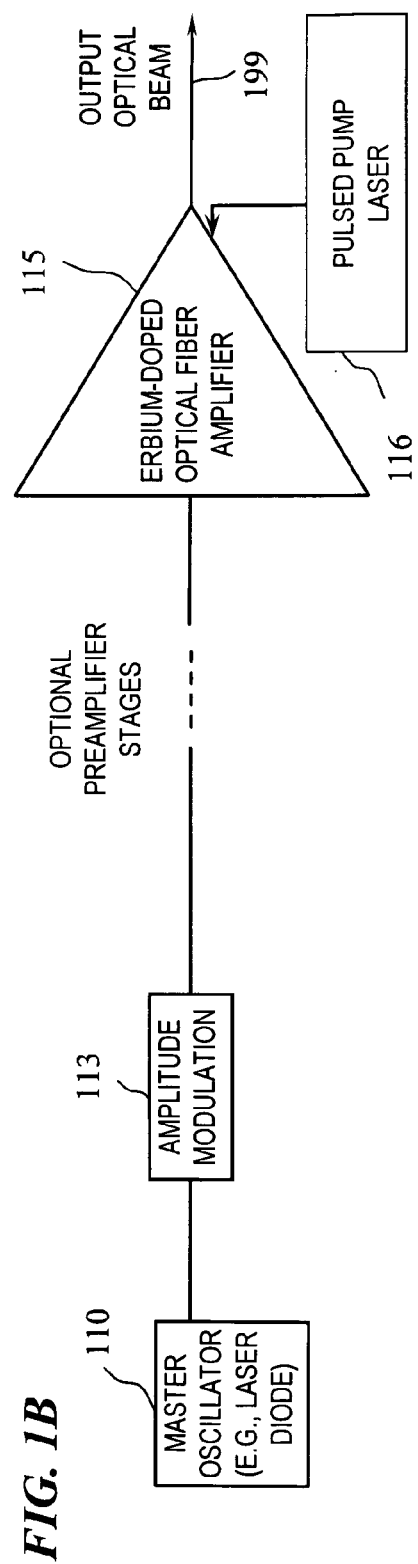
FIG. 1B is a block diagram of a master-oscillator/power-amplifier (MOPA) system 100 having a master oscillator and a high-power optical amplifier including one or more gain stages each having a pump laser and an erbium-doped-fiber amplifier (EDFA).

FIG. 1B is a block diagram of a master-oscillator/power-amplifier (MOPA) system 100 having a master oscillator and a high-power optical amplifier including one or more gain stages each having a pump laser and an erbium-doped-fiber amplifier (EDFA). In some embodiments, system 100 includes a narrow-band master oscillator (MO) 110 that, in some embodiments, optionally includes a narrow-band bandpass filter tuned to the wavelength of interest for the laser signal, and optionally includes a one-way optical isolator. The optical output of MO 110 is optionally modulated by amplitude modulator 113 (in some embodiments, this can be though of as a constant modulation or multiplication by 1), and is amplified by power amplifier 115, to which pump laser 116 provides optical pump power. In some embodiments, the pump laser 116 includes a laser-diode stack whose output is pulsed (e.g., by applying a sufficient amount of input electrical power only during the time when the pump pulse is desired). The amplified signal is output as output optical beam 199.

In some embodiments, a high amount of pump power (e.g., up to several hundred watts or more, e.g., in some embodiments, about 10 W, 20 W, 30 W, 50 W, 75 W, 100 W, 150 W, 200 W, 250 W, 300 W, 400 W, 500 W, 1000 W, 2000 W, 3000 W, 4000 W, 5000 W or more than 5000 W) is supplied by the pump laser system into the amplifying fiber(s) during the entire pump pulse.

In some embodiments, the pump pulse is launched into the EDFA simultaneously with or after the signal pulse starts, and ends simultaneously with or before the signal pulse ends, in order to prevent energy accumulation in the EDFA, which helps maintain a constant amount of gain during the signal pulse. By continuing the signal pulse for a short time after the pump pulse ends, any residual pump energy will be drained into the signal output, which helps prevent build-up of amplified spontaneous emission (ASE) (which is usually considered noise for some embodiments) between signal pulses. Such a configuration is particularly useful for relatively long signal pulses (i.e., pulses lasting several microseconds to several hundreds of microseconds). By starting the signal pulse before the pump pulse is turned on, there is no buildup of pump power (which would cause high gain at the beginning of the signal pulse, and thus result in pulse steepening), and thus the gain will be substantially constant during the time that the pump pulse is on.

In some embodiments, the present invention uses systems, components, and methods as described in commonly owned U.S. Pat. No. 7,260,299 to Fabio Di Teodoro et al., titled "MULTI-SEGMENT PHOTONIC-CRYSTAL-ROD WAVEGUIDES COUPLED ACROSS A FREE-SPACE GAP AND ASSOCIATED METHOD", which issued Aug. 21, 2007, and which is incorporated herein by reference. In some embodiments, the systems, components, and methods as described in U.S. Pat. No. 7,260,299 are modified to use erbium-only doping in large-core fibers and/or photonic-crystal rods (PCRs) and/or photonic-crystal fibers (PCFs), and L-band-wavelength optical signals and/or pump-pulsing as described herein.

In some embodiments, large cores are used in the EDFA of the present invention, which in some embodiments, are multimode cores and in other embodiments, are single-mode large-more-area (LMA) cores in fibers, PCFs, or PCRs as described in U.S. Pat. No. 7,260,299. The large core provides a large amplifying volume, allowing very large pulse energies by presenting very large numbers of ionized amplifying atoms (e.g., pumped erbium ions). Since the amount of gain is reduced by using signal wavelengths in the L-band (or other wavelengths that are not in the central highest-gain (C-band) wavelengths of erbium (or other rare-earth species, if those are used instead)), longer fiber lengths than those typically used for amplifying C-band wavelengths are used if higher gains are desired (e.g., when amplifying very short pulses to high powers and energies).

In some embodiments, a long pump pulse is launched into the EDFA well before and continuing until the signal pulse starts, and ends simultaneously with or slightly before or after the signal pulse ends, in order to obtain energy accumulation in the EDFA, which obtains high gain and puts very high amounts of power (e.g., 1 or more megawatts) into very short signal pulses, due to the high gain during the signal pulse. By using a long pump pulse and a short signal pulse at or near the end of the pump pulse, there is substantial build-up of pump power. Some embodiments include narrow-bandwidth optical filters between each of several stages, and/or optical gating between each of several gain stages to prevent ASE buildup, as described in U.S. Pat. No. 7,260,299.

In order to apply the teachings of the present invention to other wavelengths, some embodiments replace erbium-only doping in the amplifying fiber with doping using another rare-earth element, and use signal wavelengths that are to one or the other side of the peak-gain wavelength of the rare-earth element being used, in order to obtain higher pulse energies (typically measured in joules, where 1 joule=1 watt-second=1 Newton-meter) in wavelengths other than erbium's L-band of wavelengths. Generally, the present invention works better when using a fiber having a core doped with one or another of the rare-earth elements and the fiber amplifier is operating in the L-band of the rare-earth element being used. Thus, in some embodiments, a fiber amplifier with a core doped with thulium is used, and amplifies a signal wavelength in thulium's L-band (i.e., a signal wavelength (e.g., of about 2 microns) that is longer than the wavelength of maximum gain for thulium). In other embodiments, a fiber amplifier with a core doped with ytterbium is used, and amplifies a signal wavelength in ytterbium's L-band (i.e., a signal wavelength (e.g., of about 1.12 microns) that is longer than the wavelength of maximum gain for ytterbium). In still other embodiments, a fiber amplifier with a core doped with another rare-earth element is used, and amplifies a signal wavelength in that rare-earth element's L-band (i.e., a signal wavelength that is longer than the wavelength of maximum gain for that rare-earth element).

In other embodiments, ytterbium-free erbium-doped fibers are used, but are driven with signal wavelengths shorter than erbium's C-band (i.e., signal wavelengths shorter than 1530 nm).

FIG. 1C is a block diagram of a master-oscillator/power-amplifier (MOPA) system 101 having a master oscillator and a high-power optical amplifier including one or more gain stages each having a pump-laser block and a rare-earth-doped fiber power amplifier. In some embodiments, system 101 includes a narrow-band master oscillator (MO) 110, that, in some embodiments, optionally includes a narrow-band band-pass filter (BPF) tuned to the wavelength of interest for the laser signal, and/or a one-way optical isolator 112. In some embodiments, the signal from MO 110 is modulated by amplitude modulator 113 (in some embodiments, this can be though of as a constant modulation or multiplication by 1). The optical output of MO 110 is amplified by preamplifier 115B, to which pump laser 116B provides optical pump power. In some embodiments, additional preamplifier stages are provided. The optical output of the preamplifier stage 115B (and other stages, if included) is filtered by a narrow-band band-pass filter (BPF) 114C and input to power amplifier 115C, which is pumped by pulsed pump laser system 116C, and which outputs pulsed output beam 199. In some embodiments, a controller 111 provides the timing control between the signal pulse (and optionally its amplitude modulation) and the pump pulse(s) launched into preamplifier 115B and/or power amplifier 115C. In some embodiments, pump laser 116B and/or 116C are laser diode assemblies that are driven by pulsed electrical power, such as described in commonly owned Patent Application Publication U.S. 2006 291512A1 by Larry Borschowa, which is incorporated herein by reference. In some embodiments, the shape (i.e., a non-constant amplitude as a function of time) of the electrical current pulse that drives the pump laser diodes of pump laser 116C (and/or 116B) is controlled to output a pump pulse that varies in amplitude as a function of time in order to achieve a desired gain as a function of time (the gain versus time curve), in order to control the shape of the output optical pulse 199.

In some embodiments, as described in U.S. Pat. No. 7,260, 299, each amplifier stage is separated from the next by a "pump block," a monolithic interconnecting unit that includes at least three fiber inlets (one for the output end of an amplifier stage, one for the input end of the next amplifier stage, and one for the output end of the pump-laser delivery fiber), a wavelength-discriminating optical component (for example, a dichroic filter or band-pass filter) that reflects the pump-laser wavelength into the amplifying fiber and transmits the pulse wavelength (or vice versa), and a narrow-band band-pass filter that transmits the pulse wavelength and rejects ASE at other wavelengths than the signal wavelength.

FIG. 2A is a graph of intensity/amplitude as a function of time of a laser pulse having a square shape, i.e., a substantially constant intensity for the duration of the pulse. In some embodiments, the laser-amplifier of the present invention outputs such a pulse whose intensity remains substantially constant for the duration of the pulse. In some embodiments, FIG. 2B is a graph of a shaped laser pulse having an amplitude that increases over time. In the embodiment shown, the shaped pulse is a monotonically increasing pulse (i.e., no since-wave modulation is superimposed on the basic shape). In some embodiments, such a pulse shape is applied to the signal pulse to compensate for a gain-versus-time curve that decreases over time, in order to obtain a square output pulse (e.g., as shown in FIG. 3B).

FIG. 2C is a graph of a laser pulse having a square shape and sine-wave amplitude modulation. In some embodiments, such a pulse is obtained by amplitude modulating (i.e., multiplying) a square pulse (such as in FIG. 2A) by the sum of a constant plus a sine-wave whose frequency is constant over time during the square pulse.

FIG. 2D is a graph of a laser pulse having an amplitude that increases over time and sine-wave amplitude modulation. In some embodiments, such a pulse is obtained by amplitude modulating (i.e., multiplying) a shaped pulse (such as in FIG. 2B) by the sum of a constant plus a sine-wave.

FIG. 2E is a graph of a laser pulse having a square shape and chirped-frequency sine-wave amplitude modulation. In some embodiments, such a pulse is obtained by amplitude modulating (i.e., multiplying) a square pulse (such as in FIG. 2A) by the sum of a constant plus a sine-wave whose frequency increases over time.

FIG. 2F is a graph of a laser pulse having an amplitude that increases over time and chirped-frequency sine-wave amplitude modulation. In some embodiments, such a pulse is obtained by amplitude modulating (i.e., multiplying) a shaped pulse (such as in FIG. 2B) by the sum of a constant plus a sine-wave whose frequency increases over time.

Figure 3A:
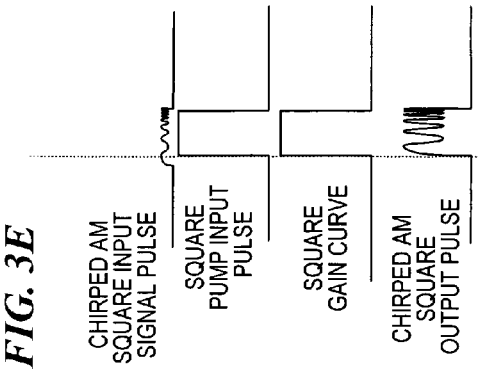
FIG. 3A is a graph of intensity as a function of time of an input laser pulse with a square pulse shape, a pump laser pulse with an intensity as a function of time having a square pulse shape, a graph of laser-amplifier gain as a function of time having a square pulse shape, and an output laser pulse that has a square shape.

FIG. 3A is a graph of intensity as a function of time of an input laser pulse with a square pulse shape (such as shown in FIG. 2A), a pump laser pulse with an intensity as a function of time having a square pulse shape, a graph of laser-amplifier gain as a function of time having a square pulse shape, and an output laser pulse that has a square shape.

FIG. 3B is a graph of intensity as a function of time of an input laser pulse with an amplitude that increases over time (such as shown in FIG. 2B), a pump laser pulse with an intensity as a function of time having a square pulse shape (in some embodiments, this is a long pulse (called quasi-cw), or, in other embodiments, the pump is left always on (cw)), a graph of laser-amplifier gain as a function of time having an initially increasing gain (since energy from the pump pulse is building up because there is no signal during this time period to deplete the pump energy; in some embodiments, the rate of increase in gain drops later in this time period due to population-inversion saturation), the sharply decreasing gain during the amplification as the stored energy is depleted (in some embodiments, this levels off approaching a gain that is equal to the steady-state gain obtained using constant continuous-wave (cw) signal and pump inputs, and finally a gain that continues to decrease after the pump pulse ends, and an output laser pulse that has a substantially square shape if the shape of the signal input compensates for the shape of the gain curve. In some embodiments, there may be some amount of ASE (noise) output after the pulse, which drains the energy remaining in the fiber. In some embodiments, a narrow-band filter (such as a Fabry-Perot etalon) and/or a time gate (such as an acoustic-optic modulator) that blocks optical output after the signal pulse ends are used to block such ASE, if it is not desired.

Figure 3C:
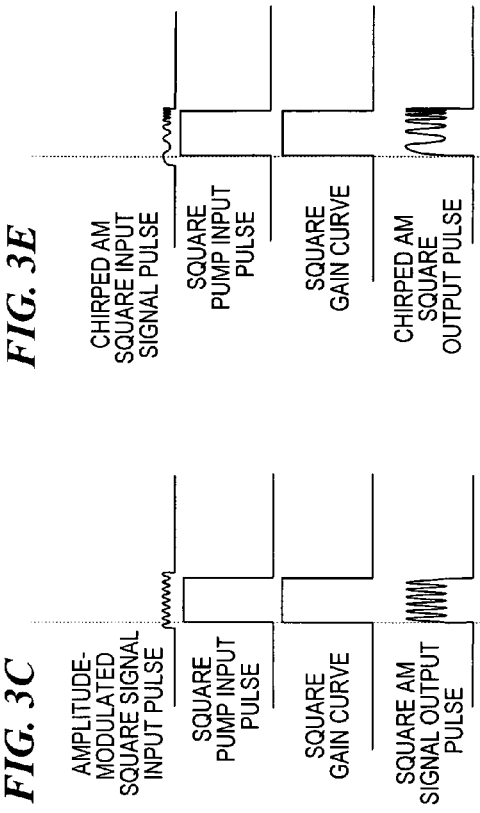
FIG. 3C is a graph of intensity as a function of time of an input laser pulse with an intensity as a function of time having a square shape and sine-wave modulation, a pump laser pulse with an intensity as a function of time having a square pulse shape, a graph of laser-amplifier gain as a function of time having a square shape, and an output laser pulse that has a square shape and sine-wave modulation.

FIG. 3C is a graph of intensity as a function of time of an input laser pulse with an intensity as a function of time having a square shape and sine-wave modulation (in some embodiments, such a pulse is obtained by amplitude modulating (i.e., multiplying) a square pulse (such as in FIG. 2A) by the sum of a constant plus a sine-wave whose frequency is constant over time during the square pulse), a pump laser pulse with an intensity as a function of time having a square pulse shape, a laser-amplifier gain as a function of time having a square shape, and an output laser pulse that has a square shape and includes sine-wave modulation. (Note that in some embodiments (not shown), the gain will modulate slightly with the inverse of the signal sine wave due to the power that is extracted into the signal output acting to reduce the power available for gain. In some embodiments, this gain variation is compensated by adjusting the shape of the signal input.)

Figure 3E:
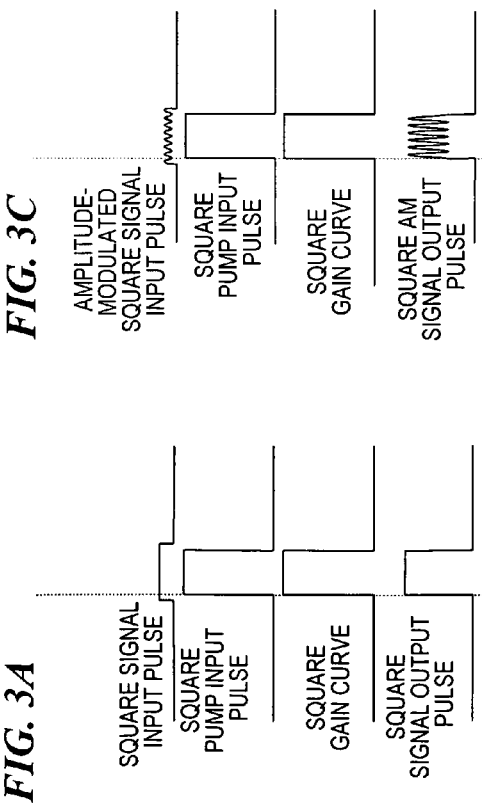
FIG. 3E is a graph of intensity as a function of time of an input laser pulse with an intensity as a function of time having a square shape and chirped-frequency sine-wave amplitude modulation, a pump laser pulse with an intensity as a function of time having a square pulse shape, a graph of laser-amplifier gain as a function of time having a square shape, and an output laser pulse that has a square shape and sine-wave modulation.
Figure 3B:
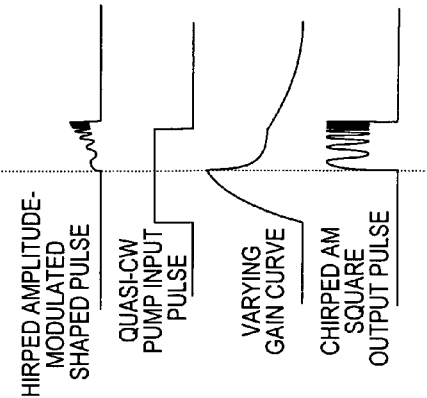
FIG. 3B is a graph of intensity as a function of time of an input laser pulse with an amplitude that increases over time, a pump laser pulse with an intensity as a function of time having a square pulse shape, a graph of laser-amplifier gain as a function of time having an initially increasing gain, the sharply decreasing gain during the amplification, and a gain that continues to decrease after the pump pulse ends, and an output laser pulse that has a square shape.
Figure 3D:
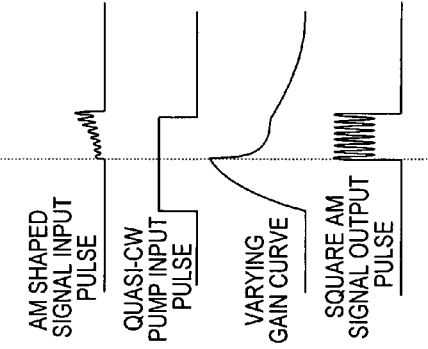
FIG. 3D is a graph of intensity as a function of time of an input laser pulse with an amplitude that increases over time and sine-wave modulation, a pump laser pulse with an intensity as a function of time having a square pulse shape, a graph of laser-amplifier gain as a function of time having an initially increasing gain, the sharply decreasing gain during the amplification, and a gain that continues to decrease after the pump pulse ends, and an output laser pulse that has a square shape and sine-wave modulation.

FIG. 3D is a graph of intensity as a function of time of an input laser pulse with an amplitude that increases over time and sine-wave modulation, a pump laser pulse with an intensity as a function of time having a square pulse shape, a graph of laser-amplifier gain as a function of time as described above for FIG. 3B), and an output laser pulse that has a square shape and sine-wave modulation. In some embodiments, the output laser pulse has a substantially square shape with sine-wave modulation superimposed if the shape of the signal input compensates for the shape of the gain curve. (Note that in some embodiments (not shown), the gain will modulate slightly with the inverse of the signal sine wave due to the power that is extracted into the signal output.) In some embodiments, there may be some amount of ASE (noise) output after the pulse, which drains the energy remaining in the fiber. In some embodiments, a narrow-band filter (such as a Fabry-Perot etalon) and/or a time gate (such as an acoustic-optic modulator) that blocks optical output after the signal pulse ends are used to block such ASE, if it is not desired.

FIG. 3E is a graph of intensity as a function of time of an input laser pulse with an intensity as a function of time having a square shape and chirped-frequency sine-wave amplitude modulation, a pump laser pulse with an intensity as a function of time having a square pulse shape, a graph of laser-amplifier gain as a function of time having a square shape (constant over time during the pulse), and an output laser pulse that has a square shape superimposed by chirped sine-wave modulation.

Figure 3F:
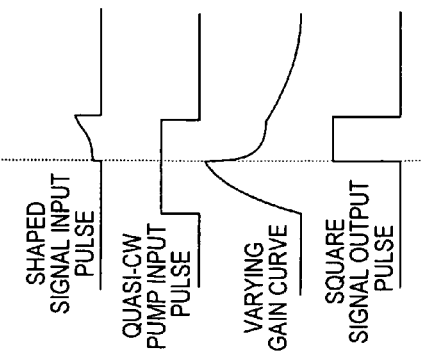
FIG. 3F is a graph of intensity as a function of time of an input laser pulse with an amplitude that increases over time and chirped-frequency sine-wave amplitude modulation, a pump laser pulse with an intensity as a function of time having a square pulse shape, a graph of laser-amplifier gain as a function of time having an initially increasing gain, the sharply decreasing gain during the amplification, and a gain that continues to decrease after the pump pulse ends, and an output laser pulse that has a square shape and chirped-frequency sine-wave amplitude modulation.

FIG. 3F is a graph of intensity as a function of time of an input laser pulse with an amplitude that increases over time and chirped-frequency sine-wave amplitude modulation, a pump laser pulse with an intensity as a function of time having a square pulse shape, a graph of laser-amplifier gain as a function of time having an initially increasing gain, the sharply decreasing gain during the amplification, and a gain that continues to decrease after the pump pulse ends, and an output laser pulse that has a square shape and chirped-frequency sine-wave amplitude modulation. In some embodiments, the output laser pulse has a substantially square shape with chirped-frequency sine-wave modulation superimposed if the shape of the signal input compensates for the shape of the gain curve. (Note that in some embodiments (not shown), the gain will also modulate slightly with the inverse of the chirped signal sine wave due to the power that is extracted into the signal output.) In some embodiments, there may be some amount of ASE (noise) output after the pulse, which drains the energy remaining in the fiber (shown by the decreasing gain after the signal pulse ends). In some embodiments, a narrow-band filter (such as a Fabry-Perot etalon) and/or a time gate (such as an acoustic-optic modulator) that blocks optical output after the signal pulse ends are used to block such ASE, if it is not desired.

The present invention is useful for a number of applications, such as LIDAR (light detection and ranging) and in particular LADAR (laser detection and ranging). Long-distance LADAR requires high-power laser pulses, such as are provided by some embodiments of the present invention. The L-band wavelengths provided by the present invention are particularly attractive for some embodiments of LADAR systems, since much of the L-band radiation is absorbed primarily in the front of the eye, thus preventing it from reaching and damaging the retina. Other uses include materials processing, such as laser-heat treating of surfaces, laser welding, laser ablation, and laser cutting. Still other embodiments include medical treatments, since many human tissues are strongly absorbent in L-band radiation (particularly those tissues that absorb wavelengths of 1.55 to 1.60 microns).

Some embodiments of the present invention utilize low-gain optical-amplifier structures. The fact that these are low gain allows much more energy to be pumped into the active gain medium, such that when a signal pulse arrives, much energy is available. In contrast, when using high-gain media, ASE (amplified spontaneous emission) is readily amplified by high-gain media, and therefore depletes the stored energy before the signal pulse can come in and utilize that energy by being amplified by it.

Our studies demonstrated the viability of 20 mJ energy and 140 W average power targets for modulated pulses of 10-40 microsecond (μs) durations in a double-clad Yb-free erbium amplifier, operating in the L-band and using pulsed pumping. Specifically: pulse pumping enables energy extraction beyond the steady-state energy storage limits while also alleviating pulse distortion under heavy saturation and the parasitic Q-switching common when cw pumped amplifiers are operated at low repetition frequencies. L-band operation (1570-1610 nm), which can be considered as a result of the low peak powers, is more efficient than C-band (1530-1565 nm) operation because of greater pump absorption. L-band amplifiers can store twice the energy of a C-band amplifier for a given pump power. L-band operation also reduces pulse distortion. Pulse distortion can also be controlled by adjustment of fiber length and timing of pump pulses relative to the signal pulses. This timing cannot be adjusted for cw pumping, further validating the pulse pumping approach and ruling out the possibility of maintaining good pulse fidelity with cw pumping for some embodiments. (Other embodiments that use longer fibers to obtain enough gain can use cw or quasi-cw pumping and very short signal pulses (e.g., signal pulses between 1 ns (or shorter that one ns) and less than about 10 ns to avoid SBS) to obtain very high output power (1 MW or more) while using L-band signal wavelengths.) In some embodiments, the necessary gain for certain applications can be achieved in an amplifier using a plurality of gain stages (e.g., a five-stage amplifier in some embodiments) with gain partitioning e.g., at 12 dB per stage, in some embodiments) and increasing core diameter of the fibers from stage to stage. Modulation (e.g., sine-wave nodulation or chirped sine-wave modulation) imposed on the seed signal during the long pulses is shown to be preserved in the amplifier.

Figure 4A:
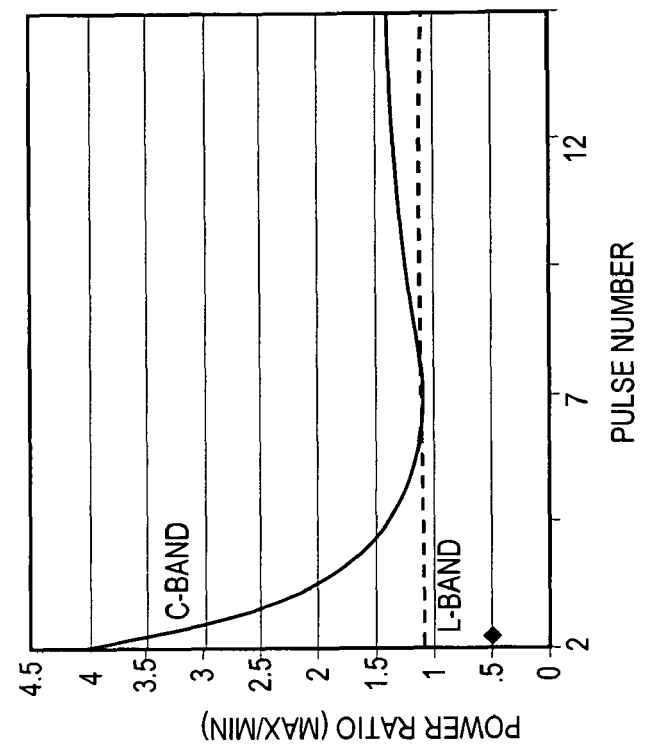
FIG. 4A is a plot of pulse energy versus pulse number for an optimized L-band (25-meter fiber with signal wavelength at 1590 nm, shown as dotted line) compared to a C-band amplifier (10-meter fiber with signal wavelength at 1550 nm, shown as solid line).

FIG. 4A is a plot of pulse energy versus pulse number for an optimized L-band (25-meter fiber with signal wavelength at 1590 nm, shown as dotted line) compared to a C-band amplifier (10-meter fiber with signal wavelength at 1550 nm, shown as solid line).

Figure 4B:
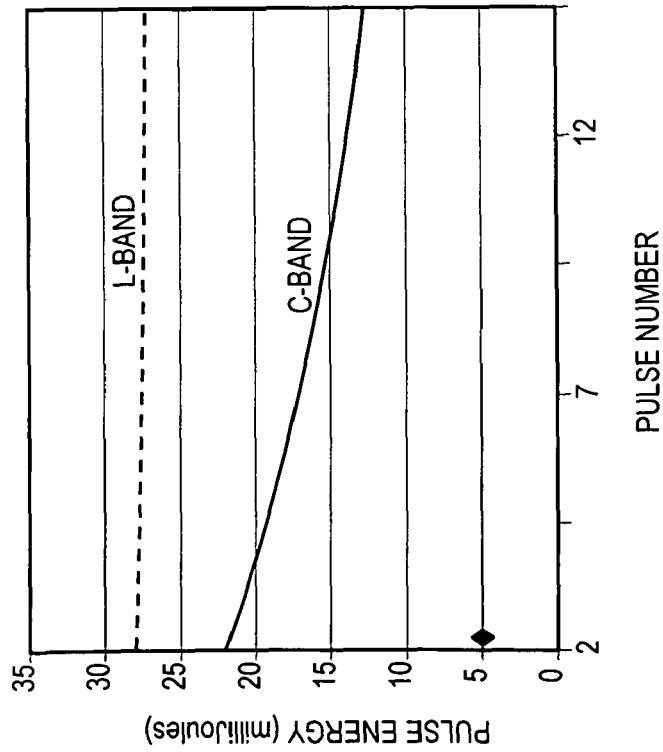
FIG. 4B is a plot of the distortion ratio vs. pulse number for an optimized L-band (25-meter fiber with signal wavelength at 1590 nm, shown as dotted line) compared to a C-band amplifier (10-meter fiber with signal wavelength at 1550 nm, shown as solid line).

FIG. 4B is a plot of the distortion ratio versus pulse number for an optimized L-band (25-meter fiber with signal wavelength at 1590 nm, shown as dotted line) compared to a C-band amplifier (10-meter fiber with signal wavelength at 1550 nm, shown as solid line).

We have found that operation in the L-band is optimum for certain applications in that some embodiments provide more energy. These results are seen in the plot of pulse energy versus pulse number in FIG. 4A and the plot of the distortion ratio versus pulse number in FIG. 4B for an optimized L-band (25-meter fiber with signal wavelength at 1590 nm) compared to a C-band amplifier (10-meter fiber with signal wavelength at 1550 nm). Clearly for some embodiments, L-band operation provides a superior operating point and design baseline for certain embodiments needing high pulse energy and low distortion.

Before reaching this conclusion, several model runs were made with operation at 1550 nm and 10-meter fiber. These results are summarized in FIG. 4A and FIG. 4B as a way of showing how the design evolved and what parameters are important to achieving certain requirements. Further detail is provided in the Modeling Results section below.

Some key specifications of the laser required for the AM modulated high energy LADAR source of some embodiments are listed in Table 1. Our technical approach is to utilize a high-power high-energy, novel large-mode-area, (LMA) erbium fiber in an Yb-free double-clad amplifier. Energy extraction is increased by pulsed pumping. We show by modeling that efficiency and energy storage enhancement is achieved by operating at 1590 nm in the L-band wavelength range. We further demonstrate advantages of the pulse pumping concept. This provides three major benefits, namely (1) removal of pulse distortions at high energy extraction, (2) avoidance of transient induced Q-switching at low rep-rates, and (3) opportunity to overdrive the pump diodes at up to three times the rated power. Before giving detailed modeling results we will explain our rationale behind choosing this approach.

TABLE 1

Key specifications for the Chirped AM modulated LADAR source.

| Parameter | Value |
|---|---|
| Wavelength | about 1480-1600 nm (fixed) |
| Pulse energy | 20 mJ (modulated) |
| Pulse duration | 10-40 µs (fixed) |
| Rep-rate | 100 Hz-7 kHz |
| Average power | 2 W-140 W |
| Beam quality | $M^2 < 2.8$ |
| Bandwidth | <1 nm |

Some embodiments call for record powers and energies at eye safe wavelengths for sources with close to diffraction limited beam quality. To reach eye safe wavelengths, we must employ laser materials that operate directly in the eye safe region or use nonlinear conversion techniques. One of Aculight's commercial products in 1996 was a periodically poled $LiNbO_3$ optical parametric converter for pulsed 1064 nm lasers, and an eye-safe fiber laser heads Aculight's product line today for 3D range-gated imaging. It has been demonstrated that a diode-pumped fiber laser provides twice the efficiency compared with what has been obtained with optical parametric conversion of 1-micron sources. Materials that lase directly in the eye-safe region, such as Er:glass, are possibilities, but have serious limitations in terms of handling the average power conditions and beam quality. We therefore sought an approach based on optical fiber.

The wavelength range of 1480-1600 nm dictates that a fiber-based amplifier should be based on either a trivalent erbium or a thulium rare-earth doped fiber amplifier, or perhaps a Raman fiber amplifier. Thulium amplifiers have been shown to operate with reasonable efficiency in the 1480 nm to 1510 nm region, but due to the need for a low-phonon energy environment to date only fluoride based glasses or other phonon engineered multi-component glasses have been employed (see "Komukai et al. 1995" and "Samson et al. 2000", cited above). These glasses are not considered mature enough for high power applications with the development currently only targeting so-called S-band amplifiers for wavelength-division-multiplexing (WDM) telecom applications at modest power.

Raman amplification is also worthy of consideration (see Stolen et al. 1973 cited above). For example, a high energy high power Yb amplifier operating at 1060 nm could be shifted to the desired wavelength range in a multi-pass Raman amplifier. This would require the development of a 1060 nm laser with power and energy at least four (4) times the specification (to allow for the efficiency of the Raman converter) as well as specially engineered Raman gain fiber, fiber Bragg gratings and pulse synchronization techniques. The complexity, high initial cost and concerns about nonlinearities, such as self phase modulation, stimulated Brillouin scattering and cross-gain modulation, were reasons to reject this approach.

We therefore decided to base our approach on a trivalent erbium-doped silica-based amplifier. This left one major technology decision, namely whether to employ an energy transfer-pumping scheme with Yb co-doping or to directly pump the erbium ions. Our choice was to directly pump the erbium ions. Our reasoning for this is summarized in the following Table 2.

TABLE 2

| Relative merits of Er and Er:Yb double-clad amplifiers | | |
|---|---|---|
| TECHNICAL ISSUE | ERBIUM | ERBIUM/YTTERBIUM |
| Pump wavelength | 976 ± 5 nm | 976 ± 2 nm or 920 ± 20 nm |
| Pump brightness required | High | Low (approx factor 4 lower) |
| Efficiency | Typically >40% | Typically <30% |
| Operating wavelength | 1550-1605 nm | 1535-1615 nm |
| Composition/reproducibility | Alumino-silicate/good | Phospho-silicate/poor |
| Power dynamic range | Limited by pump power only | Also limited by energy transfer |
| Transient performance | Management techniques available | bottlenecking Parasitic giant pulse formation at 1060 nm is a failure mechanism |
| Beam quality | Low NA designs enable differential bend loss modal discrimination | Inherently high NA so beam quality degrades more rapidly with increased core diameter |
| Energy storage | Low NA limits ASE allowing greater storage | High NA increases ASE limiting energy storage |

Some key factors influencing our choice were the better efficiency, higher energy storage and absence of power-limiting energy-transfer bottlenecking (see Townsend et al. 1973). From a manufacturing standpoint, the easier processing of Yb-free compositions is also a factor.

Design of Double-Clad EDFAs

Some embodiments call for average powers close to the highest reported in this wavelength band and pulse energies orders of magnitude higher than previously reported. We first looked at the design tradeoffs for pump absorption and gain of a double-clad EDFA. Erbium amplifiers (see Desurvire, E., *Erbium-Doped Fiber Amplifiers: Principles and Applications*, John Wiley & Sons, 1994) are usually designed to operate either in the C-band between 1530 nm and 1565 nm at an inversion close to 0.63 or in the L-band between 1565 nm and 1605 nm at an inversion close to 0.38. It is also possible to operate in an intermediate band with an inversion close to 0.5. This, as might be expected, gives a gain peak between the C and L-bands at around 1565 nm. With a given fiber type, the L-band amplifier is typically six (6) times longer than a C-band amplifier. The intermediate band amplifier is typically twice as long as a C-band amplifier.

Figure 5A:
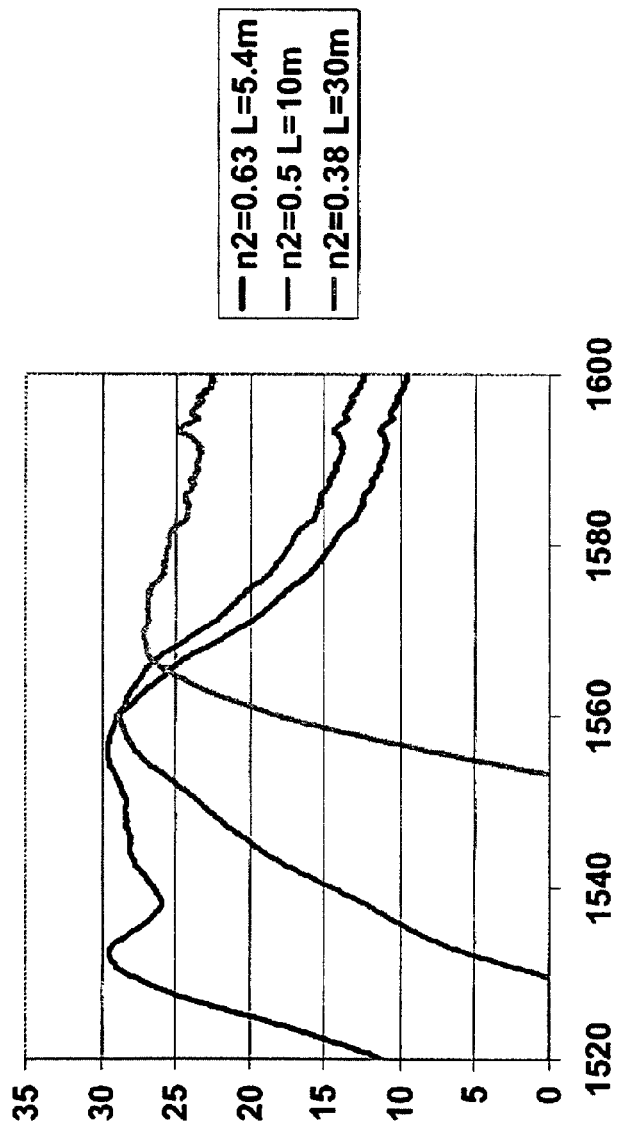
FIG. 5A shows the gain spectra at each of these inversion levels with the length adjusted to achieve 30 dB peak gain.
Figure 5B:
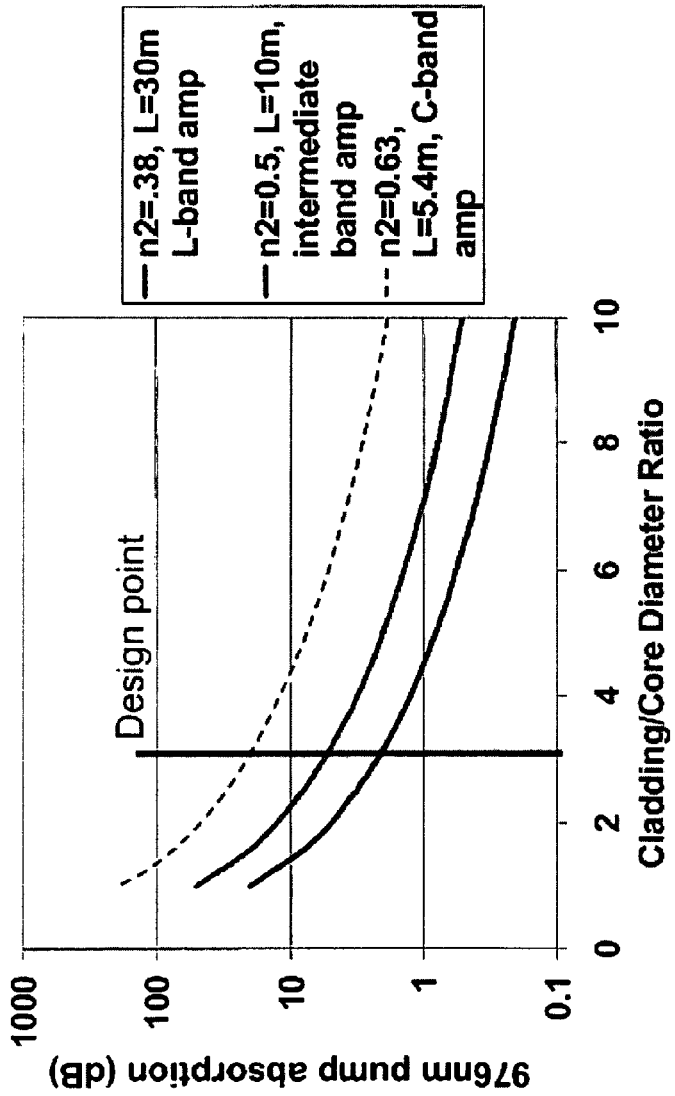
FIG. 5B shows the calculated pump absorption in dB for a double-clad amplifier at each of the three inversions at this gain level as a function of cladding/core diameter ratio.

FIG. 5A shows the gain spectra at each of these inversion levels with the length adjusted to achieve 30 dB peak gain. FIG. 5B shows the calculated pump absorption in dB for a double-clad amplifier at each of the three inversions at this gain level as a function of cladding/core diameter ratio.

It is clear that, from the point of view of efficient pump absorption, a double-clad EDFA operating in the intermediate or L-band will be easier to scale in power because larger ratios of cladding-to-core diameter ratio are permitted. The larger the cladding waveguide, the more multimode power can be coupled into the fiber.

Cladding Waveguide Requirements

The analysis above clearly indicates that a double-clad EDFA should have the smallest possible cladding waveguide dimensions. Of course the waveguide also needs to be large enough to enable coupling of the pump diodes. Our pump waveguide dimensions for the final stage of amplification are therefore driven by the average power requirements at the high repetition rate end of the specification.

At 20 mJ (modulated) pulse energy and 7 kHz rep-rate the average output power is 140 W. In some embodiments, our pump power requirements assume a modest 30% efficiency for approximately 500 W of coupled pump power.

The highest brightness pumps currently available commercially are manufactured by Limo (www.limo-microoptic.com) or Jenoptik (www.jenoptik.com) with candidate sources being 25-30 W pumps coupled to a 105-µm, 0.22 NA fiber or 90-W to 100-W pumps coupled to a 200-µm, 0.22 NA fiber. A bundle of five 100-W pumps should couple efficiently into a 200-µm 0.48 NA fiber, based on the simple principle of brightness conservation. Our design for some embodiments is, therefore, built around a fiber with a 200-µm cladding and a numerical aperture of 0.48.

Energy-Storage Estimates

The energy stored in an amplifier can be approximated by the difference in population inversions between small signal and saturated gains, scaled by the fiber length. An estimate the potential stored energy in each of the three amplifier types in the example is shown in FIG. 3. It was assumed to use a wavelength of 1530 nm in the C-Band, 1565 nm in the intermediate band and 1590 nm in the L-band. The necessary saturated gain of 12 dB was targeted and a typical maximum small signal gain of 40 dB for any wavelength within the band was assumed. The results are summarized in Table 3 for a core diameter of 70 microns. There is clearly an advantage, in some embodiments, of going to the L-band for increased energy storage and providing peak powers that do not cause unwanted nonlinearities. The fiber lengths are based on a peak absorption of 20 dB/m.

TABLE 3

Energy-storage differences for C-band, I-band and L-band amplifiers for a 70-micron-core diameter.

| Wavelength | Fiber Length | Small signal inversion | Saturated inversion | Stored energy |
|---|---|---|---|---|
| 1530 nm | 4 m | 0.75 | 0.565 | 2.8 mJ |
| 1565 nm | 10 m | 0.555 | 0.400 | 4.6 mJ |
| 1590 nm | 25 m | 0.43 | 0.32 | 8.7 mJ |

The gain spectra and corresponding energies reported above are calculated from the average inversion model (see C. R. Giles, E. Desurvire, "Modelling Er-doped fiber amplifiers"; IEEE, JLT. vol. 9, no. 2, p 271, 1991).

$$G(\lambda) = \log(e) \cdot \Gamma \cdot N_0 \cdot L[\sigma_e(\lambda) \cdot n_2 - (1-n_2) \cdot \sigma_a(\lambda)]$$

From this starting point, based around average inversion considerations, we now proceed to a full rate equation-based space and time analysis of the double-clad EDFA.

Transient EDFA Model Description

Our model implements the standard 3-level rate equations (see Desurvire, E., *Erbium-Doped Fiber Amplifiers: Principles and Applications*, John Wiley & Sons, 1994), for the ground state $N_i$, meta-stable state $N_2$, and excited state $N_3$ erbium populations in the EDFA:

$$\frac{dN_1}{dt} = -\left(\frac{\sigma_{a,pump}}{hf_{pump}A_{cladding}}P_{pump} + \frac{\sigma_{a,signal}}{hf_{signal}A_{core}}P_{signal} + \frac{\sigma_{a,ASE}}{hf_{ASE}A_{core}}P_{ASE}\right)N_1 +$$

$$\left(\frac{\sigma_{e,signal}}{hf_{signal}A_{core}}P_{signal} + \frac{\sigma_{e,ASE}}{hf_{ASE}A_{core}}P_{ASE}\right)N_2 + \tau_{21}N_2$$

$$\frac{dN_2}{dt} = \left(\frac{\sigma_{a,pump}}{hf_{pump}A_{cladding}}P_{pump} + \frac{\sigma_{a,signal}}{hf_{signal}A_{core}}P_{signal} + \frac{\sigma_{a,ASE}}{hf_{ASE}A_{core}}P_{ASE}\right)N_1 -$$

$$\left(\frac{\sigma_{e,signal}}{hf_{signal}A_{core}}P_{signal} + \frac{\sigma_{e,ASE}}{hf_{ASE}A_{core}}P_{ASE}\right)N_2 - \tau_{21}N_2 + \tau_{32}N_3$$

$$\frac{dN_3}{dt} = \frac{\sigma_{a,pump}}{hf_{pump}A_{cladding}}P_{pump}N_1 - \tau_{32}N_3$$

Where $\sigma_a$ and $\sigma_e$ are the absorption an emission cross-sections, respectively.

The signal and pump powers are determined by the following equations for pumping at 980 nm, where there is no emission at the pump wavelength. In our model, the pump propagates counter to the direction of the signal propagation.

$$\frac{dP_{pump}}{dz} = -\frac{\sigma_{a,pump}N_1}{A_{eff}}P_{pump}$$

$$\frac{dP_{signal}}{dz} = (-\sigma_{a,signal}N_1 + \sigma_{e,signal}N_2)P_{signal}$$

ASE is included in the model by tracking multiple single-frequency "channels" of ASE, separated in wavelength by $\Delta\lambda$. The channels are modeled in pairs, one channel propagating with the signal and one counter-propagating ASE channel. Each of these channels is determined by the equation:

$$\frac{dP_{ASE}}{dz} = (-\sigma_{a,ASE}N_1 + \sigma_{e,ASE}N_2)P_{ASE} + M\frac{h(\Delta\lambda)c^2}{\lambda_{ASE}^3}\sigma_{e,ASE}N_2$$

Here the term $$\frac{h(\Delta\lambda)c^2}{\lambda_{ASE}^3}$$

represents the power from one photon for that ASE channel and

M represents the number of modes supported by the fiber.

The two sets of differential equations are solved in turn. First the z-dependent equations for the power of the signal, pump and ASE channels are solved, and the powers are updated at each point along the fiber.

After these power levels are determined, they are used to solve the t-dependent rate equations and update the 3 population levels. These population levels are also tracked along the fiber. The updated population levels are then fed back into the z-dependent power equations.

The model uses square wave input for both pump and signal pulses, varying the time between the onset of the pump and signal pulses. Modulated signal pulses can also be considered, though a finer grid of data points must be used to resolve the rapid amplitude oscillations. The main region of gain wavelengths are divided into channels, with ASE power tracked separately for each channel.

In the modeling, the following parameters shown in Table 4 were used to achieve the specifications, unless otherwise specified. The pump level of 1500 W represents a three-times (3×) overdrive on the diode current, but this level of overdrive is not considered a serious risk for short-term diode failure when pumped even at the highest duty cycle called for by this embodiment. At lower repetition rates with pulsed pumping, there will be more time for the system to return to the same inversion levels seen before the new signal pulse arrives.

TABLE 4

Baseline parameters used in modeling (unless otherwise stated).

| Parameter | value |
| --- | --- |
| Core diameter | 70 μm (microns) |
| Cladding diameter | 200 μm (microns) |
| Fiber length | 10 m |
| Index of refraction | 1.45 |
| Pump wavelength | 980 nm |
| Pump absorption cross-section | $3.5 \times 10^{-25}$ m$^2$ |
| Pump emission cross-section | 0 |
| Pump power | 1500 W |
| Pump lead time (before the signal) | 10 μs |
| Signal pulse duration | 30 μs |
| Signal repetition rate | 7 kHz |
| Signal peak input power | 50 W |
| cw signal power (between pulses) | 2 W |
| Signal wavelength | 1590 nm |
| Signal absorption cross-section | $4.06464 \times 10^{-26}$ m$^2$ |
| Signal emission cross-section | $1.38196 \times 10^{-25}$ m$^2$ |
| Er doping concentration | $6.58 \times 10^{24}$ m$^{-3}$ |
| Spontaneous decay lifetime ($\sigma_{21}$) | 10 ms |
| Non-radiative decay lifetime ($\sigma_{32}$) | 30 |

Modeling Results

Our model validated our design plan, demonstrating that it will meet the required specifications for energy and pulse fidelity for certain embodiments. While running the calculations, we identified additional issues and found solutions for these problems.

We initially ran our model to investigate the output pulse shape expected when a square pulse of 50 W peak power and 40 μs duration was input to a 10 m long amplifier with a counter-propagating pump at 1500 W peak power (representing a 3× overdrive of our 500 W of available average power). Although pumping at 1480 nm is more efficient, there are not currently any high-power 1480 nm diodes available. First, we demonstrated that we could achieve the specifications by pumping at 980 nm.

Role of Pump Wavelength

In the initial example, a pump level lifetime of 3 μs (D. L. Harris, J. D. Minelly, S. C. Guy, "Measurement of the multiphonon decay rate from the 4i1 ½ level in erbium-doped silica, silicate, tellurite and fluoride fibers", CLEO, CWK15, San Francisco, May 2000) was assumed based on published data for an alumino-silicate host. Because the pulses are long compared to the $\tau_{32}$ relaxation time, it is possible for the inversion level to stay high even when pumping at 980 nm if sufficiently high pump power is used. For comparison we also looked at pumping at 1480 nm. This turned out to be more efficient but this could be wholly attributed to the smaller quantum defect rather than any limit imposed by the finite pump level lifetime. The results indicated in FIG. 5C show that a steady state can indeed be reached within the pulse duration enabling extraction of the full energy.

Figure 5C:
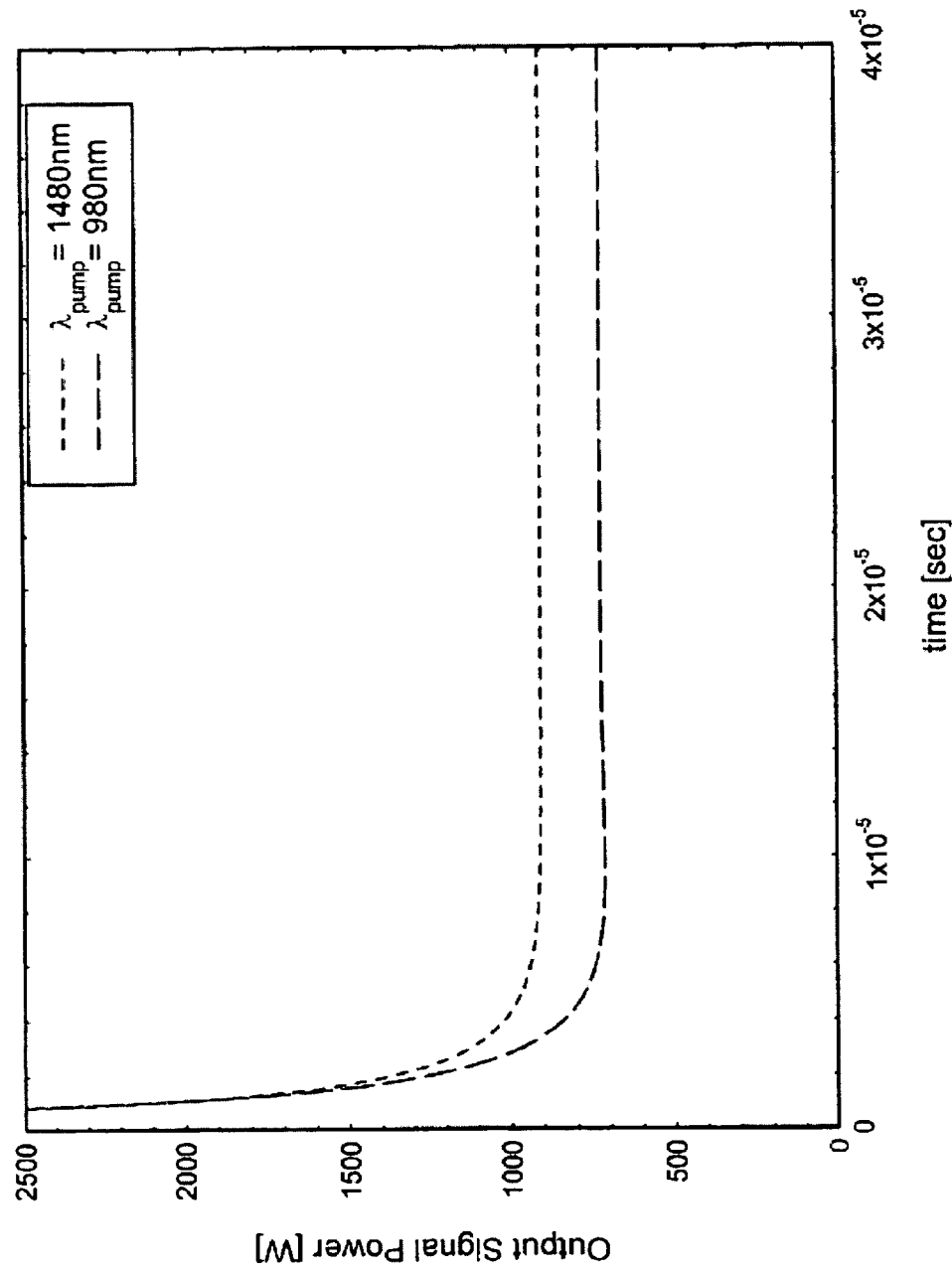
FIG. 5C shows results of 3-level modeling (980 nm pumping) and 2-level modeling (1480 nm pumping).

FIG. 5C shows results of 3-level modeling (980 nm pumping) and 2-level modeling (1480 nm pumping). At 1480 nm the efficiency is higher due to the smaller quantum defect but this result shows the feasibility of 980 nm pumping in a fiber with pump lifetime, $\tau_{32}=3$ μsec.

The Importance of $\tau_{32}$ and the Yb-Free Solution

While the above results show that a $\tau_{32}$ of 3 μsec poses no problem, we looked at the degradation in performance with an increase in this lifetime. The results shown in FIG. 6 indicate that when the pump lifetime becomes comparable to the burst duration the energy that can be extracted drops significantly. This further validates our choice of an Yb-free fiber amplifier rather than an Er:Yb fiber amplifier, because the energy transfer rate from Yb to Erbium in Er:Yb fiber is of the order of the pulse durations. This bottlenecking would prevent pulsed pumping of Er:Yb fibers at the level required in this application. In a Yb-free alumino-silicate fiber, the pump level lifetime is short enough to replenish the gain during the 30 μsec pulse.

Figure 6:
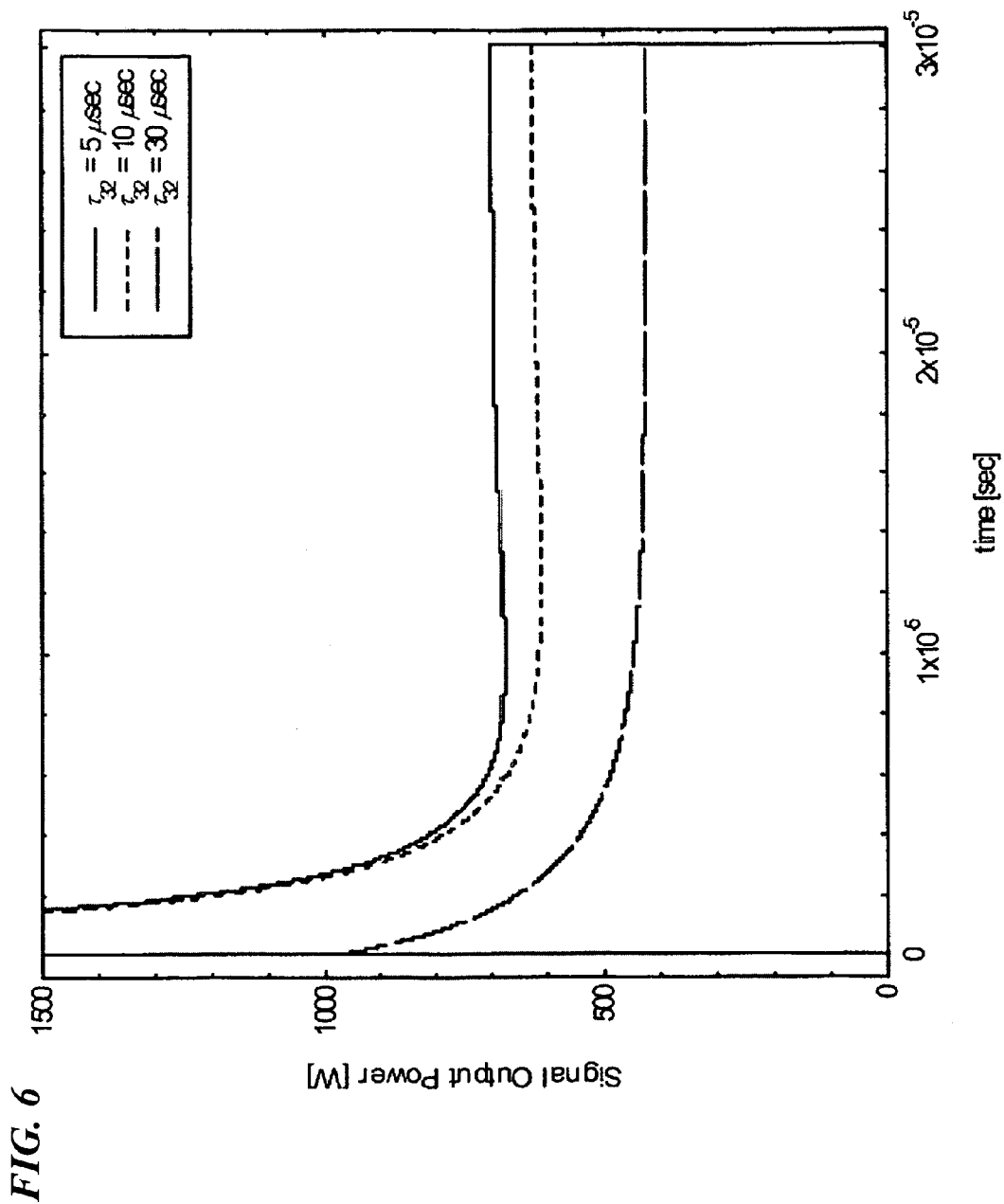
FIG. 6 is a graph that shows degradation in energy extraction with increasing pump level lifetime.

FIG. 6 is a graph that shows degradation in energy extraction with increasing pump level lifetime. If the pump level lifetime $\tau_{32}$ becomes too long, on the order of the length of the signal pulse, the pump cannot repopulate the meta-stable state during the signal pulse. This situation is analogous to an Er:Yb fiber amplifier, where the energy transfer from Yb to erbium will happen to slowly for the gain to recover during the signal pulse.

Pulse Fidelity and Amplification of Modulated Pulses

We expected the amplification to preserve any initial modulation put on the signal, and we completed our first study by confirming this. The input signal was modulated to explore whether the amplified output signal would maintain full depth of modulation. The conditions were the same as in Table 4 except that the fiber length was increased to 25 m. We discovered that increasing the fiber length has other advantages as well.

The modulated signal experiences similar gain to the unmodulated signal while maintaining its depth of modulation. A 70% modulation depth of the input signal was easily reproduced by the amplified output at a variety of modulation rates in the range of interest, from 10 MHz to 1 GHz.

Figure 7:
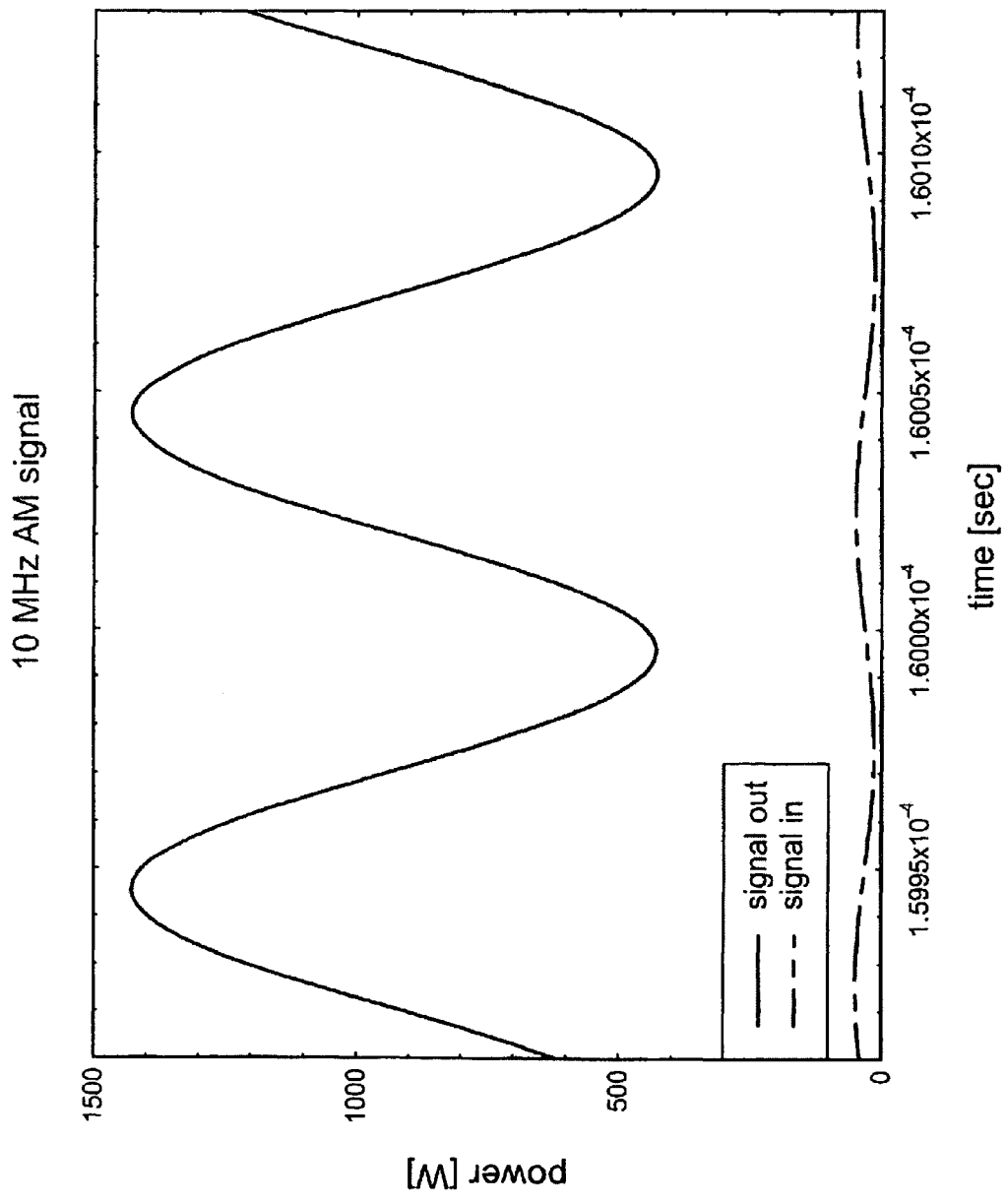
FIG. 7 is a graph of signal input and output power for 10 MHz modulation.
Figure 8:
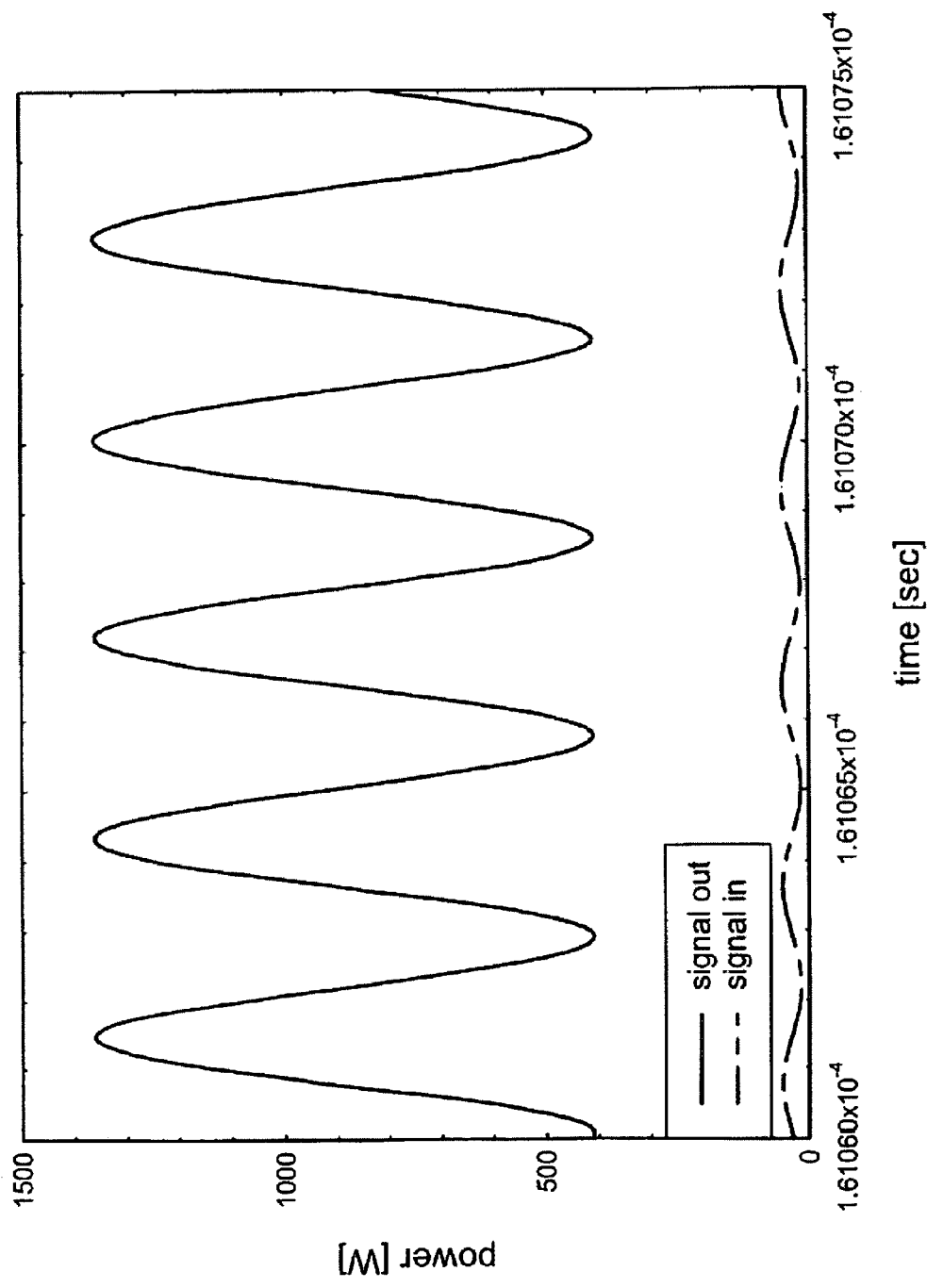
FIG. 8 is a graph of signal input and output power for 350 MHz modulation.
Figure 9:
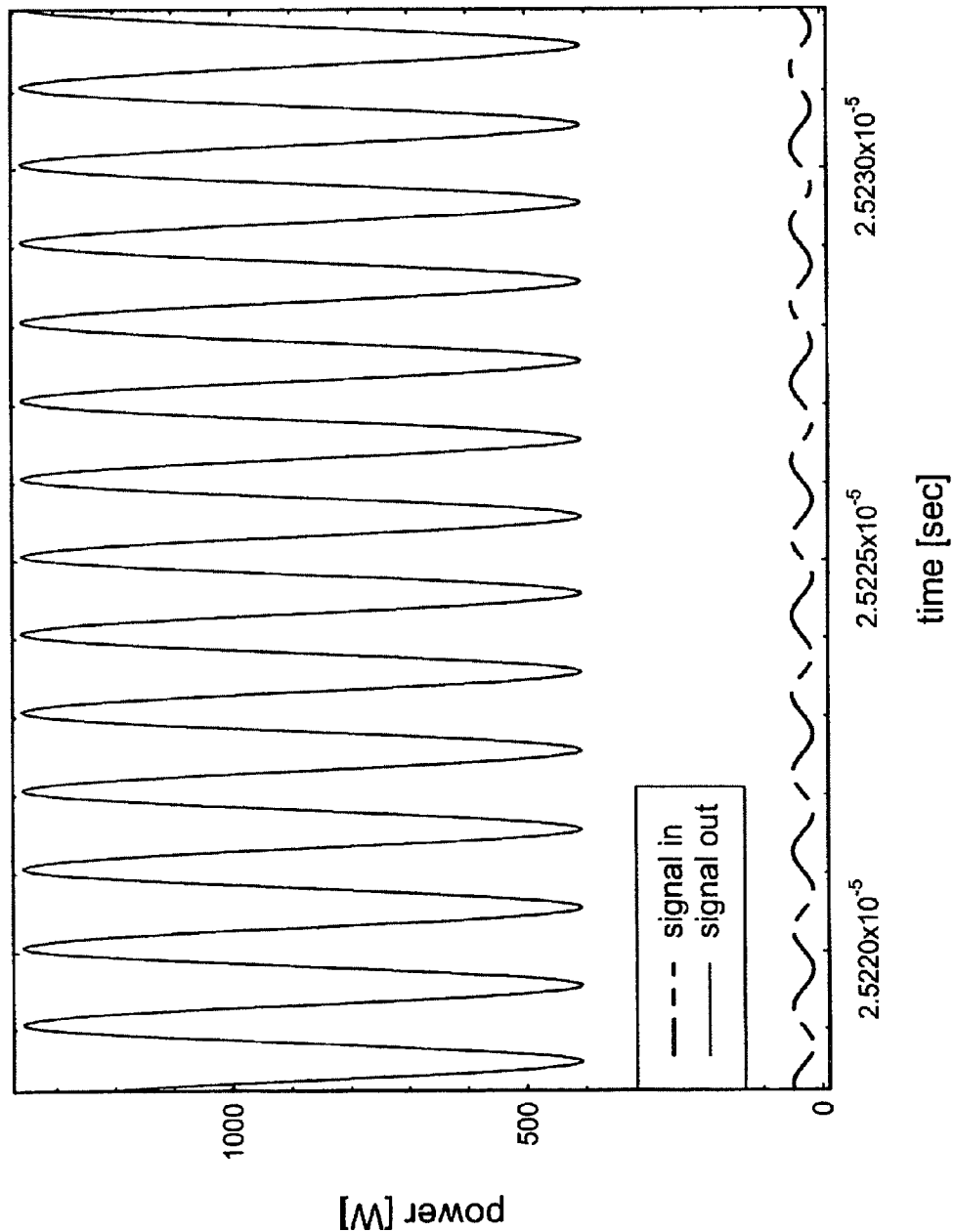
FIG. 9 is a graph of signal input and output power for 1 GHz modulation.

On the graphs of FIG. 7, FIG. 8, and FIG. 9, the peaks in the input signal appear shortly before the peaks in the output signal, due to the time required to travel the 25 m to the other end of the fiber.

FIG. 7 is a graph of signal input and output power for 10 MHz modulation. The output pulse maintains the same 70% depth of modulation as the input signal. As seen in FIG. 7, when the input signal is modulated at 10 MHz, the output signal reproduces this 70% modulation depth.

FIG. 8 is a graph of signal input and output power for 350 MHz modulation. The output pulse maintains the same 70% depth of modulation as the input signal. At 350 MHz modulation at 70% depth in the input signal is reproduced in the output signal as seen in FIG. 8.

FIG. 9 is a graph of signal input and output power for 1 GHz modulation. The output pulse maintains the same 70% depth of modulation as the input signal. Even at 1 GHz modulation, as seen in FIG. 9, the signal out maintains the full depth of modulation and is amplified by a factor similar to the unmodulated pulses.

Additional Issues and Solutions

In the course of validating our design concept, we discovered some issues that can degrade the fidelity of the pulses. We used our model to find solutions to these problems and demonstrate the effectiveness of our solutions.

Initial Pulse Overshoot

If the population inversion is high before the signal comes through, there is a substantial overshoot at the beginning of the signal. This represents a waste of energy and creates a possibility of damage to the system. Various methods were explored to control this overshoot.

The following SOLUTIONS A through E are applied individually or in any combination in various embodiments of the invention.

Solution A: Add Background CW Signal to Deplete Stored Pump Energy

Figure 10:
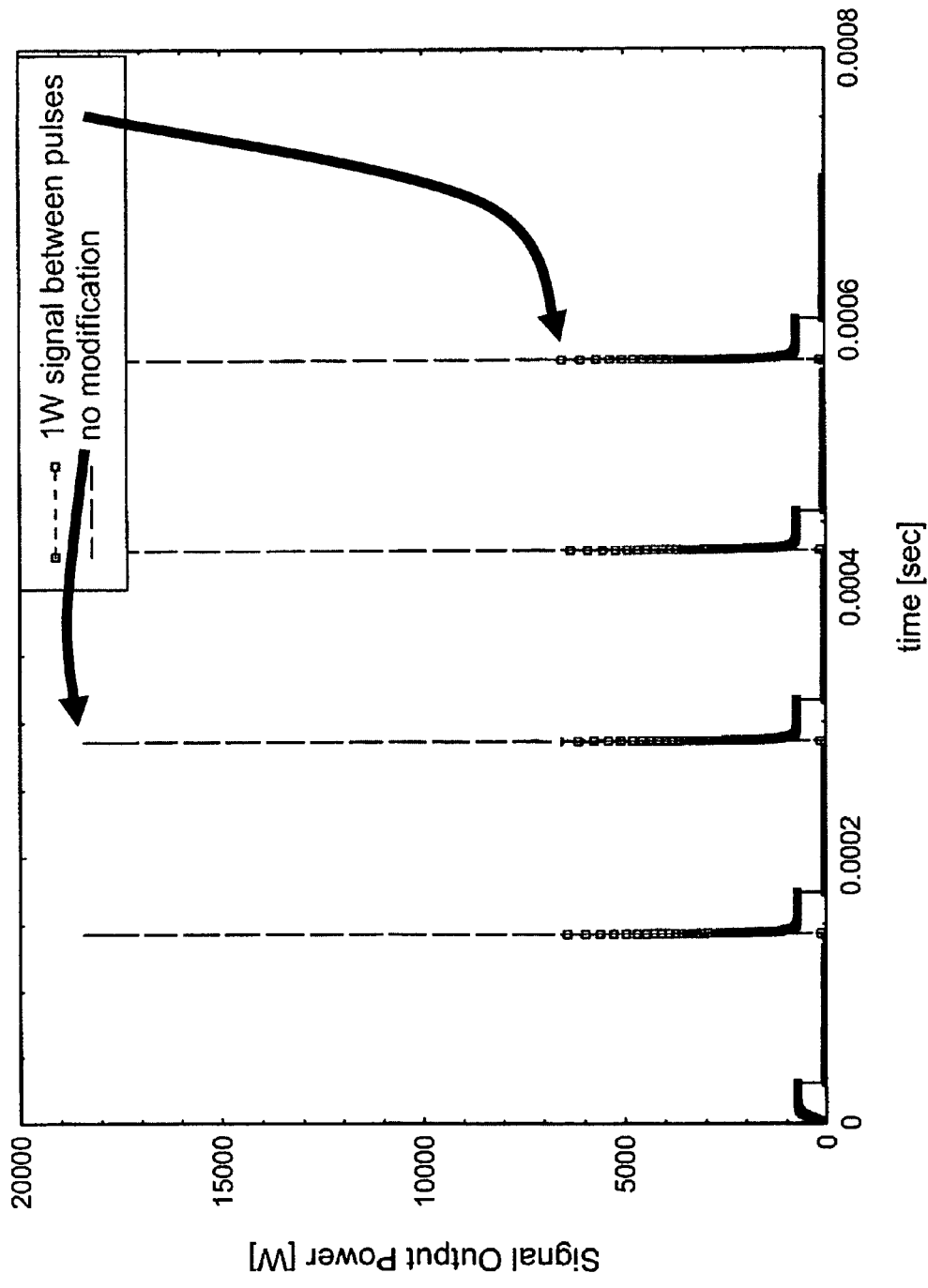
FIG. 10 is a plot of the output amplitude versus time for two types of seed signal, just signal pulses and signal pulses plus a low level of "background" seed signal, the second of which has less overshoot on the leading edge of the output pulses.

FIG. 10 is a plot of the output amplitude versus time for two types of seed signal, and shows the effect of running the signal input at a low level between pulses, as compared to no signal input between pulses (we supplied seed signal only during the square pulses and obtained high spikes at the beginning if each output pulse, then we added seed signal at a low level between pulses to deplete some of the gain before the next pulse). Running just 1 W of signal between pulses reduced the initial overshoot by 67% as indicated in FIG. 10. This result encouraged us to include ASE in the model since its inclusion effectively represents an auxiliary signal. We found the improvement to be even more significant than with only the 1 W signal. Furthermore, the improvement continues with each subsequent pulse. The signal output calculated without ASE and running at 1 W between pulses is compared to signal output power calculated with ASE in FIG. 11. The effect of ASE is to damp the overshoot substantially better than running the signal between pulses. Because of these important effects of ASE all subsequent calculations, including all the Figures presented both earlier and later in this specification, include ASE. All calculations also included the background cw extraction signal run between pulses to reduce the overshoot as well as reducing the gain available to the ASE.

Figure 11:
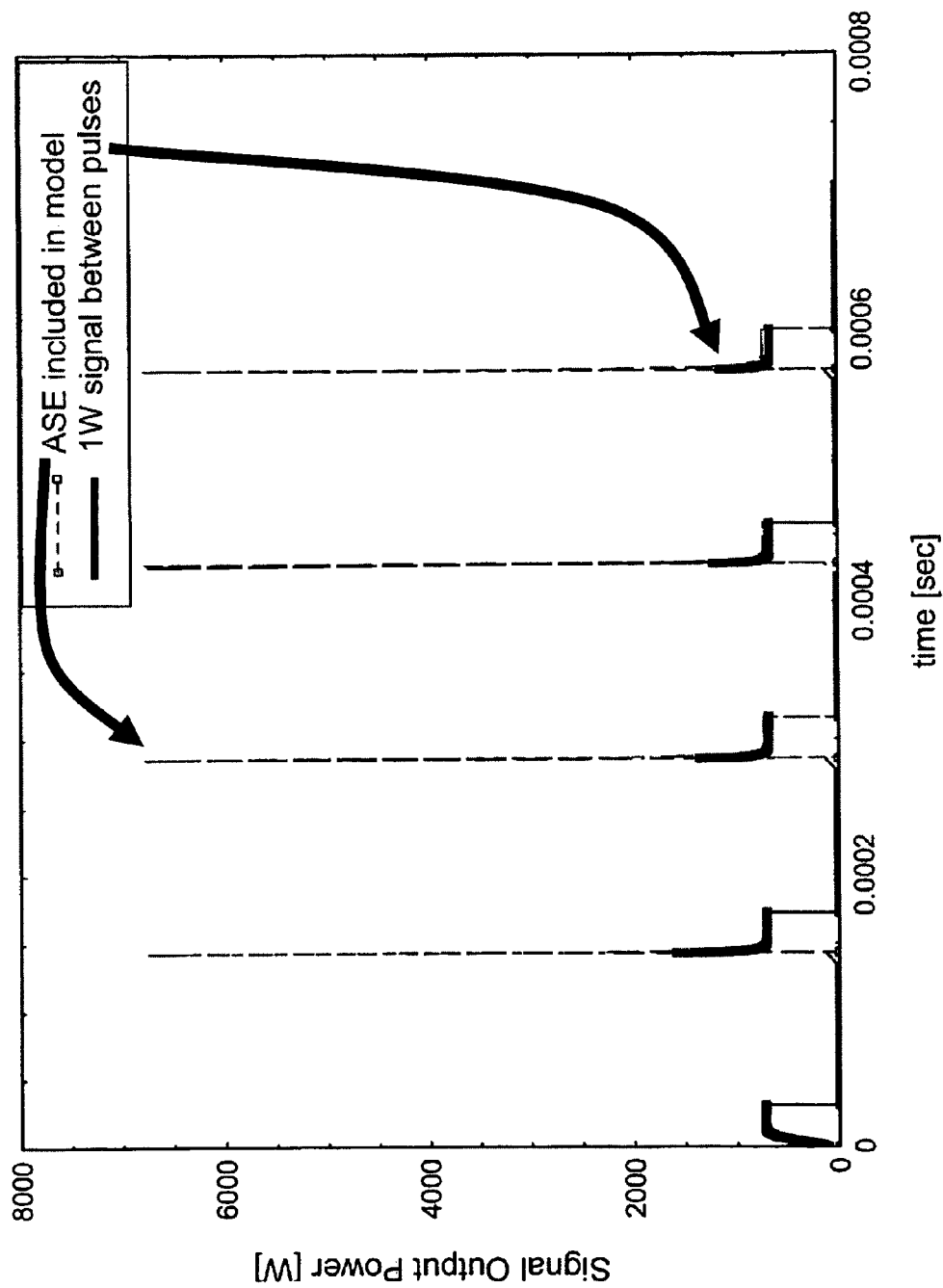
FIG. 11 is a plot of signal output power with the additional effects of ASE included in the model.

FIG. 11 is a plot of signal output power with the effects of ASE included in the model. ASE is more effective than a 1 W seed signal between pulses in reducing the overshoot at the beginning of the pulse.

Although ASE helped us by reducing the initial pulse overshoot, it caused problems in terms of signal extraction energy. These issues are addressed in a later section of this report.

Solution B: Pump Pulse Timing

Various strategies were implemented to decrease the initial pulse overshoot and maintain the square pulse shape throughout the signal pulse. The maximum and minimum power during each signal pulse power were calculated, and their ratio used as a measure of pulse distortion.

One strategy was to turn on the pump later, closer to the beginning of the signal pulse. This prevented as much inversion from building up and avoided the strong overshoot at the beginning of the pulse. When the pulse lead time was decreased from 10 μs to 5 μs, the overshoot decreased. If the pump pulse was not launched far enough ahead of the signal pulse, the gain ramped up slowly during the leading edge of the pulse and less energy was extracted during the course of the pulse. The pulse profiles in FIG. 12A, FIG. 12B, FIG. 12C, and FIG. 12D show this effect.

Figure 13:
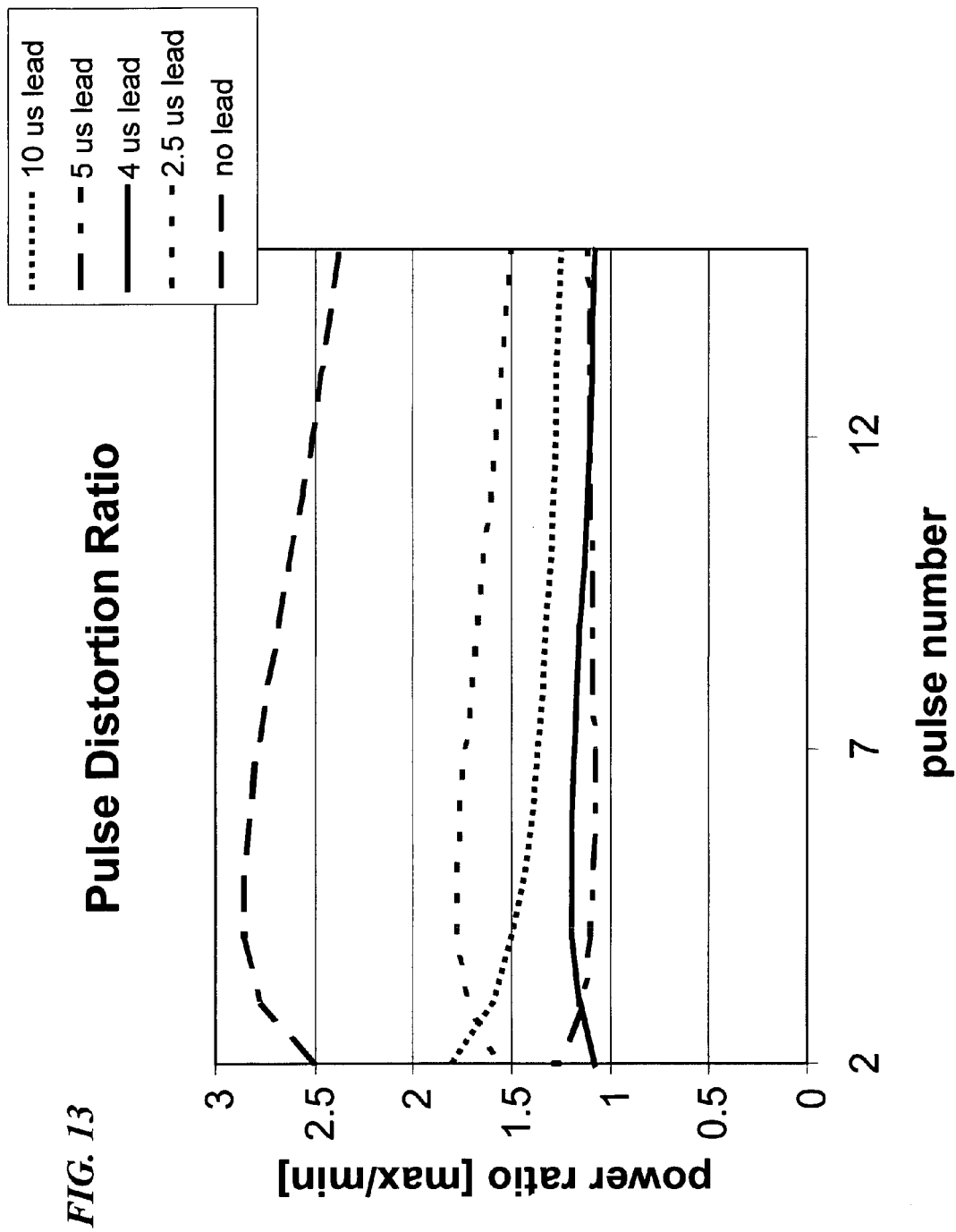
FIG. 13 is a graph showing the effect of pump lead time on signal pulse distortion.

FIGS. 12A-12D are plots of output amplitude versus time showing the effect of pump-pulse lead time (relative to the start of the signal pulse) on signal output pulse profile. If the pump pulse launches far ahead of the signal pulse (5 microseconds or more in this case), there is a marked overshoot. If the pump pulse launches too late (less than about 4 microseconds before the seed-signal pulse starts), the gain ramps up slowly (undershoot) during the signal pulse and not as much energy can be extracted. These figures suggested that for our 10 m fiber, the pump pulses should be launched four microseconds before the signal pulses. FIG. 13 shows that the pulse distortion ratio is smallest for the pump pulse timing.

FIG. 13 is a graph showing the effect of pump lead time on signal pulse distortion. When the pump pulse is launched four microseconds before the signal pulse, the ratio of maximum to minimum power during the signal pulse is close to 1 indicating minimal distortion. While launching the pump too late prevents an overshoot, the signal pulse cannot extract as much energy.

Figure 14:
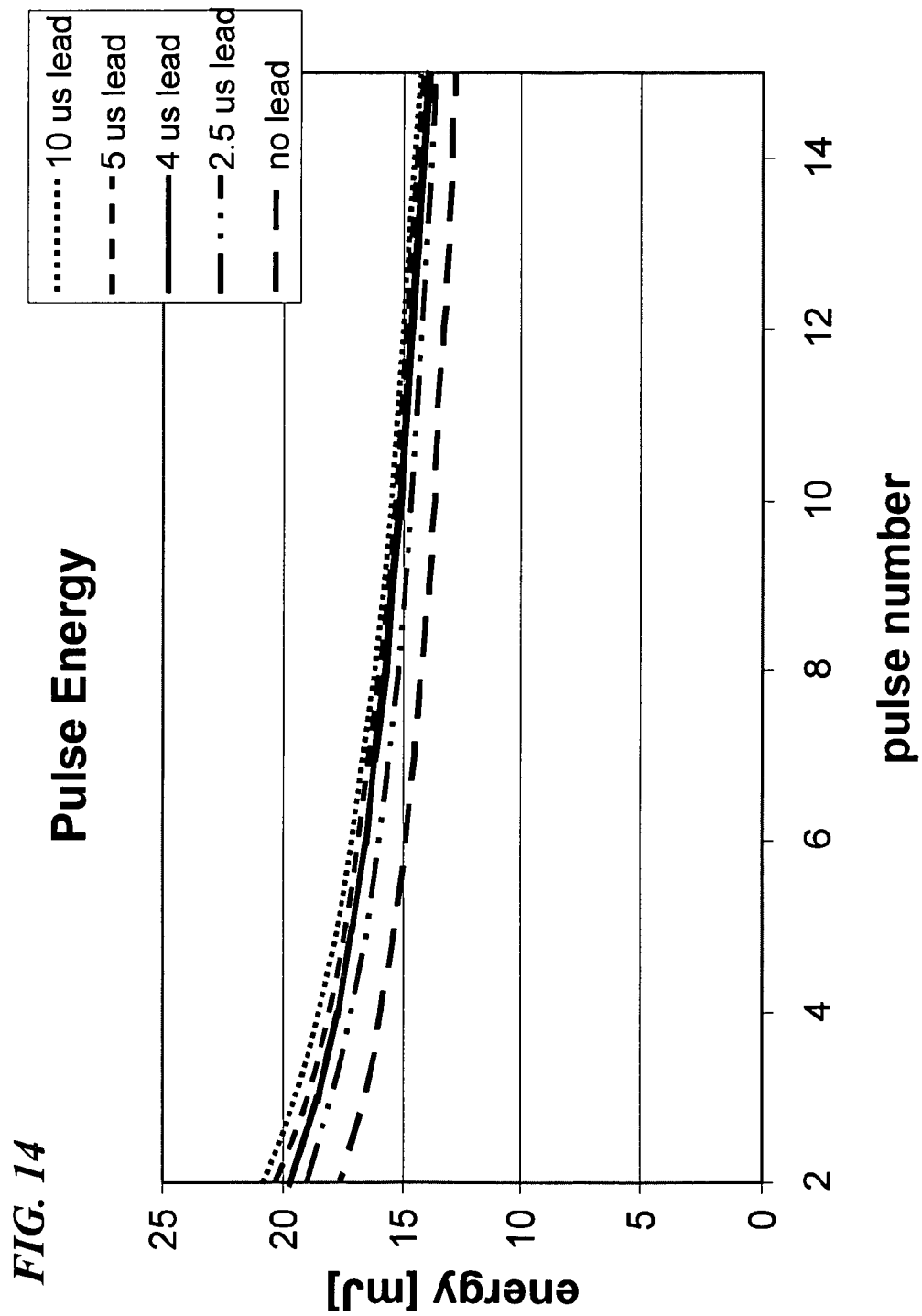
FIG. 14 is a graph showing the effect of pump lead time on pulse energy.

FIG. 14 is a graph showing the effect of pump lead time on pulse energy. When the pump pulse is launched very close to the signal pulse, less gain builds up before the signal pulse so less energy can be extracted. This plot shows that less energy is extracted when the pump is launched later.

Figure 15:
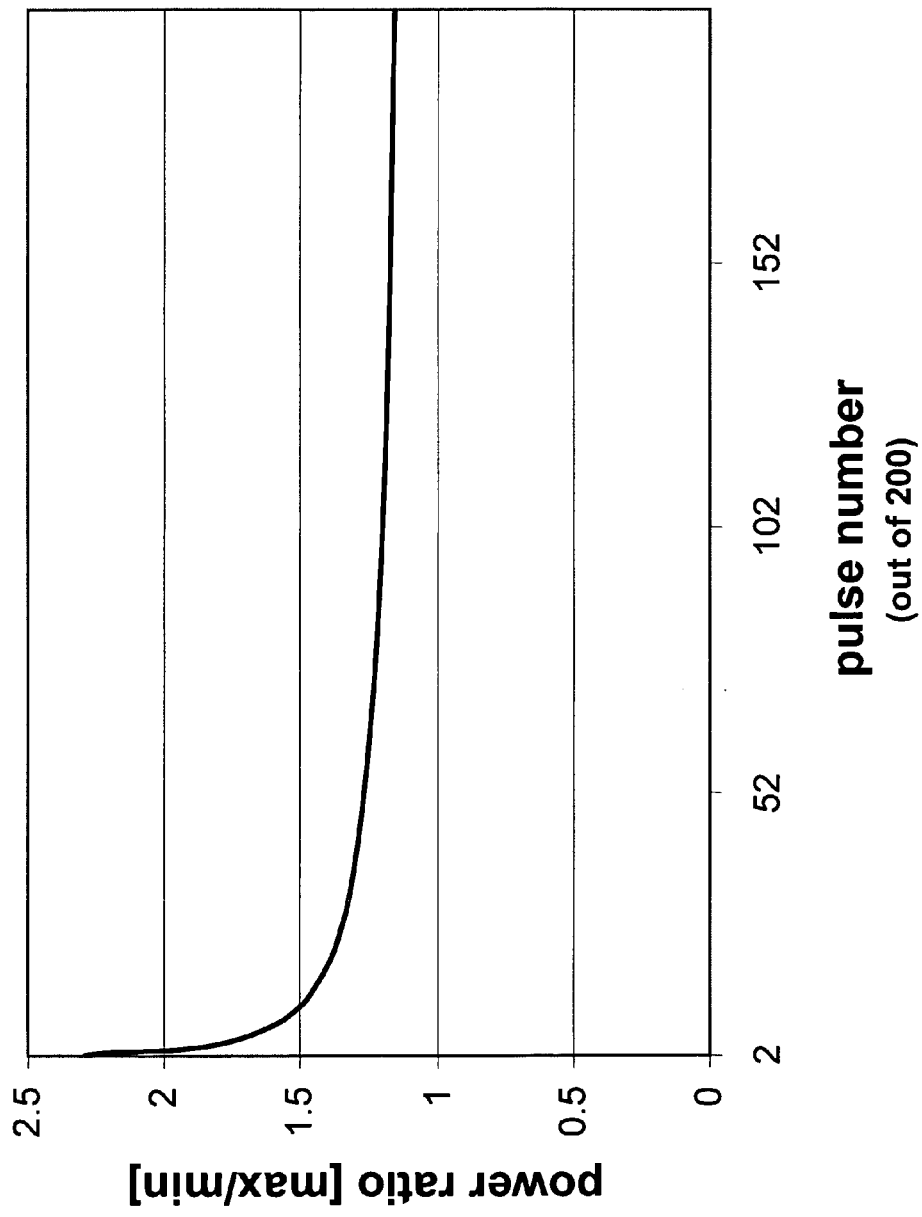
FIG. 15 is a graph that shows the effect of ASE in damping pulse overshoot.

Inclusion of ASE in the model greatly reduces the overshoot at the beginning of the pulse, as can be seen in FIG. 15. The ratio of maximum to minimum signal power in each pulse decreases, approaching unity over time.

FIG. 15 is a graph that shows the effect of ASE in damping pulse overshoot. Over time, the peak signal pulse power approaches only 15% more than the minimum signal power. Inclusion of ASE in the model also reduces the final output power of each signal as the ASE builds up over time. For simulations of many pulses, the signal pulse final output power significantly decreases over time without stopping at some steady-state level, as seen in FIG. 16.

Figure 16:
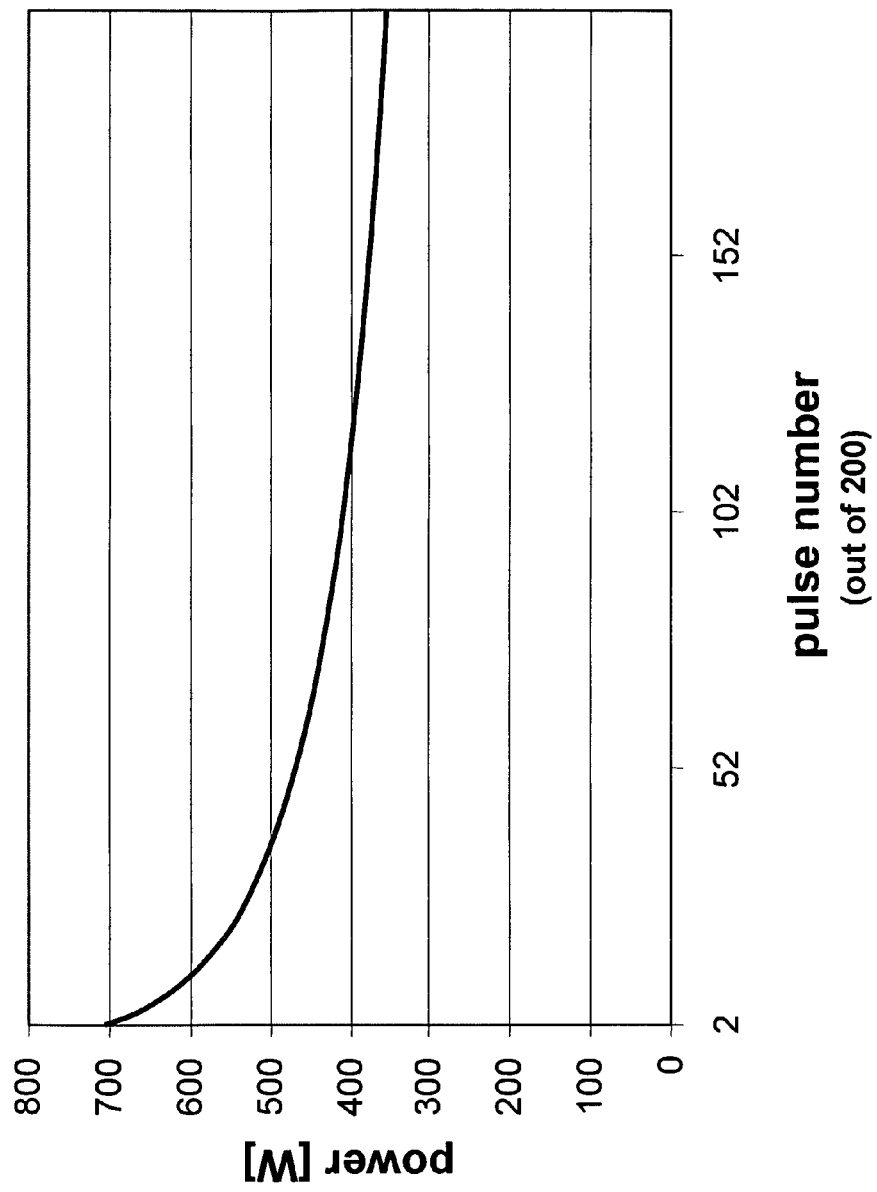
FIG. 16 is a graph showing the decay of final signal pulse power with ASE included in the model.

FIG. 16 is a graph showing the decay of final signal pulse power with ASE included in the model. Though overshoot decays between pulses, ASE build up causes a more rapid decrease in final signal power. We found decreased pulse distortion by going to longer fibers, extracting in the L-band instead of the C-band, and by using pulsed rather than cw pumping.

Solution C: Increase Fiber Length

When operating in the L-band, increasing the fiber length led to more energy extraction and reduced pulse distortion. As expected, more energy was extracted from the 25 m fiber than from the 10 m fiber. (Conventional C-band EDFAs use relatively short fibers (i.e., about 10 m or shorter) in order to reduce non-linear effects, and can do so because of the greater gain of erbium in the C-band.) We found decreased pulse distortion by going to longer fibers. When we moved to a longer fiber, we got better energy extraction and reduced pulse distortion by launching the pump later, 3.5 microseconds before the signal pulse rather than 4 μs before the signal pulse. Results for both pump lead times in the 25 m fiber are show in the figures below.

Figure 17:
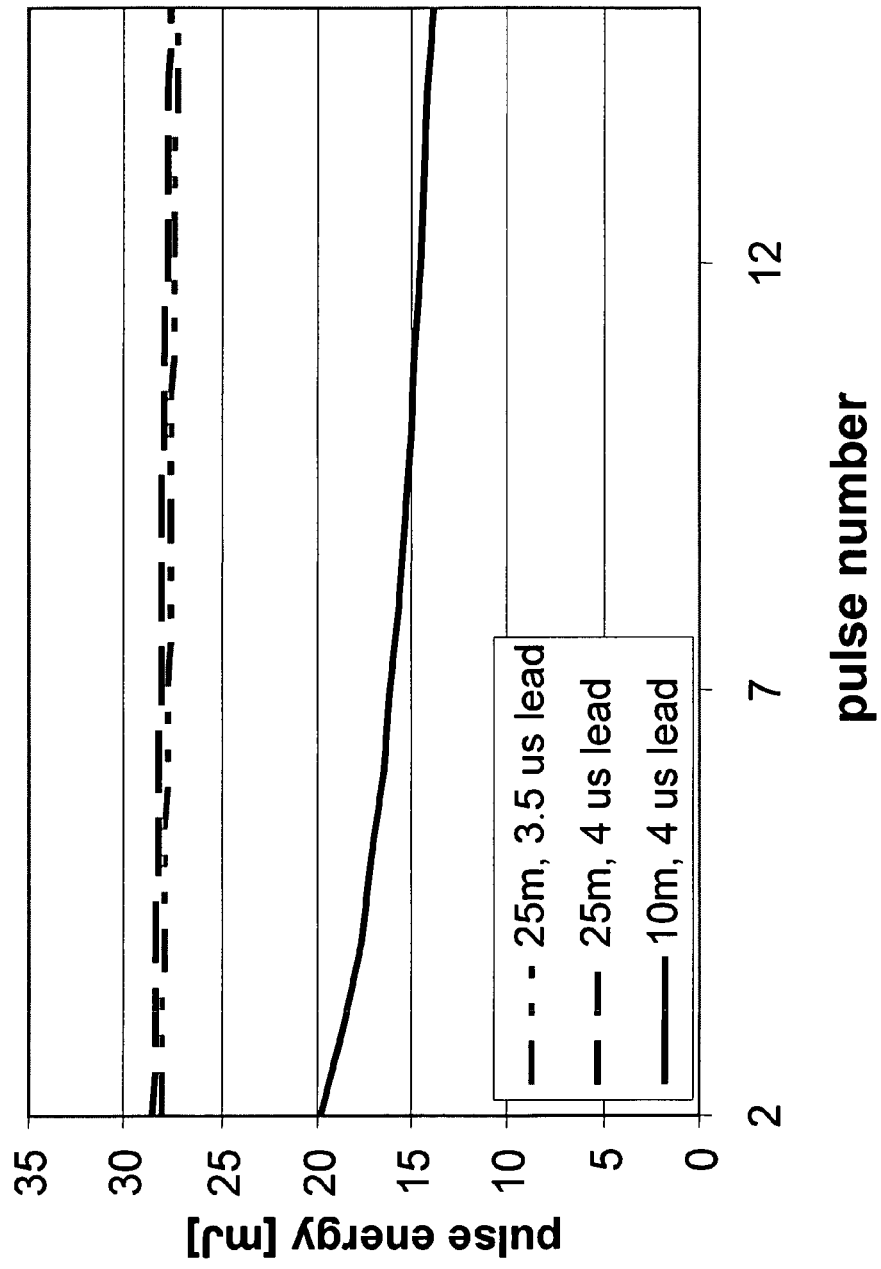
FIG. 17 is a graph that shows that increasing the fiber length from 10 m to 25 m improves the energy extraction.

FIG. 17 is a graph that shows that increasing the fiber length from 10 m to 25 m improves the energy extraction. For L-band extraction (1590 nm), the longer fiber also allows extraction of more energy and more amplification for the signal. Decreasing the pump lead time to 3.5 μs in the 25 m fiber did not have a significant impact on the pulse energy. Switching to a longer fiber, when operating at 1590 nm, has no impact on pulse distortion.

Figure 18:
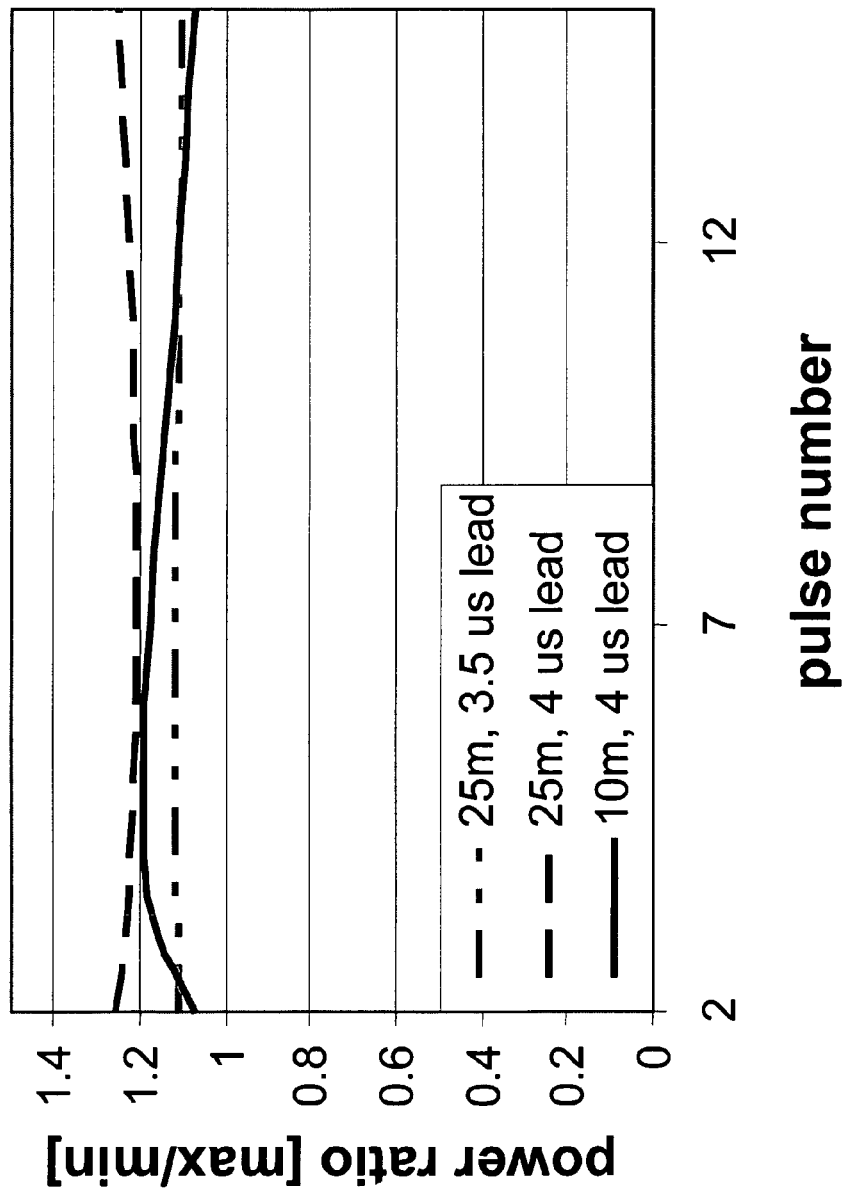
FIG. 18 is a graph showing that minimal pulse distortion can be achieved in the L-band in both 25 m and 10 m fibers by adjusting the pump pulse lead time.

FIG. 18 is a graph showing that minimal pulse distortion can be achieved in the L-band in both 25 m and 10 m fibers by adjusting the pump pulse lead time. In the 25 m fiber with a 3.5 μs pump lead time, the signal pulse distortion ratio is small and stable.

Solution D: Use L-Band Operation Rather than C-Band Operation

Using a longer fiber operating in the L-band at 1590 nm gives far better output power than using a shorter fiber with extraction in the C-band at 1550 nm. The model was run at 1550 nm with a variety of lengths and pump lead times, using those strategies to get the best results in terms of pulse distortion. The design parameters used for best results in each band are summarized in Table 5.

TABLE 5

Best-case parameters used for L-band and C-band operation

| Parameter | L-band | C-band |
| --- | --- | --- |
| Signal wavelength | 1590 nm | 1550 nm |
| Fiber length | 25 m | 10 m |
| Pump lead time (before the signal) | 3.5 μs | 40 μs |
| Signal peak input power | 50 W | same |
| cw signal power (between pulses) | 2 W | same |
| Pump power (pulsed) | 1500 W | same |

Figure 19:
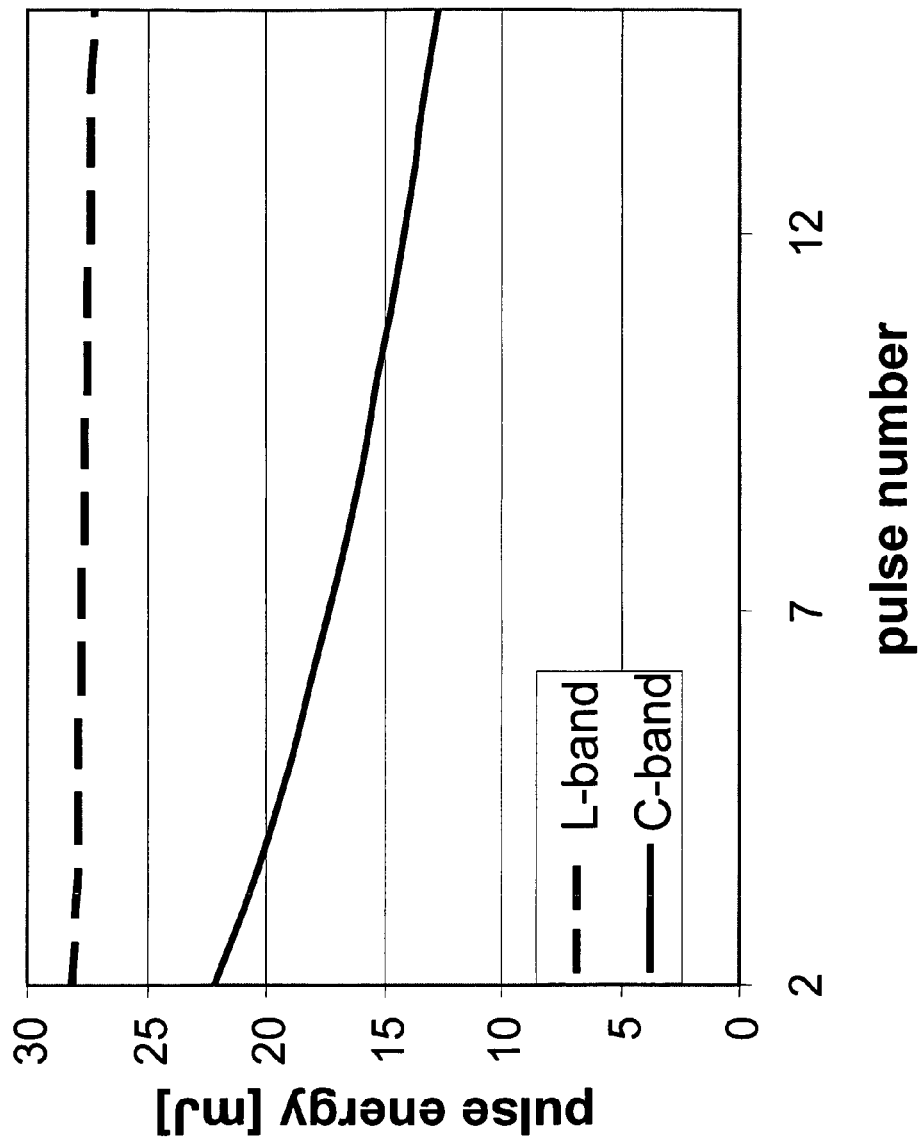
FIG. 19 is a graphical comparison of L-band (1590 nm) and C-hand (1550 nm) energy extraction, showing the energy per pulse for the second through $15^{th}$ pulse of a series of pulses.

FIG. 19 is a graphical comparison of L-band (1590 nm) and C-hand (1550 nm) energy extraction, showing the energy per pulse for the second through 15$^{th}$ pulse of a series of pulses. Operation in the L-band leads to greater pulse energy. FIG. 19 shows that more energy is extracted in the L-band than in the C-band, even using the same pump conditions. This agrees with the earlier steady-state energy storage estimates that show more energy can be stored in the L-band than in the C-band.

Figure 20:
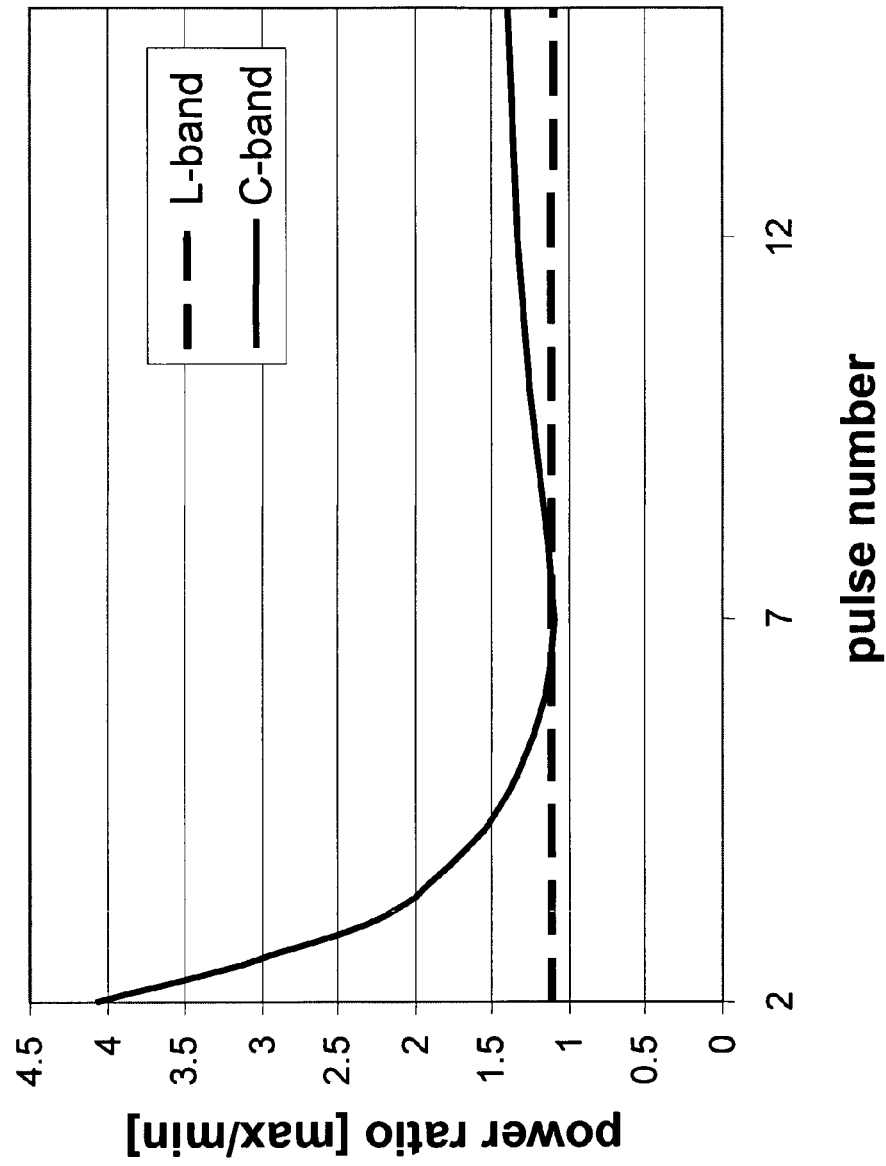
FIG. 20 is a graphical comparison of L-band (1590 nm) and C-band (1550 nm) pulse distortion, showing operation in the L-band produces less pulse distortion.

FIG. 20 is a graphical comparison of L-band (1590 nm) and C-band (1550 nm) pulse distortion. Operation in the L-band produces less pulse distortion.

In summary, operating in the L-band at 1590 nm and using a long (about 25 m) fiber results in reduced pulse distortion and higher energy extraction compared to C-band operation.

Solution E: Use Pulse Pumping Rather than CW Pumping

We also investigated the limits of cw pumping for our fiber structure. To explore the role of cw vs. pulsed pumping, the model was run with a cw pump power input of 500 W rather than a pulsed input of 1500 W. This would correspond to a 500 W cw pump overdriven by a factor of 3× when pulsed pumping is used. Though the signal was able to extract quite a bit of energy from the fiber with cw pumping, there were clear drawbacks. The cw pumping was modeled in a 25 m fiber, with L-band extraction (1590 nm) with a 50 W peak power extraction pulse and 2 W cw extraction signal running between signal pulses.

Figure 21:
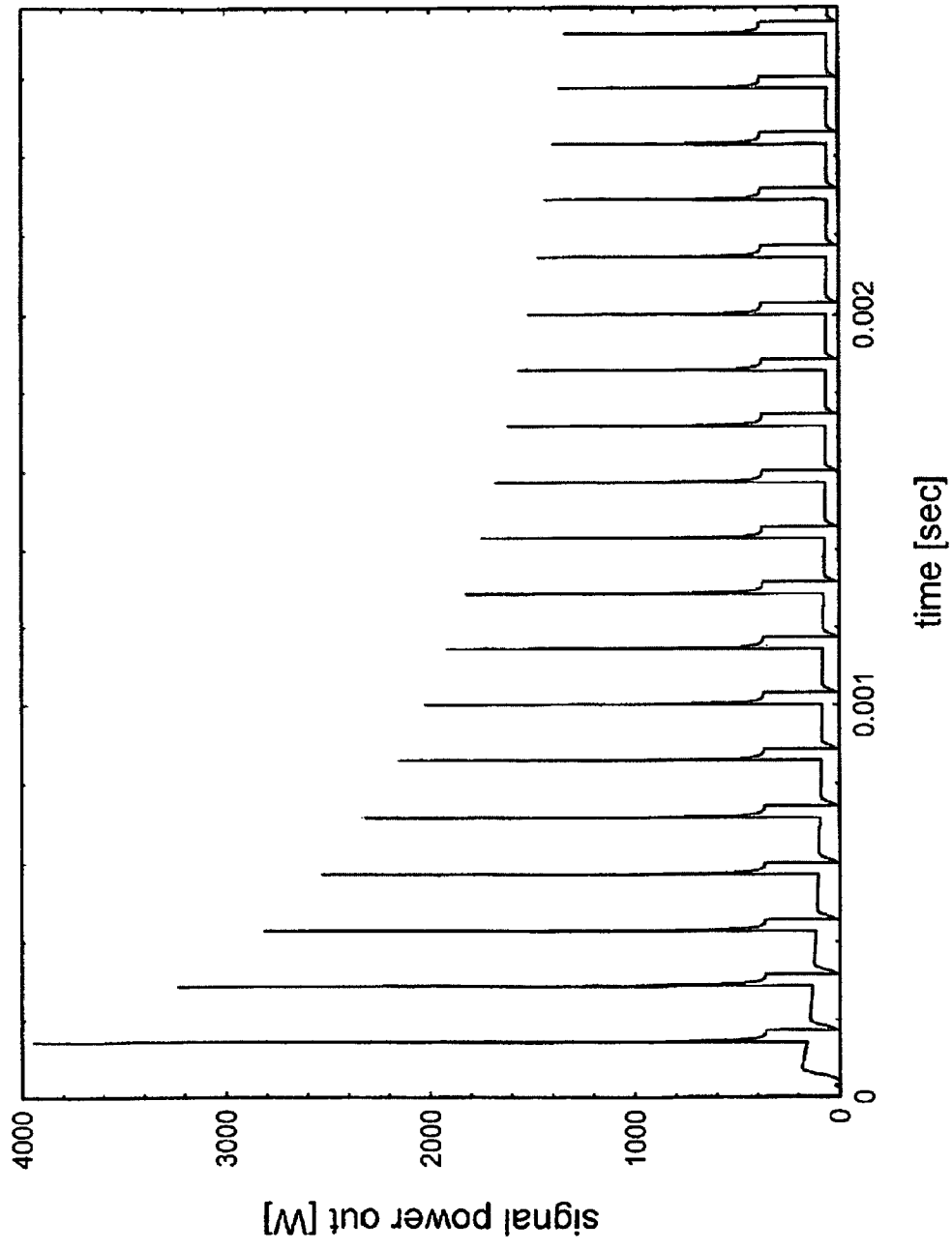
FIG. 21 is a plot of signal output amplitude as a function of time for a series of pulses with cw pumping at 500 W, and square-wave seed pulses.

FIG. 21 is a plot of signal output amplitude as a function of time for a series of pulses with cw pumping at 500 W, and square-wave seed pulses. The pulse shape is highly distorted (due to the high gain available at the start of the pulse because of stored pump power), with the overshoot damped out only as the overall pulse energy decreases. The signal was substantially distorted from the square wave input, as seen in FIG. 21. The leading edge of the pulse had a large overshoot, and the pulse settles down to a lower power than the levels found with pulse pumping at the same average power. This larger overshoot is consistent with our earlier results which showed that turning the pump on later, relative to the signal pulse, decreases the overshoot at the beginning of the signal pulse. The pulse distortion can also be measured by looking at the pulse distortion ratio, as in FIG. 22, of maximum pulse power to minimum pulse power. With cw pumping, this ratio is far larger than for any of the pulse pumped runs shown in FIG. 13, or even the C-band operation in FIG. 20.

Figure 22:
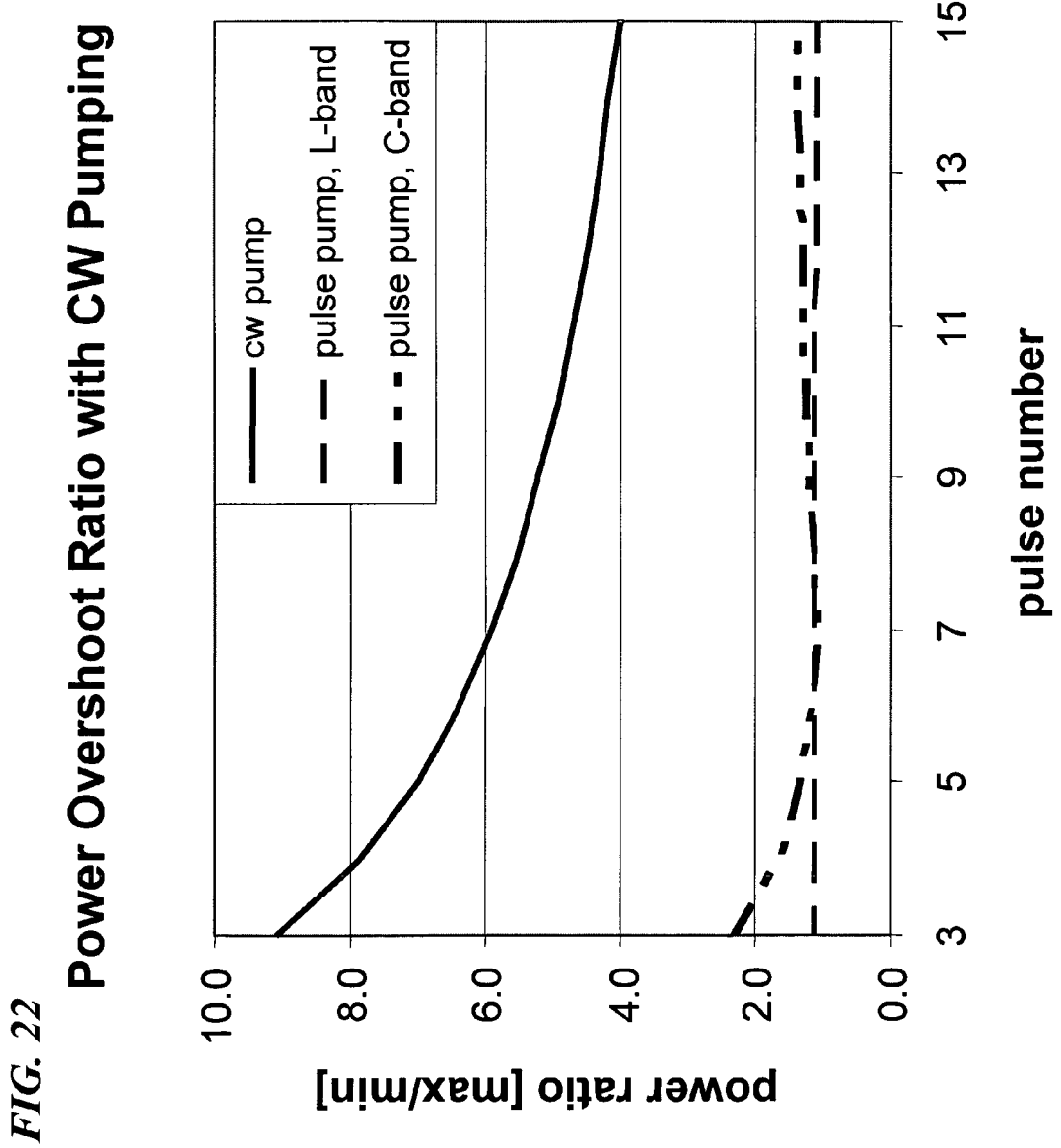
FIG. 22 is a graph of pulse distortion ratio for cw pumping.

FIG. 22 is a graph of pulse distortion ratio for cw pumping. With cw pumping, the ratio of the initial peak signal output power to the lower final signal power level is 3-4 times larger than it would be for a pulsed pump, operating in either the L-band or the C-band. Using cw instead of pulse pumping has disadvantages in terms of energy extraction. Though the model predicts good pulse energy at the start, problems arise as the system runs for longer times and the overall pulse energy decreases over time. Because the pump is never turned off, the ASE builds up between pulses. This comparison of pulse energy between the cw pumping and the L-band case in FIG. 23 shows that not only does the pulse pumping lead to greater energy extraction.

Figure 23:
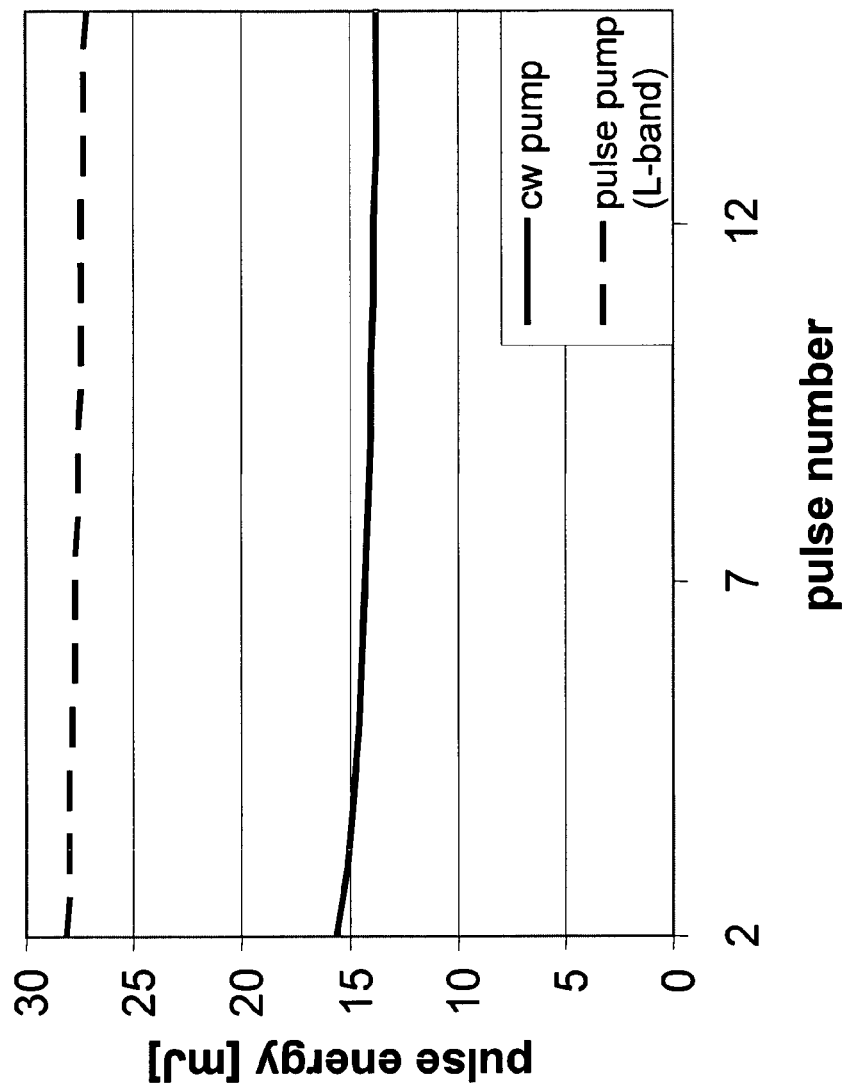
FIG. 23 is a graph of pulse energy under cw versus pulsed pumping.

FIG. 23 is a graph of pulse energy under cw versus pulsed pumping. The pulse energy decreases substantially from one pulse to the next with cw pumping. Because the pump is never turned off,' there is more time for ASE to build up. The energy extraction predicted here is nevertheless slightly better than the predictions made in Table 3 based on average inversion. This is largely due to the simplifications made in arriving at a steady-state analysis for cw pump and extraction, compared to our modeling of transient dynamics necessary for extraction via pulses. The 40 dB self-saturation assumption made for the calculations in Table 3 is also an approximation that is not needed when solving the time-dependent 3-level rate equations.

Amplifier Design

Figure 27:
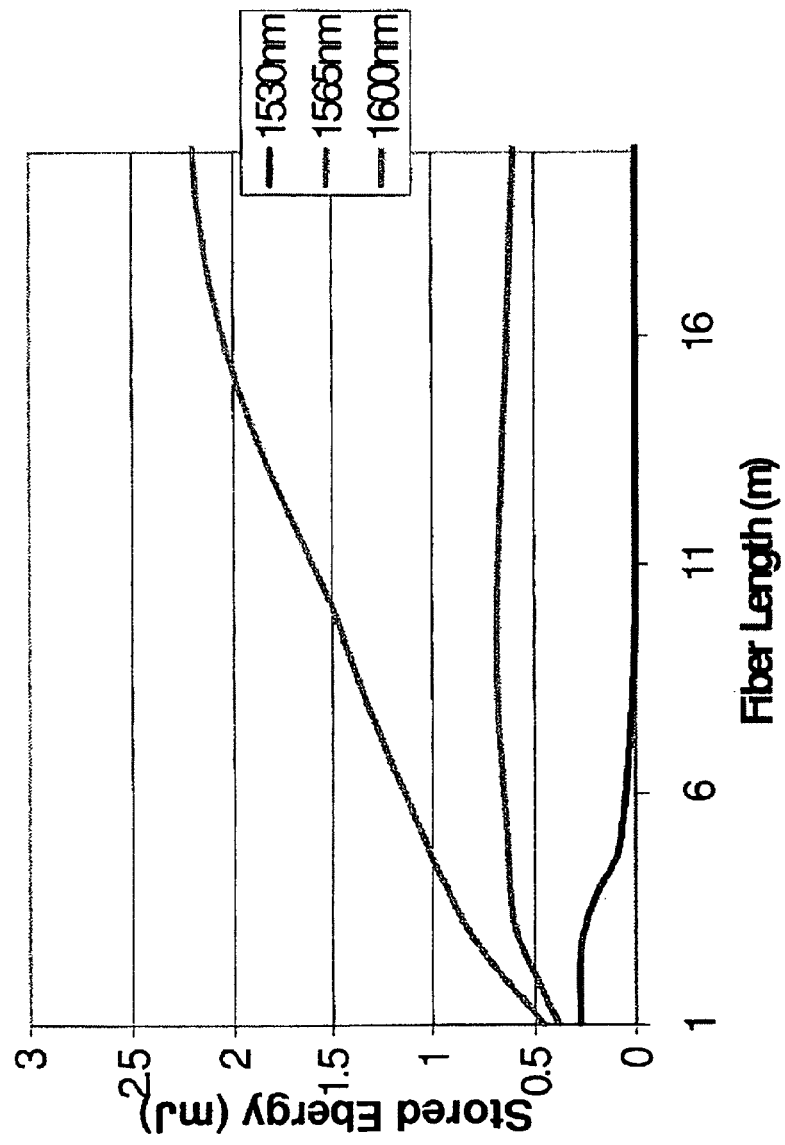
FIG. 27 is a graph of stored energy in aluminosilicate (Al/Si) fiber (having a peak absorption of 50 dB/m and a core diameter of 20 microns) for three wavelengths.

Once the pulse pumping approach was validated, the analysis and design turned to the full 5-stage amplifier with the result seen in FIG. 27. The model was used also used with a cw pump to design amplifier staging for a three-stage preamp to boost the signal from the 1 mW input to the 3 W input needed for the fourth gain stage. In some embodiments, fewer stages (still providing about the same intermediate signal power) are used for the preamp in order to simplify manufacturing and reduce cost. In some embodiments, the pre-amplifier stages are pumped at 1535 nm, using an Er:Yb fiber laser. In some embodiments, this preamp pump is coupled into standard conventional telecom EDFAs, with increasing core size at each stage. At each stage, approximately 12 dB of gain is achieved without pulse distortion.

To measure pulse distortion, the maximum and minimum power of each amplified square pulse are computed. A steady-state difference between maximum and minimum power of less than 1.15% shows that there is little distortion of the shape across the pulse.

TABLE 6

Parameters used for first pre-amplifier stage

| Parameter | value |
| --- | --- |
| Core diameter | 5 μm (microns) |
| Fiber length | 35 m |
| Index of refraction | 1.45 |
| Pump wavelength | 1535 nm |
| Pump absorption cross-section | $6.9 \times 10^{-25}$ m$^2$ |
| Pump emission cross-section | $6.98 \times 10^{-25}$ m$^2$ |
| Pump power | 700 mW |
| Signal pulse duration | 30 μs |
| Signal repetition rate | 7 kHz |
| Signal input power | 1 mW |
| Signal wavelength | 1590 nm |
| Signal absorption cross-section | $4.06464 \times 10^{-26}$ m$^2$ |
| Signal emission cross-section | $1.38196 \times 10^{-25}$ m$^2$ |
| Er doping concentration | $6.58 \times 10^{24}$ m$^3$ |

Using the amplifier parameters from Table 6, we were able to get minimal pulse distortion (difference between pulse maximum and minimum power of less than 0.03%) with a 14.1 mW output signal.

Figure 24B:
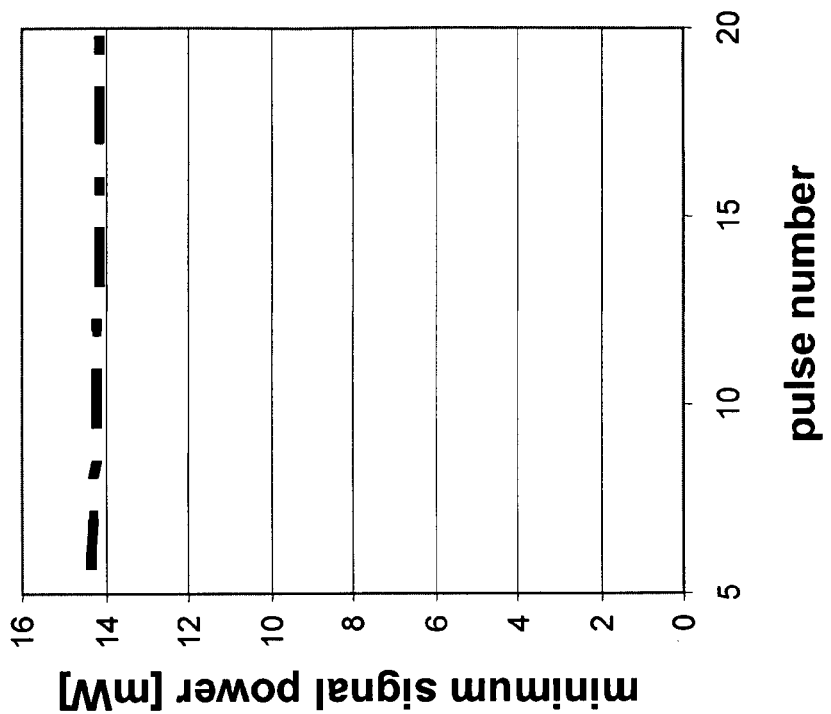
FIG. 24A and FIG. 24B are graphs showing pulse distortion ratio and minimum power, respectively, for subsequent output pulses in Stage 1 of the pre-amplifier.
Figure 24A:
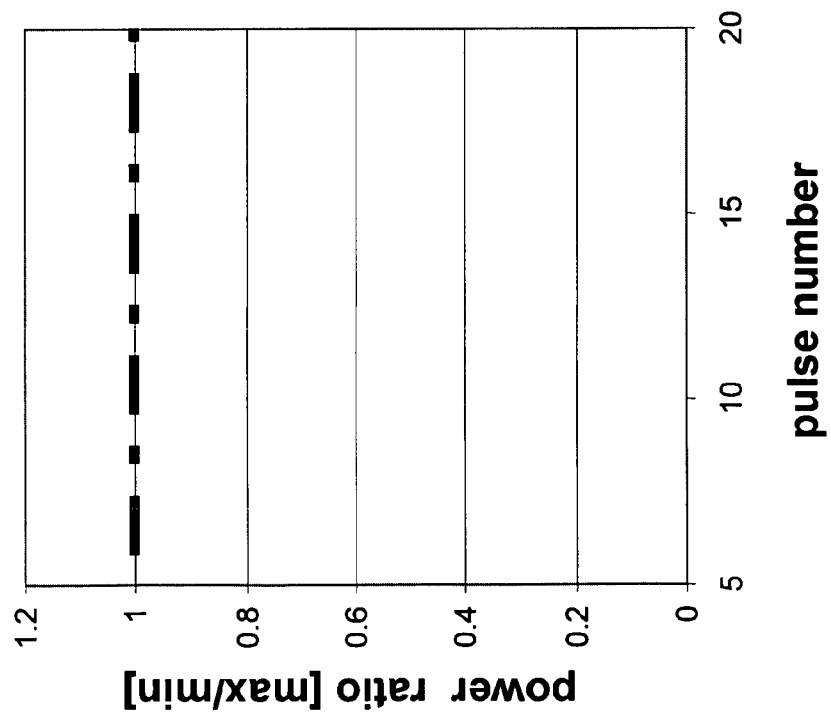

FIG. 24A and FIG. 24B are graphs showing pulse distortion ratio and minimum power, respectively, for subsequent output pulses in Stage 1 of the pre-amplifier. The ratio between maximum and minimum power is nearly one (1), showing minimal signal distortion.

The first pre-amplifier stage is designed for a core diameter of 5 μm and a fiber length of 35 m. Spectroscopic properties and dopant concentrations are assumed identical to those used in the power amplifier model. Pump power was 700 mW.

For the second stage, we increased the core diameter to 10 μm, kept the length at 35 m and increased the pump power to 2 W. Again we saw minimal pulse distortion (since the difference between pulse maximum and minimum power of less than 0.03%) with a 210 mW output signal as indicated in FIG. 25A and FIG. 25B.

FIG. 25A and FIG. 25B are graphs of pulse distortion ratio and minimum power, respectively, for subsequent output pulses in Stage 2 of the pre-amplifier. The ratio between maximum and minimum power is nearly 1, showing minimal signal distortion.

The third stage utilized a 20 μm fiber, 5 W of power and again a length of 35 m. We were able to get minimal pulse distortion (difference between pulse maximum and minimum power of less than 1.14%) with a 2.95 W output signal. This is shown in FIG. 26A and FIG. 26B.

FIG. 26A is a graph of pulse distortion ratio and FIG. 26B is a graph of minimum power for subsequent output pulses in Stage 3 of the pre-amplifier. The ratio between maximum and minimum power is nearly 1, showing minimal signal distortion.

This output signal generated in Stage 3 was sufficient to saturate the two-stage pulse pumped power amplifier shown in FIG. 27.

Amplifier Schematic

Figure 28:
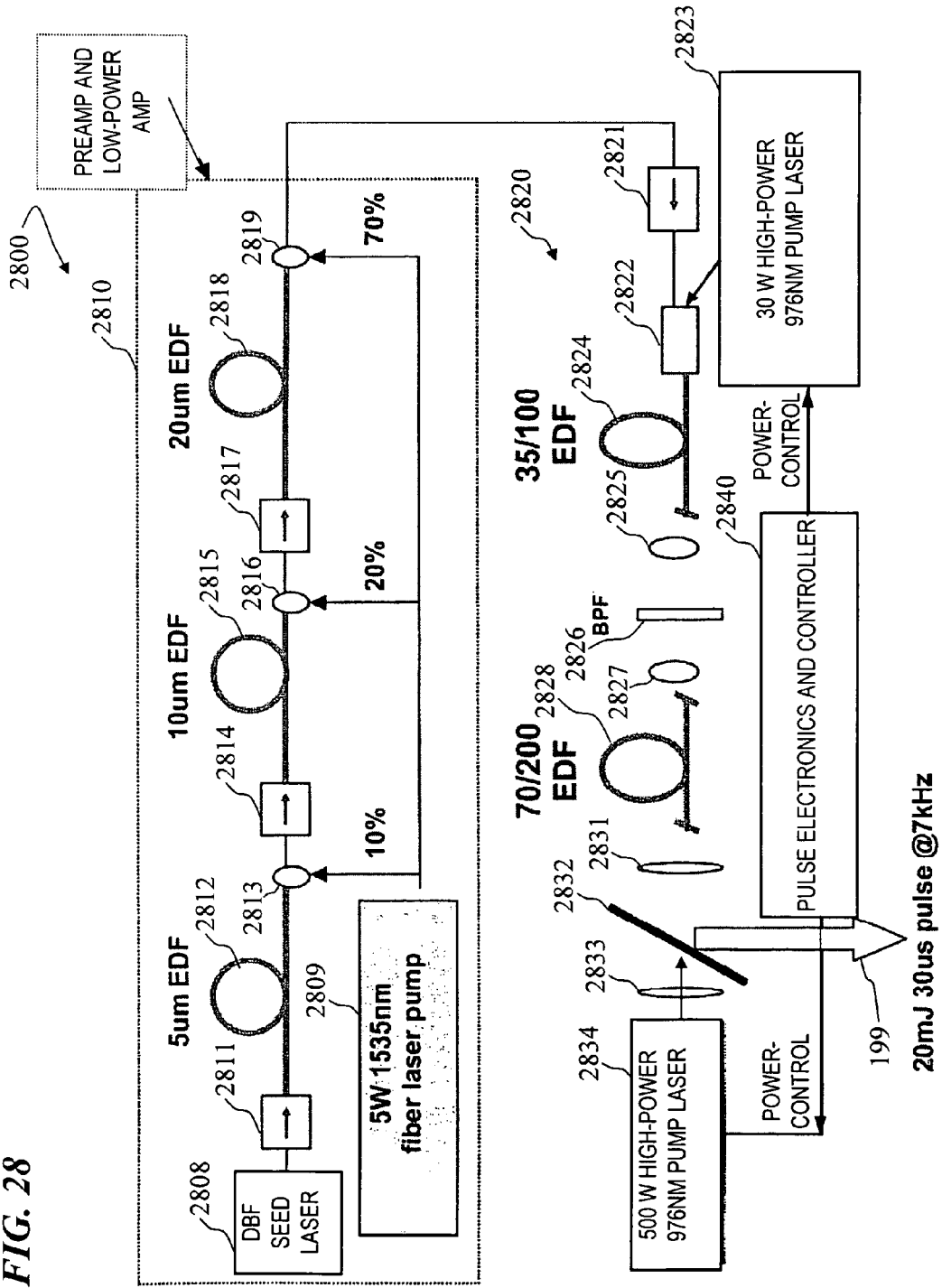
FIG. 28 is a schematic diagram of an amplifier system 2800 according to some embodiments of the invention with scalability to the full specification available as an option.

FIG. 28 is a schematic diagram of an amplifier system 2800 according to some embodiments of the invention with scalability to the full specification available as an option. In some embodiments, system 2800 includes a seed-source-preamplifier portion 2810 and a power amplifier portion 2820. In some embodiments, seed-source-preamplifier portion 2810 includes a seed laser subsystem 2808 (having a seed laser and a pulse modulator) that provides seed pulses (e.g., modulated pulses such as shown in FIGS. 3A-3F). In some embodiments, the modulator is controlled by, or coupled to, controller 2840 to synchronize the seed pulses and the pump pulses. One-way isolator 2811 connects the laser pulses from seed source 2808 to the first-stage preamp fiber 2812 (e.g., a 5-micron-core EDFA, in some embodiments) and prevents backward-propagating noise signal (such as ASE or SBS) from the later amplifier fibers from entering and disturbing or destroying the seed laser. In some embodiments, coupler 2813 (such as a fiber coupler or dichroic mirror) couples the output signal from first-stage fiber 2812 to isolator 2814, and couples a portion (e.g., 10%, in some embodiments) of the pump signal from fiber laser pump 2809 in a counter-propagating direction into first-stage fiber 2812.

One-way isolator 2814 connects the amplified laser pulses from first-stage preamp fiber 2812 to the second-stage preamp fiber 2815 (e.g., a 10-micron-core EDFA, in some embodiments) and prevents backward-propagating signal (such as ASE or SBS) from the later amplifier fibers from entering and disturbing or destroying the seed laser. In some embodiments, coupler 2816 couples the output signal from second-stage fiber 2815 to isolator 2817, and couples a portion (e.g., 20%, in some embodiments) of the pump signal from fiber laser pump 2809 in a counter-propagating direction into second-stage fiber 2815.

Similarly, one-way isolator 2817 connects the output signal from second-stage preamp fiber 2815 to the third-stage preamp fiber 2819 (e.g., a 20-micron-core EDFA, in some embodiments) and prevents backward-propagating signal (such as ASE or SBS) from the later amplifier fibers from entering and disturbing or destroying the seed laser. In some embodiments, coupler 2819 couples the output signal from third-stage fiber 2818 to isolator 2821, and couples a portion (e.g., 70%, in some embodiments) of the pump signal from fiber laser pump 2809 in a counter-propagating direction into third-stage fiber 2818.

Similarly, one-way isolator 2821 connects the output signal from third-stage preamp fiber 2818 through coupler 2822 to the fourth-stage amplifier fiber 2824 (e.g., a 35-micron-core EDFA with a 100-micron cladding diameter, in some embodiments) and prevents backward-propagating signal (such as ASE or SBS) from the later amplifier fibers from entering and disturbing or destroying other earlier stages or the seed laser. In some embodiments, coupler 2822 couples a portion (e.g., 30 W, in some embodiments) of the pump signal from pump laser 2823 in a co-propagating direction into fourth-stage fiber 2824. The output signal from fourth-stage fiber 2824 passes through lens 2825, band-pass filter 2826 (which blocks pump light and/or narrows the line width to reduce ASE in both directions) and lens 2827 to the final fifth-stage amplifier fiber 2828 (e.g., a 70-micron-core EDFA with a 200-micron cladding diameter, in some embodiments). In some embodiments, a high-power pump laser 2834 (e.g., outputting 500 W of 976 nm pump laser light, in some embodiments) is coupled through lens 2833, dichroic beamsplitter mirror 2832 and lens 2831 to enter fifth-stage amplifier fiber 2828 in a counter-propagating direction, while the output signal pulses exit fifth-stage amplifier fiber 2828 through lens 2831 and reflect off dichroic beamsplitter mirror 2832 (in some embodiments, these provide a series of 20 mJ pulses that are 30 microseconds long and have a repetition rate of 7 kHz. In some embodiments, these output pulses are amplitude modulated with a frequency chirp, as shown in FIG. 2E. As described above, the present invention provides the capability to adjust the pump pulse timing, the seed-signal shape, and optionally other parameters such that the output chirp pulses have substantially constant average amplitude, such as shown in FIG. 3E and FIG. 3F.

To achieve record average powers and pulse energies from an eye safe fiber amplifier, some embodiments of the invention provide an EDFA with a large-mode-area (LMA) configuration and energy extraction supplemented by pulsed pumping in synchronization with the signal pulses to be amplified. The overall gain of the system must be approximately 60 dB to reach full pulse energy starting from a given seed source. In some embodiments, this is achieved using five stages of amplification. In some embodiments, in each amplifier stage the dimensions of the core are increased relative to the core size in the prior stage to enable the extraction of more energy while avoiding pulse-shape distortion. Nonlinear effects such as self-phase modulation, stimulated Brillouin scattering (SBS) and stimulated Raman scattering (SRS) are not an issue because of the modest peak powers (<1 kW for the 30 μs-output-pulse lengths).

In some embodiments, the first three stages are based on a reconfiguration of Aculight's PF1550-36 commercial product (available from Aculight Corporation, 22121 20th Avenue S. E., Bothell, Wash. 98021) as a 36 dB-gain L-band amplifier. This amplifier is cw-pumped and operates in the unsaturated regime. Although the power-conversion efficiency of an unsaturated amplifier is intrinsically low, the pre-amplifier uses only inexpensive multimode pump sources. The three-stage pre-amp has a target gain of 36 dB boosting the energy to 80 μJ.

Finally, we amplify to 10 mJ pulse energy in a two-stage 35/100 μm and 70/200 μm core/cladding diameter, low NA, Yb-free EDFA. These final two stages can be either cw or pulse pumped to extract the desired energy. Our initial work indicates that pulsed pumping is advantageous for generating the highest energies in short bursts. These key strategies that will be used to attain the performance requirements of the high energy amplifier are as follows: to obtain eye-safe wavelength near 1550 nm, some embodiments use Er doped fiber amplifiers operating in the L-band. To generate 60 dB gain from amplifier, some embodiments use a plurality of gain stages (e.g., five, in some embodiments, with an L-band preamplifier generating 36 dB of gain, and large-core, low-NA, Er-doped fiber amplifiers for two-stage power amplifier. To generate high pulse energy (>10 mJ) in a pulse length of 10-40 μsec, some embodiments use a low-NA EDFA for high energy storage as a final amplification stage, apply pulse pumping to the final amplifier stage to increase pumping rate and output pulse energy during the pulse, exploit increased L-band energy storage, and exploit slower signal saturation in L-band. To generate beam quality (e.g., $M^2<2.8$) some embodiments use the described novel large-core, low-NA, Er-doped fiber amplifier. To obtain good amplification fidelity, some embodiments use pulse pumping, L-band operation (which operates more like a 4-level amplifier), and controlled timing between the pump pulse and the seed-signal (energy-extraction) pulse.

FIG. 28 is a graph of stored energy in aluminosilicate (Al/Si) fiber (having a peak absorption of 50 dB/m and a core diameter of 20 microns) for three wavelengths—1530 nm, 1565 nm, and 1600 nm), showing greater energy storage at 1565 nm than 1530 nm and greater energy storage at 1600 nm than 1565 nm. This graph was generated assuming a 40 dB small signal gain limit and the input pulse saturates the medium with unity gain; a peak absorption cross-section of $7 \times 10^{-25}$ $m^{-3}$; and 50 db/m peak absorption. The L-band fiber operation offers a ten-times (10×) practical advantage in energy storage compared to the C-band gain-peak-wavelength operation.

In some embodiments, the present invention provides a method that includes providing an optical-fiber amplifier having at least one erbium-doped fiber section; optically pumping the at least one erbium-doped fiber section; and amplifying signal pulses to high energy in the at least one erbium-doped fiber section, the pulses having a wavelength in the range of about 1565 nm to about 1630 nm. In some embodiments, the amplifying fiber is ytterbium free.

In some embodiments, the optically pumping includes pumping with pulsed pump radiation that is synchronized with signal pulses. In some embodiments, energy extraction is between about five (5) times and about twenty (20) times a saturation energy of at least one of the at least one erbium-doped fiber section. In some embodiments, the signal-pulse duration is in the range of about 0.001 times $T_f$ to about 0.1 times $T_f$, where $T_f$ is a fluorescence lifetime of erbium. In some embodiments, signal-pulse duration is in the range of about 0.001 times $T_f$ (about 10 microseconds) to about 0.1 times $T_f$ (about 1 millisecond (ms)), where $T_f$ is a fluorescence lifetime of about ten milliseconds (10 ms). In some embodiments, a leading-edge overshoot is less than a factor of three (3) compared to a trailing edge amplitude (discounting rise and fall times of about 10% of a signal-pulse duration). In some embodiments, the leading-edge overshoot is minimized by turning the pump signal on after the signal pulse starts.

In some embodiments, the optically pumping includes pumping with continuous-wave (CW) pump radiation. In some embodiments, the signal pulse before amplification (the seed signal) is pre-shaped such that the intensity of the seed-signal pulse (before its amplification in the erbium-doped fiber section) increases with time. In some embodiments, the signal pulse's intensity increases with time in a triangular manner. In some embodiments, the signal pulse's intensity increases with time in an exponential manner. In some embodiments, energy extraction is between about three (3) times and about ten (10) times saturation energy. In some embodiments, a leading-edge overshoot of the amplified pulse is less than a factor of three (3) times an amplitude of a trailing edge (discounting rise and fall times of 10% pulse duration).

In some embodiments, the at least one erbium-doped fiber section uses a glass host of aluminosilicate.

In some embodiments, the at least one erbium-doped fiber section uses a glass host of phosphosilicate.

In some embodiments, a small-signal absorption of a core of the at least one erbium-doped fiber section exceeds 50 dB/m at a wavelength between 1528 nm and 1540 nm.

In some embodiments, the optically pumping uses a pumping wavelength in a wavelength range of about 970 nm to 990 nm.

In some embodiments, the optically pumping uses a pumping wavelength in a wavelength range of about 940 nm to 1020 nm.

In some embodiments, the optically pumping uses a pumping wavelength in a wavelength range of about 1450 nm to 1550 nm.

In some embodiments, the optically pumping uses a plurality of pumping wavelengths in one or more of the ranges of 940 nm to 1020 nm, and/or 1450 nm to 1550 nm.

In some embodiments, at least one of the at least one erbium-doped fiber section is cladding pumped.

In some embodiments, the at least one erbium-doped fiber section is integrated into an AM-modulated LADAR system.

In some embodiments, the at least one erbium-doped fiber section is incorporated into a range-gated imaging system. In some embodiments, a laser-illuminated range-gated imaging system is useful for imaging at long ranges and through obscurants (such as fog, smoke, mist, haze, rain and the like). Range-gated imaging permits imaging at long ranges while minimizing the effect of obscurants (fog, rain, or smoke) in the atmosphere. In some embodiments, range-gated imaging uses a pulsed laser to illuminate the scene while the reflected light is detected by a camera with a short exposure timeframe referred to as a gate. The gate has a delay (the minimum out-and-back time of the laser pulse measured from the launch of the laser pulse that illuminates the scene until the pulse returns from the closest object in the range of the gate) and a duration (the out-and-back time from the closest object in the scene to the most-distant object in the scene). The gate is delayed so imaging occurs at a particular range (to ignore reflections and scattering from objects closer than the range), and ends after a predetermined time (to ignore reflections and scattering from objects farther than the range); thus the image is only from the reflection of objects at that range. Laser range gating systems send out a pulsed laser beam to illuminate the scene; the reflected light is detected by a shortwave infrared (SWIR) camera with a short exposure time. The exposure time and a delay from the launch of the laser pulse are synchronized so that they can detect images within a certain range of distances. Long-range identification is important for military operations such as target identification and friend-versus-foe determination (called Identification Friend or Foe (IFF)). To acquire images at night, illuminators can be very useful. However, using illuminators in continuous-wave (CW) mode can blind the imaging system when obscurants such as dust, smoke, or fog are present, due to the backscattered light. Similarly, microscopic particles in water can obscure objects that are being imaged underwater. The range-gated imaging system removes these scattered reflections and allows imaging within the desired range only. One key to safe range-gated imaging is to employ laser sources in the SWIR band. These sources, such as popular 1550 nm lasers, are eye-safe, reducing potential harm to either combatants or noncombatants on the battlefield. In some embodiments, high-speed gated InGaAs SWIR imagers are used, such as are available from the Sensors Unlimited portion of the ISR Systems division of Goodrich Corporation. InGaAs also allows for an all-solid-state solution, using solid-state fiber lasers of the present invention instead of gas lasers, which reduces long-term maintenance and cost. A range-gated system images only the reflected light within a certain time period, which corresponds to a predetermined range of distances. Different ranges can be detected by varying the delay time and duration time; the images of objects at longer distances are better improved by adjusting (lengthening) the delay to ignore back-scattered light (due to obscurants such as haze and the like) between the camera and object being imaged, while objects at nearer distances are better imaged by adjusting (shortening) the duration of the gate to ignore back-scattered light from further than the object. In yet other embodiments, the round-trip travel time for the light pulse is measured as the transmitted laser beam is scanned over an object, to enable construction of a three-dimensional image of an object. In such embodiments, the time to the latest return pulse may be measured, to image an object which may be behind smoke, fog, foliage, or camouflage netting.

In some embodiments, the at least one erbium-doped fiber section is incorporated into a materials-processing system. The choice of using erbium-doped fiber and the choice of a particular L-band signal wavelength may be made, based on the particular material(s) being processed, because the output wavelength is more readily absorbed by the particular material(s) being processed than other wavelengths are absorbed. In other cases, the wavelength produced by the erbium-doped fiber may be preferentially absorbed by one or more components of the material being processed, while leaving other components of the material being processed unaffected or undamaged because they have weaker absorption at the signal wavelength produced by the fiber. In yet other cases, the large pulse energy of an L-band erbium fiber laser system can enable materials processing that would not be feasible using other types of fiber lasers producing less energy per pulse.

In some embodiments, the signal pulses have additional modulation (e.g., amplitude modulation that imposes a sine-wave modulation and/or pulse modulation (fast changing) times a pulse-shape envelope (constant with its start time adjusted relative to the signal pulse and/or slow changing to compensate for gain changes during the pulse) within the pulse envelope. This modulation can impose structure within a relatively long optical pulse, allowing finer range resolution in a LIDAR system than would be feasible with a single long, unstructured pulse. In materials processing applications, many shorter, higher-peak power pulses could be generated by modulating a pulse envelope of long duration, which can facilitate processing of some materials.

In some embodiments, at least one of the at least one erbium-doped fiber sections has a multimode core. By permitting the fiber core to be multimode, the fiber core can made be larger. This in turn will allow more energy to be stored in the fiber's core, and enable higher peak powers to be achieved as well.

In some embodiments, at least one of the at least one erbium-doped fiber sections has a pedestal profile in the core (such as described in U.S. patent application Ser. No. 11/567,740 titled "APPARATUS AND METHOD FOR AN ERBIUM-DOPED FIBER FOR HIGH-PEAK-POWER APPLICATIONS" by John D. Minelly, which is incorporated herein by reference), wherein the index of refraction next to the core is increased (the pedestal) and the index of the core itself is raised relative to the index of the pedestal.

In some embodiments, at least one of the at least one erbium-doped fiber sections has a photonic-crystal-fiber core. Photonic-crystal-fiber cores enable engineering of the index-of-refraction profile of the core beyond the limits usually possible with conventional cores. In conventional erbium-doped fibers, it is very difficult to create large-mode-area (LMA) fibers, because the erbium doping in the core (which is necessary to achieve amplification) causes a large index step with respect to the cladding index. This large step index in turn makes the fiber numerical aperture high, which for larger core diameters causes the core to be multimode. By engineering a photonic-crystal-core erbium-doped fiber to have a smaller index step between the core and the cladding, fewer modes will be supported (with proper engineering (such as described in commonly owned U.S. Pat. No. 7,260,299, which is incorporated herein by reference), a single mode is supported), leading to better beam quality. In some embodiments, the erbium doping, pump pulsing, and L-band signal wavelengths are used in the various structures, systems and methods described in U.S. Pat. No. 7,260,299, and when so combined, these combinations form embodiments of the present invention.

In some embodiments, at least one of the at least one erbium-doped fiber sections has a flattened mode profile. Typical conventional optical fibers have mode profiles that resemble Gaussian shapes, with high intensity near the center of the core, falling off to lower intensity approaching the edge of the core. By tailoring the index profile, some embodiments provide a flatter shape to the signal mode, which then resembles a super-Gaussian or flat-top shape. In some embodiments, the present invention uses fiber profiles such as described in U.S. patent application Ser. No. 11/556,658 titled "APPARATUS AND METHOD FOR A WAVEGUIDE WITH AN INDEX PROFILE MANIFESTING A CENTRAL DIP FOR BETTER ENERGY EXTRACTION" by John D. Minelly et al, which is incorporated herein by reference. This allows more efficient energy extraction before the onset of nonlinear effects than can be achieved in a fiber without a flattened mode profile.

In some embodiments, a length of the fiber in the power amplifier stage(s) corresponds to absorption of between 300 dB and 2000 dB of small-signal inversion at the wavelength of peak absorption (e.g., small-signal inversion denoting a normalized length with respect to erbium concentration; for example, if the 1530 nm absorption in a fiber is 50 dB/m, then 300 dB-2000 dB of small-signal inversion translates to absolute lengths of the power-amplifier fiber of between 6 and 40 m).

In some embodiments, the present invention provides an apparatus that includes an optical-fiber amplifier having at least one erbium-doped fiber section; and at least one source of optical pump light operatively coupled to the at least one erbium-doped fiber section, the apparatus operable to amplify signal pulses to high energy in the at least one erbium-doped fiber section, the signal pulses having a wavelength in the range of about 1565 nm to about 1630 nm. In some embodiments, the amplifying fiber is ytterbium free. In some embodiments, the signal pulses having a wavelength in the range of about 1565 nm to about 1575 nm. In some embodiments, the signal pulses having a wavelength in the range of about 1575 nm to about 1585 nm. In some embodiments, the signal pulses having a wavelength in the range of about 1585 nm to about 1595 nm. In some embodiments, the signal pulses having a wavelength in the range of about 1595 nm to about 1605 nm. In some embodiments, the signal pulses having a wavelength in the range of about 1605 nm to about 1625 nm. In some embodiments, the signal pulses having a wavelength in the range of about 1615 nm to about 1625 nm. In some embodiments, the signal pulses having a wavelength in the range of about 1625 nm to about 1635 nm. In some embodiments, the signal pulses having a wavelength of about 1590 nm.

In some embodiments, the at least one source of optical pump light is operable to provide pulsed pump radiation that is synchronized with signal pulses. In some embodiments, energy extraction from the at least one erbium-doped fiber section is between about five (5) time and about twenty (20) times a saturation energy of at least one of the at least one erbium-doped fiber section. In some embodiments, a signal-pulse duration is in the range of about 0.001 times Tf to about 0.1 times Tf, where Tf is a fluorescence lifetime of erbium. In some embodiments, the signal-pulse duration is in the range of about 0.001 times Tf (10 microseconds) to about 0.1 times Tf (1 millisecond (ms)), where Tf is a fluorescence lifetime of about ten milliseconds (10 ms). In some embodiments, the apparatus is configured to provide a leading-edge overshoot is less than a factor of three (3) compared to a trailing edge amplitude (discounting rise and fall times of about 10% of a signal pulse duration).

In some embodiments, the at least one source of optical pump light is operable to provide continuous-wave (CW) pump radiation and the signal pulse before amplification is pre-shaped such that the signal pulse's intensity increases with time. In some embodiments, the signal pulse's intensity increases with time in a triangular manner. In some embodiments, the signal pulse's intensity increases with time in an exponential manner. In some embodiments, energy extraction of the apparatus is between about three (3) times and about ten (10) times saturation energy. In some embodiments, a leading edge overshoot of the amplified pulse is less than a factor of three (3) times an amplitude of a trailing edge (discounting rise and fall times of 10% pulse duration).

In some embodiments, the at least one erbium-doped fiber section uses a glass host of aluminosilicate. In some embodiments, the at least one erbium-doped fiber section uses a glass host of phosphosilicate.

In some embodiments, a small-signal absorption of a core of the at least one erbium-doped fiber section exceeds 50 dB/m at a wavelength between 1528 nm and 1540 nm.

In some embodiments, the at least one source of optical pump light provides a wavelength in a wavelength range of about 970 nm to 990 nm. In some embodiments, the at least one source of optical pump light provides a wavelength in a wavelength range of about 940 nm to 1020 nm. In some embodiments, the at least one source of optical pump light provides a wavelength in a wavelength range of about 1450 nm to 1550 nm.

In some embodiments, the at least one source of optical pump light provides a plurality of pump wavelengths in the ranges of 940 nm to 1020 nm and/or 1450 nm to 1550 nm.

In some embodiments, at least one of the at least one erbium-doped fiber section is cladding pumped.

In some embodiments, the at least one erbium-doped fiber section is integrated into an AM-modulated LADAR system.

In some embodiments, the at least one erbium-doped fiber section is incorporated into a range-gated imaging system.

In some embodiments, the at least one erbium-doped fiber section is incorporated into a materials-processing system.

In some embodiments, the signal pulses have additional modulation within the pulse envelope.

In some embodiments, at least one of the at least one erbium-doped fiber sections has a multimode core.

In some embodiments, at least one of the at least one erbium-doped fiber sections has a pedestal profile in the core.

In some embodiments, at least one of the at least one erbium-doped fiber sections has a photonic-crystal-fiber core.

In some embodiments, at least one of the at least one erbium-doped fiber sections has a flattened mode profile.

In some embodiments, the signal pulses have a pulse duration of at least about 10 microseconds and/or an output power of at least 100 watts.

In some embodiments, the signal pulses have a pulse duration of at least about 1 millisecond and/or an output power of at least 1000 watts.

In some embodiments, the present invention provides an erbium-doped fiber-based amplification system (amplifier) using one or more gain stages each using a rare-earth-doped amplifying fiber for pulsed radiation with one or more gain stages operating in the wavelength range 1565 nm-1630 nm;

In some embodiments, at least one gain stage also employs pulsed pumping in synchronization with the signal.

In some embodiments, the energy extraction is between 5 and 20 times the saturation energy.

In some embodiments, the pulse duration is in the range Tf/1000-Tf/10, where Tf is the fluorescence lifetime of order 10 ms.

In some embodiments, the leading-edge overshoot is less than a factor of 3 compared to the trailing edge (discounting rise and fall times of 10% pulse duration.)}

In some embodiments, the pump is CW (continuous wave) and the input pulse is pre-shaped such that the intensity increases with time in a triangular or exponential manner. In some such embodiments, the energy extraction is between 3 and 10 times the saturation energy. in some such embodiments, the leading edge overshoot of the amplified pulse is less than a factor of 3 compared to the trailing edge (discounting the initial rise and final fall times of 10% of pulse duration.)

In some embodiments, the glass host is aluminosilicate.

In some embodiments, the glass host is phosphosilicate.

In some embodiments, the small signal absorption of the core exceeds 50 dB/m at a wavelength between 1528 nm and 1540 nm.

In some embodiments, the pump is in the wavelength range 970 to 990 nm.

In some embodiments, the pump is in the range 940 nm to 1020 nm

In some embodiments, the pump wavelength is in the range 1450 nm to 1550 nm.

In some embodiments, multiple pump wavelengths within 940 nm to 1020 nm and 1450 nm to 1550 nm are employed.

In some embodiments, at least one gain stage is cladding pumped.

In some embodiments, the amplifier is integrated into an AM-modulated LADAR system.

In some embodiments, the amplifier is incorporated into a range-gated imaging system.

In some embodiments, the amplifier is incorporated into a materials-processing system.

In some embodiments, the signal pulses have additional modulation within the pulse envelope.

In some embodiments, at least one of the gain stages uses a rare-earth-doped amplifying fiber that has a multimode core.

In some embodiments, at least one of the gain stages uses a rare-earth-doped amplifying fiber that has a pedestal profile in the core.

In some embodiments, at least one of the gain stages uses a rare-earth-doped amplifying fiber that has a photonic-crystal-fiber core.

In some embodiments, at least one of the gain stages uses a rare-earth-doped amplifying fiber that has a flattened mode profile.

In some embodiments, the fiber length corresponds to an absorption of between 300 dB and 2000 dB small signal inversion at the wavelength of peak absorption.

In some embodiments, the present invention provides a method that includes providing an optical-fiber amplifier having at least one erbium-doped fiber section; optically pumping the at least one erbium-doped fiber section; and amplifying signal pulses to high energy in the at least one erbium-doped fiber section, the pulses having a wavelength in the range of about 1565 nm to about 1630 nm.

In some embodiments of the method, the optically pumping includes pumping with pulsed pump radiation that is synchronized with signal pulses.

In some embodiments of the method, energy extraction is between about five (5) times and about twenty (20) times a saturation energy of at least one of the at least one erbium-doped fiber section.

In some embodiments of the method, a signal pulse duration is in the range of about 0.001 times Tf to about 0.1 times Tf, where Tf is a fluorescence lifetime of erbium.

In some embodiments of the method, a signal pulse duration is in the range of about 0.001 times Tf to about 0.1 times Tf, where Tf is a fluorescence lifetime of about ten milliseconds (10 ms).

In some embodiments of the method, a leading-edge overshoot of an output pulse is less than a factor of three (3) compared to a trailing edge amplitude (discounting rise and fall times of about 10% of a signal pulse duration).

In some embodiments of the method, the optically pumping includes pumping with continuous-wave (CW) pump radiation and the signal pulse before amplification is pre-shaped such that the signal pulse's intensity increases with time. In some embodiments, the signal pulse's intensity increases with time in a triangular manner. In some embodiments, the signal pulse's intensity increases with time in an exponential manner. In some embodiments, energy extraction is between about three (3) times and about ten (10) times saturation energy. In some embodiments, a leading edge overshoot of the amplified pulse is less than a factor of three (3) times an amplitude of a trailing edge (discounting rise and fall times of 10% pulse duration).

In some embodiments of the method, the at least one erbium-doped fiber section uses a glass host of aluminosilicate.

In some embodiments of the method, the at least one erbium-doped fiber section uses a glass host of phosphosilicate.

In some embodiments of the method, a small-signal absorption of a core of the at least one erbium-doped fiber section exceeds 50 dB/m at a wavelength between 1528 nm and 1540 nm.

In some embodiments of the method, the optically pumping uses a wavelength in a wavelength range of about 970 to 990 nm.

In some embodiments of the method, the optically pumping uses a wavelength in a wavelength range of about 940 nm to 1020 nm.

In some embodiments of the method, the optically pumping uses a wavelength in a wavelength range of about 1450 nm to 1550 nm.

In some embodiments of the method, the optically pumping uses a plurality of pump wavelengths, wherein the plurality of pump wavelengths are in the ranges of 970 nm to 990 nm, 940 nm to 1020 nm, and 1450 nm to 1550 nm.

In some embodiments of the method, at least one of the at least one erbium-doped fiber section is cladding pumped.

In some embodiments of the method, the at least one erbium-doped fiber section is integrated into an AM-modulated LADAR system.

In some embodiments of the method, the at least one erbium-doped fiber sections is incorporated into a range-gated imaging system.

In some embodiments of the method, the at least one erbium-doped fiber sections is incorporated into a materials-processing system.

In some embodiments of the method, the signal pulses have additional modulation within the pulse envelope.

In some embodiments of the method, at least one of the at least one erbium-doped fiber sections has a multimode core.

In some embodiments of the method, at least one of the at least one erbium-doped fiber sections has a pedestal profile in the core.

In some embodiments of the method, at least one of the at least one erbium-doped fiber sections has a photonic-crystal-fiber core.

In some embodiments of the method, at least one of the at least one erbium-doped fiber sections has a flattened mode profile.

In some embodiments of the method, a length of the fiber corresponds to an absorption of between 300 dB and 2000 dB of small-signal inversion at the wavelength of peak absorption.

In some embodiments of the method, the signal pulses have a pulse duration of at least about 10 microseconds and an output power of at least 100 watts.

In some embodiments of the method, the signal pulses have a pulse duration of at least about 1 millisecond and an output power of at least 1000 watts. In some embodiments, the present invention provides an apparatus that includes an optical-fiber amplifier having at least one erbium-doped fiber section, and at least one source of optical pump light operatively coupled to the at least one erbium-doped fiber section, the apparatus operable to amplify signal pulses to high energy in the at least one erbium-doped fiber section, the pulses having a wavelength in the range of about 1565 nm to about 1630 nm.

In some embodiments of the apparatus, the at least one source of optical pump light is operable to provide pulsed pump radiation that is synchronized with signal pulses.

In some embodiments of the apparatus, wherein energy extraction from the at least one erbium-doped fiber section is between about five (5) time and about twenty (20) times a saturation energy of at least one of the at least one erbium-doped fiber section.

In some embodiments of the apparatus, wherein a signal pulse duration is in the range of about 0.001 times Tf to about 0.1 times Tf, where Tf is a fluorescence lifetime of erbium.

In some embodiments of the apparatus, a signal pulse duration is in the range of about 0.001 times Tf to about 0.1 times Tf, where Tf is a fluorescence lifetime of about ten milliseconds (10 ms).

In some embodiments of the apparatus, the apparatus is configured to provide a leading-edge overshoot is less than a factor of three (3) compared to a trailing edge amplitude (discounting rise and fall times of about 10% of a signal pulse duration).

In some embodiments of the apparatus, the at least one source of optical pump light is operable to provide continuous-wave (CW) pump radiation and the signal pulse before amplification is pre-shaped such that the signal pulse's intensity increases with time. In some embodiments, the signal pulse's intensity increases with time in a triangular manner. In some embodiments, the signal pulse's intensity increases with time in an exponential manner. In some embodiments, energy extraction of the apparatus is between about three (3) times and about ten (10) times saturation energy. In some embodiments, a leading edge overshoot of the amplified pulse is less than a factor of three (3) times an amplitude of a trailing edge (discounting rise and fall times of 10% pulse duration).

In some embodiments of the apparatus, the at least one erbium-doped fiber section uses a glass host of aluminosilicate.

In some embodiments of the apparatus, the at least one erbium-doped fiber section uses a glass host of phosphosilicate.

In some embodiments of the apparatus, a small-signal absorption of a core of the at least one erbium-doped fiber section exceeds 50 dB/m at a wavelength between 1528 nm and 1540 nm.

In some embodiments of the apparatus, the at least one source of optical pump light provides a wavelength in a wavelength range of about 970 nm to 990 nm.

In some embodiments of the apparatus, the at least one source of optical pump light provides a wavelength in a wavelength range of about 940 nm to 1020 nm.

In some embodiments of the apparatus, the at least one source of optical pump light provides a wavelength in a wavelength range of about 1450 nm to 1550 nm.

In some embodiments of the apparatus, the at least one source of optical pump light provides a plurality of pump wavelengths in the ranges of 940 nm to 1020 nm, and 1450 nm to 1550 nm.

In some embodiments of the apparatus, at least one of the at least one erbium-doped fiber section is cladding pumped.

In some embodiments of the apparatus, the at least one erbium-doped fiber section is integrated into an AM-modulated LADAR system.

In some embodiments of the apparatus, the at least one erbium-doped fiber section is incorporated into a range-gated imaging system.

In some embodiments of the apparatus, the at least one erbium-doped fiber section is incorporated into a materials-processing system.

In some embodiments of the apparatus, the signal pulses have additional modulation within the pulse envelope.

In some embodiments of the apparatus, at least one of the at least one erbium-doped fiber sections has a multimode core.

In some embodiments of the apparatus, at least one of the at least one erbium-doped fiber sections has a pedestal profile in the core.

In some embodiments of the apparatus, at least one of the at least one erbium-doped fiber sections has a photonic-crystal-fiber core.

57. The apparatus of claim 31, wherein at least one of the at least one erbium-doped fiber sections has a flattened mode profile.

In some embodiments of the apparatus, a length of the fiber corresponds to an absorption of between 300 dB and 2000 dB of small-signal inversion at the wavelength of peak absorption.

In some embodiments of the apparatus, the signal pulses have a pulse duration of at least about 10 microseconds and/or an output power of at least 100 watts.

In some embodiments of the apparatus, the signal pulses have a pulse duration of at least about 1 millisecond and/or an output power of at least 1000 watts.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising:
providing an optical-fiber amplifier having a first ytterbium-free erbium-doped fiber section;
optically pulse pumping the first erbium-doped fiber section; and
amplifying substantially square signal pulses to an energy of at least ten mJ in the first erbium-doped fiber section, the amplified signal pulses having a duration and having a wavelength in the range of about 1565 nm to about 1630 nm, such that pulse profiles of the amplified signal pulses have a ratio of maximum power to minimum power of less than about 1.25 for the duration of each of the amplified signal pulses.

2. The method of claim 1, wherein the optically pumping includes pumping with pulsed pump radiation that is synchronized with signal pulses.

3. The method of claim 2, wherein energy extraction is between about five (5) times and about twenty (20) times a saturation energy of at least one of the at least one erbium-doped fiber section.

4. The method of claim 2, wherein a signal pulse duration is in the range of about 0.001 times $T_f$ to about 0.1 times $T_f$, where $T_f$ is a fluorescence lifetime of erbium.

5. A method comprising:
providing an optical-fiber amplifier having at least one erbium-doped fiber section;
optically pumping the at least one erbium-doped fiber section; and
amplifying signal pulses to high energy in the at least one erbium-doped fiber section, the signal pulses having a wavelength in the range of about 1565 nm to about 1630 nm, wherein the optically pumping includes pumping with pulsed pump radiation that is synchronized with signal pulses, and wherein a leading-edge overshoot of an output pulse is less than a factor of three (3) compared to a trailing edge amplitude (discounting rise and fall times of about 10% of a signal pulse duration).

6. The method of claim 1, wherein the first erbium-doped fiber section uses a glass host of phosphosilicate.

7. The method of claim 1, wherein a small-signal absorption of a core of the first erbium-doped fiber section exceeds 50 dB/m at a wavelength between 1528 nm and 1540 nm.

8. The method of claim 1, wherein the optically pumping uses a wavelength in a wavelength range of about 970 nm to 990 nm.

9. The method of claim 1, further comprising pumping at least one of the at least one erbium-doped fiber section via its cladding.

10. The method of claim 1, further comprising laser processing a material with the amplified laser pulses.

11. The method of claim 1, wherein the pulses have a pulse envelope, the method further comprising amplitude modulating the signal pulses within their pulse envelope.

12. The method of claim 1, wherein the amplified signal pulses are output with a pulse duration of at least about 10 microseconds and an output power of at least 100 watts.

13. The method of claim 1, wherein the amplified signal pulses are output with a pulse duration of at least about 1 millisecond and an output power of at least 1000 watts.

14. An apparatus comprising:
ytterbium-free erbium-doped means for amplifying substantially square seed signal pulses, the seed signal pulses having a wavelength in the range of about 1565 nm to about 1630 nm to generate amplified output signal pulses, and
means for optically pumping the means for amplifying, such that the amplified output signal pulses from the means for amplifying each have an energy of at least ten mJ per pulse, have a duration, and have a pulse profile such that the amplified output signal pulses have a ratio of maximum power to minimum power of less than about 1.25 for the duration of each of the amplified output signal pulses.

15. The apparatus of claim 14, further comprising means for amplitude modulating the seed signal pulses with a frequency-chirped modulation.

16. The apparatus of claim 14, wherein the means for optically pumping further includes means for pulse pumping and means for adjusting a timing of the pump pulses to obtain a substantially constant amplification of the signal pulses.

17. The apparatus of claim 14, wherein the signal pulses have a wavelength in the range of about 1585 nm to about 1605 nm.

18. An apparatus comprising:
an optical-fiber amplifier having at least a first ytterbium-free erbium-doped fiber section; and
at least one source of optical pump light operatively coupled to the first erbium-doped fiber section, the apparatus operable to amplify substantially square signal pulses to produce amplified signal pulses each having an energy of at least ten mJ per pulse in the first erbium-doped fiber section, the amplified signal pulses each having a duration and having a wavelength in the range of about 1565 nm to about 1630 nm, such that pulse profiles of the amplified signal pulses have a ratio of maximum power to minimum power of less than about 1.25 for the duration of each of the amplified signal pulses.

19. The apparatus of claim 18, wherein the first ytterbium-free erbium-doped fiber section has a multimode core.

20. The apparatus of claim 18, wherein the first ytterbium-free erbium-doped fiber section has a pedestal profile in the core.

21. The apparatus of claim 18, wherein the first ytterbium-free erbium-doped fiber section has a photonic-crystal-fiber core.

22. The apparatus of claim 18, wherein the at least one source of optical pump light is operable to provide pulsed pump radiation that is synchronized with signal pulses.

23. The apparatus of claim 22, wherein energy extraction from the first ytterbium-free erbium-doped fiber section is between about five (5) times and about twenty (20) times a saturation energy of the at least one erbium-doped fiber section.

24. The apparatus of claim 22, wherein a signal pulse duration is in the range of about 0.001 times $T_f$ to about 0.1 times $T_f$, where $T_f$ is a fluorescence lifetime of erbium.

25. The apparatus of claim 22, wherein a signal pulse duration is in the range of about 0.001 times $T_f$ to about 0.1 times $T_f$, where $T_f$ is a fluorescence lifetime of about ten milliseconds (10 ms).

26. An apparatus comprising:
an optical-fiber amplifier having at least one erbium-doped fiber section; and
at least one source of optical pump light operatively coupled to the at least one erbium-doped fiber section, the apparatus operable to amplify signal pulses to an energy at least one mJ per pulse in the at least one erbium-doped fiber section, the signal pulses having a wavelength in the range of about 1565 nm to about 1630 nm, wherein the at least one source of optical pump light is operable to provide pulsed pump radiation that is synchronized with signal pulses, and wherein the apparatus is configured to provide a leading-edge overshoot is less than a factor of three (3) compared to a trailing edge amplitude (discounting rise and fall times of about 10% of a signal pulse duration).

27. The apparatus of claim 18, further comprising an AM-modulated LADAR system, wherein the at least one erbium-doped fiber section is integrated into the AM-modulated LADAR system.

28. The apparatus of claim 18, wherein the first ytterbium-free erbium-doped fiber section uses a glass host of aluminosilicate.

29. The apparatus of claim 18, wherein the first ytterbium-free erbium-doped fiber section uses a glass host of phosphosilicate.

30. The apparatus of claim 18, wherein a small-signal absorption of a core of the first ytterbium-free erbium-doped fiber section exceeds 50 dB/m at a wavelength between 1528 nm and 1540 nm.

31. The apparatus of claim 18, further comprising a range-gated imaging system, wherein the first ytterbium-free erbium-doped fiber section is incorporated into the range-gated imaging system.

32. The apparatus of claim 18, further comprising a materials-processing system, wherein the first ytterbium-free erbium-doped fiber section is incorporated into the materials-processing system.

33. The method of claim 1, wherein the optically pumping includes providing a pump-pulse lead time relative to a start of the signal pulses that is approximately 3.5 to 4 microseconds.

34. The apparatus of claim 14, wherein the means for optically pumping provides a pump pulse with a pump-pulse lead time relative to a start of the signal pulses that is approximately 3.5 to 4 microseconds.

35. The apparatus of claim 18, wherein the at least one source of optical pump light provides a pump pulse with a pump-pulse lead time relative to a start of the signal pulses that is approximately 3.5 to 4 microseconds.

\* \* \* \* \*

UNITED STATES PATENT AND TRADEMARK OFFICE
CERTIFICATE OF CORRECTION

| | | |
|---|---|---|
| PATENT NO. | : 7,872,794 B1 | Page 1 of 1 |
| APPLICATION NO. | : 12/018193 | |
| DATED | : January 18, 2011 | |
| INVENTOR(S) | : John D. Minelly et al. | |

It is certified that error appears in the above-identified patent and that said Letters Patent is hereby corrected as shown below:

In Column 4, Line 48:
  Delete "aluminosilicate fiber of core diameter 35 um as a function of" and insert
   --aluminosilicate fiber of core diameter 35 μm as a function of-- therefor.

In Column 6, Line 38:
  Delete "C-hand (1550 nm) energy extraction, showing the energy per" and insert
   --C-band (1550 nm) energy extraction, showing the energy per-- therefor.

In Column 21, Line 50 (second line of text following TABLE 5):
  Delete "C-hand (1550 nm) energy extraction, showing the energy per" and insert
   --C-band (1550 nm) energy extraction, showing the energy per-- therefor.

Signed and Sealed this
Fifth Day of April, 2011

David J. Kappos
*Director of the United States Patent and Trademark Office*